(12) United States Patent
James

(10) Patent No.: US 7,487,148 B2
(45) Date of Patent: Feb. 3, 2009

(54) SYSTEM AND METHOD FOR ANALYZING DATA

(75) Inventor: Frederick Earl James, Kalamazoo, MI (US)

(73) Assignee: Eaton Corporation, Cleveland, OH (US)

( * ) Notice: Subject to any disclaimer, the term of this patent is extended or adjusted under 35 U.S.C. 154(b) by 419 days.

(21) Appl. No.: 10/377,511

(22) Filed: Feb. 28, 2003

(65) Prior Publication Data

US 2004/0172409 A1    Sep. 2, 2004

(51) Int. Cl.
G06F 17/30    (2006.01)

(52) U.S. Cl. .................. 707/6; 707/101; 707/104.1; 707/3

(58) Field of Classification Search .................. 707/3, 707/6, 101, 104.1
See application file for complete search history.

(56) References Cited

U.S. PATENT DOCUMENTS

| | | | |
|---|---|---|---|
| 4,267,562 A | | 5/1981 | Raimondi |
| 4,495,585 A | | 1/1985 | Buckley |
| 4,559,602 A | | 12/1985 | Bates, Jr. |
| 4,763,274 A | | 8/1988 | Junker et al. |
| 4,817,171 A | | 3/1989 | Stentiford |
| 4,845,610 A | | 7/1989 | Parvin |
| 5,067,099 A | * | 11/1991 | McCown et al. ............ 702/183 |
| 5,099,436 A | * | 3/1992 | McCown et al. ............. 702/82 |
| 5,119,816 A | | 6/1992 | Gevins |
| 5,138,587 A | | 8/1992 | Mason |
| 5,485,575 A | * | 1/1996 | Chess et al. ................. 714/38 |
| 5,769,793 A | * | 6/1998 | Pincus et al. ................ 600/515 |
| 5,846,189 A | * | 12/1998 | Pincus ........................ 600/301 |
| 5,916,300 A | | 6/1999 | Kirk et al. |
| 6,064,770 A | * | 5/2000 | Scarth et al. ................ 382/225 |
| 6,092,065 A | | 7/2000 | Floratos et al. |
| 6,151,565 A | | 11/2000 | Lobley et al. |

(Continued)

FOREIGN PATENT DOCUMENTS

EP    1 184 810 A2    3/2002

OTHER PUBLICATIONS

XP- 000936788 Transactions on Pattern Analysis and Machine Intelligence, vol. 22 No. 1 Jan. 2000 entitled *Statistical Pattern Recognition: A Review* by Anil K. Jain, Fellow, IEEE, Robert P.W. Duin, and Jianchang Mao, Senior Member, IEEE.

*Primary Examiner*—Jean M Corrielus
(74) *Attorney, Agent, or Firm*—Rader, Fishman & Grauer PLLC

(57)    ABSTRACT

A system and method for analyzing data (the "system") is disclosed. The system can automatically identify patterns of template data points encapsulated in the form of one or more "events." Calculations and analysis relating to those identified events can be automatically performed at the identified locations of the events. Events are user-defined, and can be defined in reference to multiple channels of data. The system can perform various correlation calculations in comparing events with data points. Upon identifying the location of various events in the various data files, markers can be placed at those file locations. Analysis calculations can then be performed related to the marked data. The system can incorporate the automated time-scaling of patterns, marker sorting heuristics, the adjustment of fit sensitivity based on the size of the pattern, target value weighing, and the calculation of various confidence values relating to the processing of the system.

36 Claims, 33 Drawing Sheets

U.S. PATENT DOCUMENTS

| | | |
|---|---|---|
| 6,154,739 A | 11/2000 | Wrobel |
| 6,176,427 B1 * | 1/2001 | Antognini et al. ........... 235/454 |
| 6,202,062 B1 | 3/2001 | Cameron et al. |
| 6,205,247 B1 | 3/2001 | Breuer et al. |
| 6,317,517 B1 | 11/2001 | Lu |
| 6,421,668 B1 | 7/2002 | Yakhini et al. |
| 7,079,927 B1 * | 7/2006 | Tano et al. .................... 701/35 |
| 2001/0014776 A1 | 8/2001 | Oriol et al. |
| 2004/0073551 A1 * | 4/2004 | Hubbard et al. ................ 707/6 |

* cited by examiner

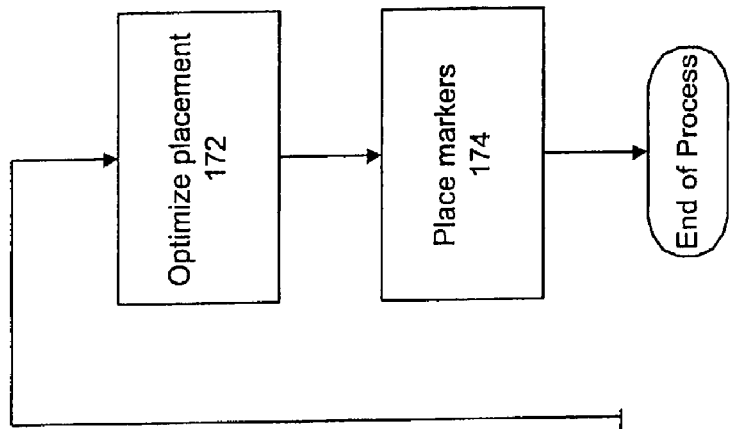
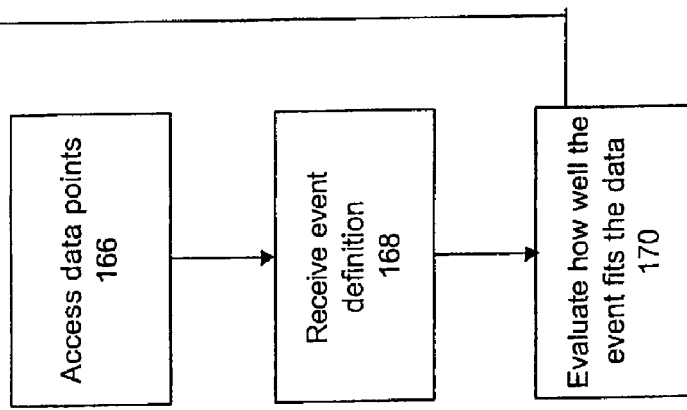
Figure 4
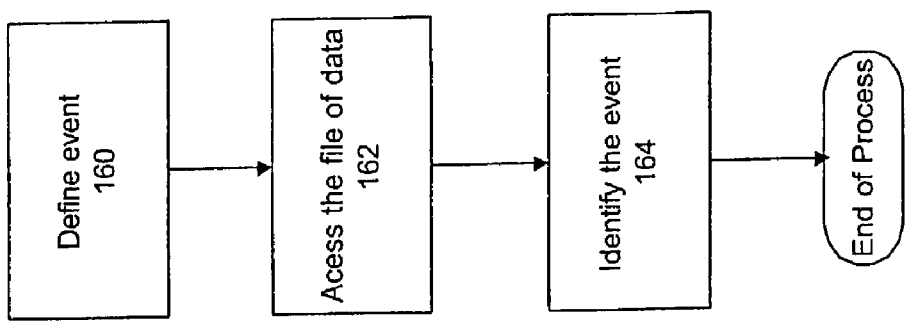
Figure 3

$$r_j = \frac{n\sum x_i y_{i+j} - (\sum x_i)(\sum y_{i+j})}{\sqrt{\left[n\sum x_i^2 - (\sum x_i)^2\right]\left[n\sum y_{i+j}^2 - (\sum y_{i+j})^2\right]}}$$

$$r_j = \frac{n\sum G_i H_i - (\sum G_i)(\sum H_i)}{\sqrt{\left[n\sum G_i^2 - (\sum G_i)^2\right]\left[n\sum H_i^2 - (\sum H_i)^2\right]}}$$

To use the spreadsheet, modify the confidence arrays (conf#1, Conf#2, etc)
The lower right edge will tell the time location for the optimal placement of each marker.

| | A | B | C | D | E | Pass #1 | | Pass #2 | | Pass #3 | | Pass #4 | | Pass #5 | |
|---|---|---|---|---|---|---|---|---|---|---|---|---|---|---|---|
| Time | Conf #1 | Conf #2 | Conf #3 | Conf #4 | Conf #5 | Max | Where | Max | Where | Max | Where | Max | Where | Max | Where |
| 0 | 1 | 1 | 1 | 1 | 1 | 1 | 0 | 1 | 0 | 1 | 0 | 1 | 0 | 1 | 0 |
| 1 | 1 | 8 | 1 | 1 | 1 | 1 | 0 | 9 | 1 | 2 | 1 | 2 | 1 | 2 | 1 |
| 2 | 1 | 1 | 1 | 1 | 1 | 1 | 0 | 9 | 1 | 10 | 2 | 3 | 2 | 3 | 2 |
| 3 | 6 | 1 | 1 | 1 | 1 | 6 | 3 | 9 | 1 | 10 | 2 | 11 | 3 | 4 | 3 |
| 4 | 7 | 1 | 1 | 1 | 1 | 7 | 4 | 9 | 1 | 10 | 2 | 11 | 3 | 12 | 4 |
| 5 | 3 | 1 | 1 | 1 | 1 | 7 | 4 | 9 | 1 | 10 | 2 | 11 | 3 | 12 | 4 |
| 6 | 1 | 1 | 1 | 1 | 1 | 7 | 4 | 9 | 1 | 10 | 2 | 11 | 3 | 12 | 4 |
| 7 | 1 | 5 | 1 | 1 | 1 | 7 | 4 | 12 | 7 | 10 | 2 | 11 | 3 | 12 | 4 |
| 8 | 1 | 7 | 1 | 1 | 1 | 7 | 4 | 14 | 8 | 10 | 2 | 11 | 3 | 12 | 4 |
| 9 | 1 | 3 | 1 | 1 | 1 | 7 | 4 | 14 | 8 | 13 | 8 | 14 | 9 | 12 | 4 |
| 10 | 1 | 1 | 1 | 1 | 1 | 7 | 4 | 14 | 8 | 15 | 9 | 16 | 10 | 15 | 10 |
| 11 | 1 | 1 | 1 | 1 | 1 | 7 | 4 | 14 | 8 | 15 | 9 | 16 | 10 | 17 | 11 |
| 12 | 1 | 1 | 7 | 1 | 1 | 7 | 4 | 14 | 8 | 15 | 12 | 16 | 10 | 17 | 11 |
| 13 | 1 | 1 | 8 | 8 | 1 | 7 | 4 | 14 | 8 | 21 | 13 | 22 | 13 | 17 | 11 |
| 14 | 1 | 1 | 7 | 7 | 1 | 7 | 4 | 14 | 8 | 22 | 13 | 23 | 14 | 23 | 14 |
| 15 | 1 | 1 | 1 | 1 | 1 | 7 | 4 | 14 | 8 | 22 | 13 | 23 | 14 | 24 | 15 |
| 16 | 1 | 1 | 1 | 1 | 1 | 7 | 4 | 14 | 8 | 22 | 13 | 23 | 14 | 24 | 15 |
| 17 | 1 | 1 | 1 | 1 | 1 | 7 | 4 | 14 | 8 | 22 | 13 | 29 | 17 | 24 | 15 |
| 18 | 1 | 1 | 1 | 1 | 1 | 7 | 4 | 14 | 8 | 22 | 13 | 30 | 18 | 30 | 18 |
| 19 | 1 | 1 | 1 | 1 | 1 | 7 | 4 | 14 | 8 | 22 | 13 | 30 | 18 | 31 | 19 |
| 20 | 1 | 1 | 1 | 1 | 1 | 7 | 4 | 14 | 8 | 22 | 13 | 30 | 18 | 31 | 19 |
| 21 | 1 | 1 | 1 | 1 | 1 | 7 | 4 | 14 | 8 | 22 | 13 | 30 | 18 | 31 | 19 |
| 22 | 1 | 1 | 1 | 1 | 1 | 7 | 4 | 14 | 8 | 22 | 13 | 30 | 18 | 31 | 19 |
| 23 | 1 | 1 | 1 | 1 | 1 | 7 | 4 | 14 | 8 | 22 | 13 | 30 | 18 | 31 | 19 |
| 24 | 1 | 1 | 1 | 1 | 1 | 7 | 4 | 14 | 8 | 22 | 13 | 30 | 18 | 31 | 19 |
| 25 | 1 | 8 | 1 | 1 | 1 | 7 | 4 | 15 | 25 | 22 | 13 | 30 | 18 | 31 | 19 |
| 26 | 1 | 9 | 1 | 1 | 1 | 7 | 4 | 16 | 26 | 22 | 13 | 30 | 18 | 31 | 19 |
| 27 | 1 | 8 | 1 | 1 | 1 | 7 | 4 | 16 | 26 | 22 | 13 | 30 | 18 | 31 | 19 |
| 28 | 1 | 1 | 1 | 1 | 1 | 7 | 4 | 16 | 26 | 22 | 13 | 30 | 18 | 31 | 19 |
| | | | | | | marker #1 | | marker #2 | | marker #3 | | marker #4 | | marker #5 | |
| | | | | | | Optimal time | 4 | | 8 | | 13 | | 18 | | 19 |

Figure 14

| HeaderLabel #1 from analysis documentation | | | | | HeaderLabel #5 from analysis documentation | | | | | |
|---|---|---|---|---|---|---|---|---|---|---|
| HeaderText #1 from analysis documentation | | | | | HeaderText #5 from analysis documentation | | | | | |
| HeaderLabel #1 from first file | | | | | HeaderLabel #5 from first file | | | | | |
| HeaderText #1 from first file | | | | | HeaderText #5 from first file | | | | | (Consider writing a new header entry every other column for spacing reasons) |
| Comment from first file | | | | | | | | | | |
| Comment from analysis documentation | | | | | | | | | | |
| Number Selected | Number Accepted | Analysis Date | Analysis time | Software Version | | | | | | |
| 237 | 225 | | | | | | | | | (consider those filen are |
| Config File #1 | Marker #1 Pattern file #1 | Marker #2 Pattern file #1 | Marker #3 Pattern file #1 | Marker #4 Pattern file #1 | Marker #5 Pattern file #1 | Marker #6 Pattern file #1 | Marker #7 Pattern file #1 | Marker #8 Pattern file #1 | Marker #9 Pattern file #1 | Marker #10 Pattern file #1 |
| Config File #2 | Marker #1 Pattern file #2 | Marker #2 Pattern file #2 | Marker #3 Pattern file #2 | Marker #4 Pattern file #2 | Marker #5 Pattern file #2 | Marker #6 Pattern file #2 | Marker #7 Pattern file #2 | Marker #8 Pattern file #2 | Marker #9 Pattern file #2 | Marker #10 Pattern file #2 |
| Config file #3 | Marker #1 Pattern file #3 | Marker #2 Pattern file #3 | Marker #3 Pattern file #3 | Marker #4 Pattern file #3 | Marker #5 Pattern file #3 | Marker #6 Pattern file #3 | Marker #7 Pattern file #3 | Marker #8 Pattern file #3 | Marker #9 Pattern file #3 | Marker #10 Pattern file #3 |
| Config file #4 | Marker #1 Pattern file #4 | Marker #2 Pattern file #4 | Marker #3 Pattern file #4 | Marker #4 Pattern file #4 | Marker #5 Pattern file #4 | Marker #6 Pattern file #4 | Marker #7 Pattern file #4 | Marker #8 Pattern file #4 | Marker #9 Pattern file #4 | Marker #10 Pattern file #4 |
| Spare Row 1 | | | | | | | | | | |
| Spare Row 2 | | | | | | | | | | |
| File Name | Date | Time | Confidence | Disengage Time | Sync Time | Engage time | Shift Time | Shift Knob Impulse | Notch Impulse | Detent Impulse | Change |
| | | | | Sec | Sec | Sec | Sec | lbf-sec | lbf-sec | lbf-sec | Jw lbf-ft-s |
| Results.GDB | 11/23/89 | 12:35 | 0.89 | 0.02 | 0.14 | 0.03 | 0.24 | 16.2 | 2.1 | 0.89 | 4.24 |

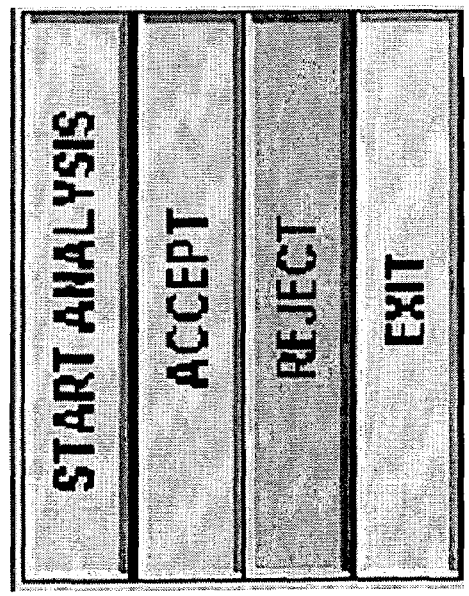
Figure 42
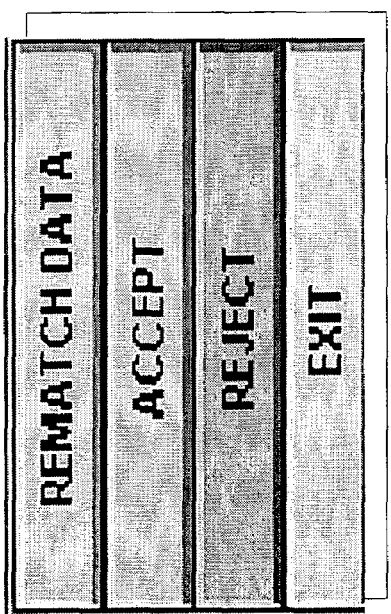
Figure 40
Figure 41

Figure 45

| Documentation | Source File | | | | | | | | | | |
|---|---|---|---|---|---|---|---|---|---|---|---|
| Project Engineer | Fred James | | | | | | | | | | |
| Analysis Type | SQI | | | | | | | | | | |
| Test Title # | Baseline | | | | | | | | | | |
| Model # | Model A | | | | | | | | | | |

Figure 43

CURSOR

Figure 44

| Analysis | Result |
|---|---|
| Characteristic #1 | 0.0600 |
| Characteristic #2 | 0.0350 |
| Characteristic #3 | 0.2250 |
| Characteristic #4 | 0.0200 |
| Characteristic #5 | 0.0650 |
| Characteristic #6 | 11.4141 |
| Characteristic #7 | 0.3050 |
| Characteristic #8 | 167.0800 |
| Characteristic #9 | 57.8200 |
| Characteristic #10 | 295.9000 |
| Characteristic #11 | 2.4600 |
| Characteristic #12 | 277.6013 |
| Characteristic #13 | -3.2023 |
| Characteristic #14 | -23.0300 |
| Characteristic #15 | 4.1048 |

SYSTEM AND METHOD FOR ANALYZING DATA

BACKGROUND OF INVENTION

The invention relates generally to systems and methods for analyzing data. More specifically, the invention relates to a systems and methods (collectively "the system") for automatically identifying an "event" in a data file.

Advances in information storage technology provide individuals, businesses, universities, think tanks, government agencies, research institutions, hospitals, and other types of organizations and entities with entirely new sets of challenges and opportunities. As the cost of data storage decreases, the amount of data being stored increases. However, the ability to effectively and efficiently analyze data has not kept up with the technology of capturing and storing data. It would be desirable for analysis tools to possess user-friendly interfaces that are easy to use, and yet are also computationally robust and comprehensive. It would be desirable for an analysis tool to be both highly automated and highly configurable.

The voluminous abundance of data provides a yet untapped opportunity to look for patterns, and perform various statistical analysis relating to those patterns. The undiscovered patterns in existing data could be the source of future insights in engineering, economics, medicine, computer science, business and other fields. The ability to identify and explore statistical correlations and other data relationships can be the key to effective problem solving and optimization. One significant barrier to such a harvesting of analysis is the inability to find the data you want when you want it. It would be desirable for a data analysis system to include some type of search tool to better facilitate access to meaningful data. It would be desirable for such a search tool to include the ability to perform statistical correlations in identifying particular events or patterns.

Pursuing data analysis from the ground up is a difficult task. The persons with the subject matter expertise often do not have the educational background in statistics, and the person with the background in statistics will often not have sufficient knowledge of the relevant subject matter. It would be desirable if a data analysis system could encapsulate patterns of data in the form of events. Persons with subject matter expertise, could then define the events that are of interest from a subject matter perspective, and apply automated statistical tools to those events (e.g. patterns of data). The ability to place "markers" in data files to mark the occurrence of various events, and perform automated processing based on those markers would also be desirable.

The inability of an analysis system to search data files for user-defined events in an automated way impedes the ability to conduct data analysis in a timely and efficient manner. There are many obstacles to such an automated system. The prior art does not appear to provide an analysis tool that provides comprehensive correlation and other statistical tools in a way that promote both meaningful flexibility and significant automation. When dealing with data in the time domain, data is typically stored at various different scales, so it would be desirable to adjust the scaling of data so that an "apples to apples" comparison can be made. Similarly, statistical fitting heuristics will possess different sensitivities given different sample sizes. Thus, it would be desirable for an analysis system to make corresponding adjustments in an automated fashion. The ultimate use of statistical analysis requires some sense of how strong the end results are. It would be desirable for an automated analysis system to provide some measure of a confidence value in the output of the system.

The prior art does not appear to disclose or even suggest that an analysis system can be both highly configurable and substantially automated. The goals are in direct conflict with each other, with an apparent zero-sum game being the end result. Those well rooted in data analysis typically sacrifice automation and ease of use to facilitate comprehensive functionality. Those focused on the subject matter at hand typically sacrifice flexibility and comprehensiveness to obtain the goals of ease of use and automation. Persons focused on the subject matter often fail to realize the analytical tools that at least theoretically exist. The possibility of a tool that is easy to use, highly configurable, and computationally comprehensive is not suggested in the art.

SUMMARY OF INVENTION

The invention is a system and method (collectively "the system") for automatically identifying the location an "event" in a data file.

A user of the system can associate various patterns of data with events, e.g. patterns of data can be labeled on the basis of what the pattern represents. The system can then look for the pattern in other data files, placing various "markers" in the various data files at the locations in which the pattern is found. Various correlation heuristics can be used to evaluate whether the analyzed data resembles the template data used to represent the event. Markers can be automatically placed at such locations. The marker location determinations can incorporate various weight factors set by the user, or by the system itself. Multiple markers can be used to mark a sequence of events, and the accuracy of marker placement can be optimized in the aggregate, across all marker locations.

Automated analysis can later be performed at those marker locations. Such automation can take into consideration the type of marker, and other characteristics. In embodiments involving time domain data, the automated time scaling of data can be performed. In some embodiments, markers can be subject to various sorting algorithms and confidence value calculations. Some systems may incorporate the automatic adjustment of fit sensitivity to compensate for differences in the size of data patterns and relevant portions of data.

The system can be implemented through various combinations of subsystems. A data subsystem can be used to capture and store data, both the sample data to be tested and the pattern data of user-defined events. An interface subsystem can be used to facilitate the configurability of the system, allowing the user to select from many options and to submit data of all types to the data subsystem. The interface subsystem can allow the user to define new events based on data found in the data subsystem. An analysis subsystem can identify sample data in the content system that resembles the pre-defined pattern data (e.g. template data for the event). The analysis subsystem can place markers at file locations where a pattern is detected, and invoke an automated analysis at those marker locations.

BRIEF DESCRIPTION OF DRAWINGS

The embodiments of a data analysis system and method (collectively the "system") will be described in detail, with reference to the following figures:

FIG. 3 is a flowchart illustrating one example of a process flow that includes event identification.

FIG. 4 is a flowchart illustrating one example of a process flow that includes marker placement.

FIG. 14 is a data chart illustrating one example of evaluation of a marker sort heuristic that can be incorporated into the system.

FIG. 24 is an example of a file format that can be used by the system to display the results of an analysis.

FIG. 29 is an example of a data operations interface that can be incorporated into the system.

FIG. 33 is an example of an analysis selection interface that can be incorporated into the system.

FIG. 40 is an example of control buttons that can be incorporated into a "manual" mode of the system.

FIG. 41 is an example of control buttons that can be incorporated into a "automatic" or "batch" mode of the system.

FIG. 42 is an example of a markers interface that can be incorporated into the system.

FIG. 43 is an example of a marker mover control that can be incorporated into the system.

FIG. 44 is an example of an analysis results display that can be incorporated into the system.

FIG. 45 is an example of a file documentation interface that can be incorporated into the system.

DETAILED DESCRIPTION

I. Introduction of Elements

Figure 1:
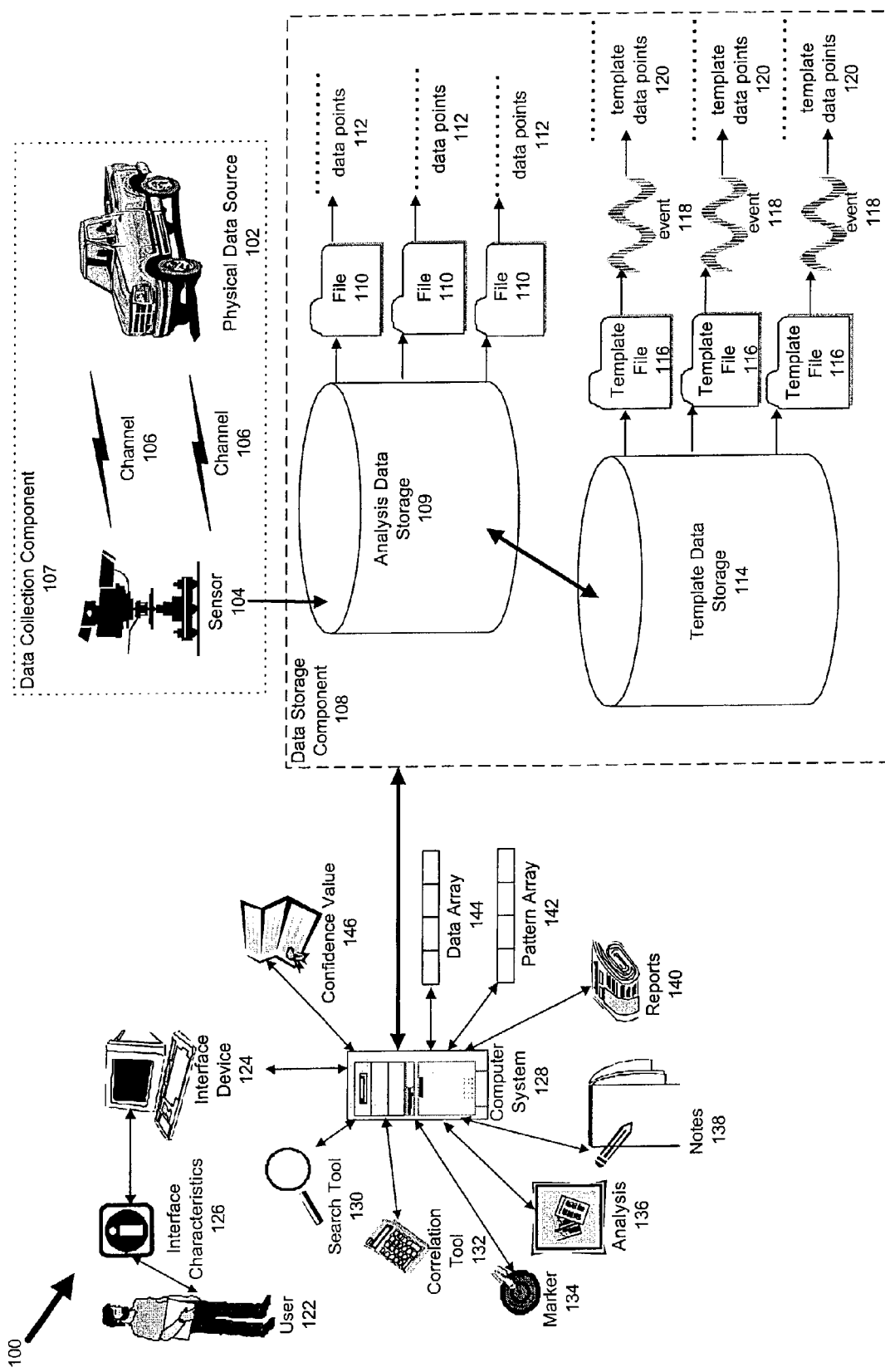
FIG. 1 is an environmental diagram illustrating an example of some of the elements that can be incorporated into the system.

FIG. 1 is an environmental diagram of a data analysis system and method (collectively the "system") 100. The system 100 provides a highly configurable and yet highly automated mechanism to analyze data.

A. Physical Data Source

A physical data source 102 can be potentially any object, measurement, or phenomenon in the physical world outside the system 100. The physical data source 102 can be the transmission system of a truck, a Petri dish filled with bacteria, unemployment numbers in the state of Michigan, a combustion engine, resistance in a wind tunnel, the radioactivity of a substance, the luminosity of a light source, earth quake frequency and/or severity, or any other characteristic that can be measured or represented in a quantitative manner. The system 100 does not require a physical data source 102 in order to function. Data can be imported to the system 100 from an extended chain of sources. Data can also be created by the system 100 itself. In some embodiments, the analysis of the system 100 is performed on simulated data, and such data has no physical data source 102. In some embodiments, data may be associated with a data type (a type of characteristic described by the numerical value) such as velocity, force, luminosity, revenue, or other attribute, even though the data was not captured from a physical data source 102. Pure numerical data without any data type attributes can also be processed by the system 100.

B. Sensor

A sensor 104 is potentially any device capable of capturing measurable characteristics from the physical data source 102. Sensors 104 can be cameras, motion detectors, radar, infrared beams, Geiger counters, and any other device capable of being used to generate data relating to the physical data source 102. Just as the system 100 does not require the existence of a physical data source 102, the existence of the sensor 104 is similarly optional. The system 100 can incorporate many different sensors 104 and many different combinations of sensors 104.

C. Channels and Data Types

A sensor 104 can capture data relating to the physical data source 102 through one or more channels 106. Channels 106 are any potentially any type of characteristic that is captured from the physical data source 102 through the sensor 104. Force, speed, position, torque, acceleration, kinetic energy, luminosity, heat, friction, blood pressure, lifespan, gestation period, revenues, IQ, and any other type of measurement can be a channel 106 incorporated into the system 100. Some channels 106 are directly measured by the sensor 104 ("direct channels" 106), while other channels 106 are derived from other channels 106 ("derived channels" 106). Kinetic energy is an example of a derived channel 106, because kinetic energy is calculated from the values of mass and velocity.

The system 100 can accommodate a wide variety of different channels 106. Embodiments of the system 100 that do not involve sensors 104 or physical data sources 102 will not involve channels. Other embodiments could utilize a far greater number of channels 106. In an embodiment of the system 100 used for transmission systems, the channels of force, speed, position, and torque are the preferred channels 106.

Channels 106 are not a required element for the functioning of the system 100. In a one channel 106 embodiment, it may not matter to the system 100 what type of data the channel 106 represents. In a pure statistical embodiment, there is no channel 106 and the numbers are processed as numbers without any association or relationship to a type of measurement. However, channels 106 can be helpful in an analysis because channels 106 can have relationships with each other. For example, position, velocity, and acceleration are related measures.

A single sensor 104 can capture sensor data across multiple different channels 106 in a substantially simultaneous manner. Thus, the different channels 106 may have relationships with each other. For example, a force channel and a toque channel may relate to the same physical data source 102 over the same increments in time.

Channels 106 correspond to data types. Embodiments of the system 100 that do not involve physical data sources 102 or sensors 106 can process data associated with various data types instead of channels 106. Force, speed, position, torque, acceleration, kinetic energy, luminosity, heat, friction, blood pressure, lifespan, gestation period, revenues, IQ, and any other type of measurement can be a data type associate with a numerical value that is processed by the system 100. In some embodiments of the system 100, data need not be associated with a channel 106 or data type.

D. Data Collection Component

A data collection component 107 is typically a grouping of the sensor 104 capturing data relating to the physical data source 102 through one or more channels 106. In some embodiments, the data collection component 107 is a simulation component that generates data from a model of a physical data source 102, but not an actually existing physical data source 102. Some embodiments of the system 100 do not have a data collection component 107.

E. Data Storage Component

A data storage component 108 is the aggregation of all data storage mechanisms that can provide data to the system 100. The data storage component 108 can be organized in many different ways. Databases, flat files, object-oriented programming objects, arrays, other types of data structures, and potentially any mechanism or method for storing data can be the data storage component 108 or part of the data storage component 108. The data storage component 108 can reside on CD-ROMs, floppy disks, hard drives, web servers, proxy servers, or potentially any other type of information technology mechanism.

There are typically two types of data stored by the system 100. One type is template data. Template data can also be referred to as pattern data or baseline data. The other type of data is analysis data. Analysis data can also be referred to as sample data, test data, or simply "data." In many embodiments, the distinction between analysis data and template data is a purely contextual or situational distinction. Template data can be analysis data from a previous analysis. Once analysis data has been analyzed, it can serve as template data for future analysis. Thus, there need not be a physical distinction between analysis data and template data, or between an analysis data storage 109 component and a template data storage 114 component. Any data that is to be searched in a particular context is data that resides in the analysis data storage 109 component.

If the data collection component 107 is part of the system 100, it is desirable that the data storage component 108 have an effective way to receive the data of the data collection component 107. A wide variety of different configurations are possible.

F. Analysis Data Storage

Analysis data is the data stored in an analysis data storage 109 component. Physically, the analysis data storage 109 component can vary as widely as the data storage component 18. Analysis data is the data being analyzed by the system 100. Analysis data can also be referred to as test data, actual data, physical data, sample data, or simply "data." The system 100 analyzes analysis data using template data, described below.

G. Analysis Data Files

The analysis data storage 109 is made up of one or more files 110. Files 110 can also be referred to as analysis data files, actual data files, test data files, physical data files, or sample data files. In preferred embodiments, files 110 may be incorporated into a hierarchy of folders and directories. In preferred embodiments, files 110 are in pre-defined and user-desired formats set by the administrator of the system 100. The uniform formatting of files 110 enhances the opportunity to facilitate the automated processing of the system 100.

H. Analysis Data Points

Each file 110 can be made up of one or more data points 112. Data points 112 can also be referred to as analysis data points, actual data points, test data points, physical data points, or sample data points. Data points 112 have a numerical value associated with each data point. In a preferred embodiment, data points 112 are also affiliated with at least one channel 106 or data type. A single data file 110 can have data points 112 associated with multiple different channels 106 or multiple different data types.

I. Template Data Storage

A template data storage 114 component can have as many different physical, logical, and functional variations as the analysis data storage 109 component or the aggregate data storage component 109. The template data storage 114 component can also be referred to as a pattern data storage 114 component or an event data storage 114 component. In some embodiments, template data storage 114 is a subset of analysis data storage 109.

J. Template Data File

The template data storage 114 is made up of one or more template files 116. Template data files 116 can also be referred to as template files, template files, event files, even data files, pattern files, and pattern data files. In preferred embodiments, template files 116 are incorporated into a hierarchy of folders and directories. In a preferred embodiment, template files 116 are created and stored in a pre-defined and user-desired format set by the administrator of the system 100. Adherence to standardized formatting facilitates the opportunity for system 100 automation.

The distinction between an analysis data file 110 and a template data 116 is purely contextual in many embodiments. Template data files 116 can be analysis data from a previous analysis. Once analysis data has been analyzed, it can serve as template data for future analysis. Thus, there need not be a physical distinction between analysis data files 110 and template data files 116. In a preferred embodiment, all data in the data storage component 108 is equally accessible and stored in a non-segregated manner. In some contexts, template data files 120 are simply a subset of data files 110.

K. Template Data Points

Each template file 116 can be made up of one or more template data points 120. Template data points 120 can also be referred to as pattern data points 120 or event data points 120. Template data points 120 have a numerical value associated with each data point. In a preferred embodiment, data points 120 are also affiliated with at least one channel 106 or data type. A single template data file 120 can have template data points 120 associated with multiple different channels 106 or multiple data types.

The distinction between analysis data point 112 and a template data points 120 is in many embodiments, a purely contextual or situational distinction. Template data points 120 can be analysis data points 112 from a previous analysis. Once analysis data has been analyzed, it can serve as template data for future analysis. Thus, there need not be a physical distinction between analysis data points 112 and template data points 120. In a preferred embodiment, all data in the data storage component 108 is equally accessible and stored in a non-segregated manner. In some contexts, template data points 120 are simply a subset of data points 112 and can be referred to as data points 112.

Template data points 120 and analysis data points 112 can be and represent time domain data points. Time domain data points can be used to analyze data over time. This can be useful in many different embodiments of the system 100, including vehicle transmission embodiments where the time domain data relates to a shift in the gears of the transmission of the vehicle.

L. Events

An event 118 is a pattern of template data points 120. Thus, events 118 can also be referred to as patterns 118. Patterns 118 can have as few as one template data point 112, or as many template data points 120 as desired. The number of template data points 120 in a pattern 118 can have repercussions with respect to fit sensitivity. Thus, it can be desirable to use different sized patterns 118 in different contexts. Patterns 118 are preferably defined by a user 122 (e.g. patterns 118 are preferably user-defined). A pattern size adjustment heuristic described in greater detail below can be used to adjust for differences in pattern size.

The system 100 can perform a wide variety of different search and correlation heuristics. In a preferred embodiment, the system 100 calculates a correlation or fit between one or more patterns 118 and the analysis data points 112. Patterns 118 can be created from past analysis data points 112, patterns 118 can be derived from data captured from physical data sources 102, or patterns 118 can be made up by the user 122 without any relationship to a physical data source 102. Patterns 118 can include template data points 120 relating to multiple channels 106. A single template file 116 can have multiple patterns 118.

M. Computer System

The data storage component 108 interfaces with a computer system 128. The computer system 128 can be a wide variety of different information technology devices and/or networks. Desktop computers, laptop computers, work stations, local area networks (LANs), wide area networks (WAN), servers, web pages, main frame computers, mini computers, and other devices can serve as computer systems 128 for the system 128. In some embodiments of the system 100, the computer system 128 and an interface device 124 are the same device. The computer system 128 houses much if not all of the programming logic needed to support the functionality of the system. The computer system 128 may directly house the data storage component 108, or may merely interface with the data storage component 108. The computer system 128 can include a wide variety of ancillary, supplemental, or related information technology devices.

N. Interface Device

An interface device 124 is any device capable of communicating with the computer system 128. Personal digital assistants (PDAs), cell phones, satellite pagers, standard telephones with a computer system 129 employing voice recognition technologies, desktop computers, laptop computers, work stations, local area networks (LANs), wide area networks (WAN), servers, web pages, main frame computers, mini computers, and other devices can serve as interface devices 124 for the system 100. In some embodiments, the computer system 129 and the interface device 124 are the same device.

O. User

A user 122 is typically a human being interacting with the system 100. In some embodiments, the user 122 can be an expert system, a robot, a neural network, or a computer employing artificial intelligence (collectively "intelligence technologies"). Users 122 interact with the system 100 by interacting with the computer system 128. Users 128 interact with the computer system 128 by interacting with the interface device 124. The interactions between the user 122 and the interface device 124 take the form of interface characteristics 126. In preferred embodiments, a skill level is associated with each user 122. The system 100 preferably utilizes skill level information in enabling or disabling the functionality of the system 100. Other embodiments may incorporate less sophisticated interfaces for users 122.

P. Interface Characteristics

An interface characteristic 126 is any action by the user 122 using the interface device 124 or any output of the interface device 124 made available to the user 122. Interface characteristics 126 can be either input characteristics or output characteristics.

Input characteristics are actions (or omissions) by the user 122 with respect to the interface device 124. Typed text, a click of the mouse, a selection in a drop down list box, the pressing of a button, the selection of a menu item, the scanning in of a document, speech into a voice recognition technology, or the failure of a user 122 to provide any input are each examples of input characteristics.

Output characteristics are any actions of changes by the system 100 that are accessible or observable through the interface device 124. Sounds; visual changes to the screen; printed reports; the recording of data on a CD, floppy drive, or other portable device; or any other form of output is one or more output characteristics.

The types of interface characteristics 126 that can be used by the system 100 are limited only by the types of characteristics 126 that can be processed by the interface device 124.

Q. Search Tool

The computer system 128 uses a search tool 130 to find the desirable any desirable data points 112 (both analysis and template), data files 110 (both analysis and template), and events 118. The system can incorporate a wide variety of different search tools 130. The types of search tools 130 that can be used will depend on the types of files 110 and the architecture of the data storage component 108. The search tool 130 performs an efficient search heuristic. In some embodiments, the search tool 130 can be used to perform a marker sort heuristic used to sort a marker 134 used to mark the location of the pattern 118 within the analysis data storage 109 component. The search tool 130 can also be used to search as well as sort markers 134.

The process of searching and the functionality of the search tool 130 is discussed in greater detail below. The search tool 128 can include the searching functionality found in file management systems. Files 110 can be searched on the basis of title, date of last update, author, a description, a subset of data within the file, or some form of meta data relating to the file 110. The search tool 130 can also include the functionality of identifying events 118 in the file 110. Thus, the search tool 130 can perform a variety of pattern searching heuristics, and can include a correlation tool 132. In a preferred embodiment of the search tool 130, only the N% of pattern fits are included in the search result. Although N can be any number from 0 through 100, a number such as 10 can be an effective way to focus on the key data.

R. Correlation Tool

The computer system 128 can use a correlation tool 132 to compare events 118 to the library of data points 112 making up the analysis data storage 109 component. The correlation tool 132 can perform a correlation-based pattern matching heuristic. Different variations or modifications of correlation heuristics can be incorporated into the system 100.

The fit sensitivity of such correlations can be adjusted on the basis of the size of the pattern. A fit sensitivity adjustment heuristic can perform such adjustments automatically. The correlation tool 132 can generate various confidence values associated with the identification of a correlation between an event 118 and data points 112 within the analysis data storage 109 component. The correlation tool 132 can also perform a target value weighing heuristic and an overall confidence value heuristic. Confidence values for each pattern match can be combined into an overall confidence value. Moreover, the confidence values of the correlation tool 132 can be compared to user-defined or system-defined minimum confidence thresholds. Determinations with insufficient confidence can be modified by the system 100, or flagged for approval by the user 122. Particular matches and even entire files 110 can be ignored when there is insufficient confidence to merit subsequent analysis.

The process of correlating data points 112 with events 118 and other statistical processing are discussed in greater detail below.

S. Markers and Marker Locations

A marker 134 is an identifying label that the system 100 places within the location of a data file 110 that possess data points 112 that correlate with a particular pattern 118. A single marker 134 can cover many data points 112 and those data points 112 can relate to more than one channel 106 of information. In a preferred embodiment, multiple markers 134 are used in tandem and the confidence values associated with marker placement are optimized in the aggregate, for all of the markers 134. Otherwise, the system 100 could make undesirable tradeoffs with respect to the placement of particular markers 134.

Markers 134 can be used to trigger certain types of automated analysis. Markers 134 can encapsulate information relating to the marker 134, as well as data points 112 at the identified marker location. Thus, in a preferred embodiment, markers 134 "know" what type of markers 134 they are, and they "know" certain characteristics of the underlying pattern 118, such as the number and types of channels 106. A fit adjustment heuristic can be used to that large numbers of markers 134 do not reduce the sensitivity because one marker 134 has a bad fit.

The process of setting markers 134, sorting markers 134, and performing analysis on the basis of markers 134 is discussed in greater detail below.

T. Analysis

Once marker 134 are in their marker locations, various forms of analysis 136 can be created by the system 100. Analysis 136 can be created through both manual and automated means. The different types of analysis that can be performed are discussed in greater detail below.

U. Notes

Some embodiments of the system 100 provide users 122 with the ability to document a note 138 directly into the system 100 such that the note 138 documents markers 134, files 110, or particular activities and/or configurations. Notes 138 are described in greater detail below.

V. Reports

The system 100 can be configured to create a wide variety of different reports 140. Some reports 140 are standardized, while others customized, while still others are ad-hoc one time only reports. Reports 140 are discussed in greater detail below.

W. Pattern Array

In order to compare analysis data points 112 with template data points 120, many embodiments of the system 100 will load the template data points 120 into a pattern array 142 (it can also be referred to as an event array) to facilitate processing. Pattern arrays 142 are discussed in greater detail below.

X. Data Array

In order to compare analysis data points 112 with template data points 120, many embodiments of the system 100 will load the analysis data points 112 into an analysis array 144 (it can also be referred to as a data array, an actual data array, a physical data array, a test data array, a fit array, or a sample event array) to facilitate processing. Data arrays 144 are discussed in greater detail below.

Y. Confidence Value

A confidence value 146 can be associated with any correlation calculation, marker location, or even aggregate marker locations associate with a file 110 or folder. A minimum confidence threshold can be used to automatically eliminate markers and even entire files with aggregate confidence values 146 that are lower than the applicable minimum confidence threshold. In other embodiments, the comparison of threshold value to confidence value 146 can be used to trigger other activities, such as the seeking of user 122 approval, the ability of users 122 to manually move the markers 134, or other processing options. The various minimum confidence thresholds can be user-defined, or set by the system 100. The minimum confidence threshold can also be part of a marker configuration, as described below.

II. System Overview

Figure 2:
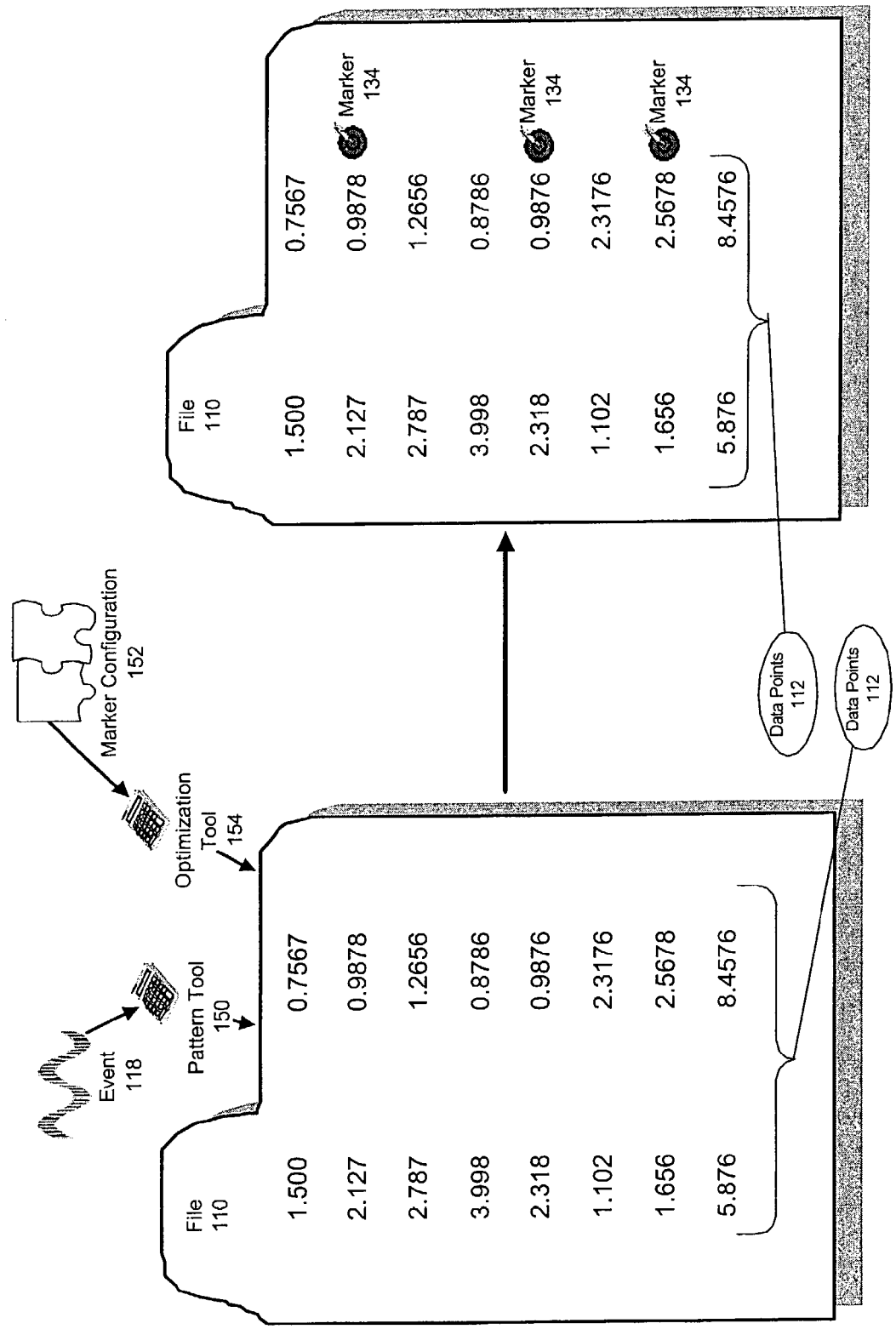
FIG. 2 is a block diagram illustrating an example of the elements used by the system to automatically identify event locations in a data file.

FIG. 2 is a block diagram illustrating an example of the elements used by the system 100 to automatically identify event 118 locations in a data file 110. Data points 112 in the data file 110 on the left side of FIG. 2 are evaluated for matches to the template data points 120 encapsulated in the one or more events 118. Markers 134 can then be placed at those data point locations where matches to the one or more events 118 are found. The file 110 on the right side of FIG. 2 is an illustration is an example of a file 110 with markers 134 at the locations of the pattern matches. Although not disclosed in FIG. 2, the system 100 can identify event locations in multiple files 110 at the same time.

The process of placing automatically placing markers 134 without human intervention can utilize the inputs of one or more events 118 a pattern tool 150. In multiple event 118 embodiments, the system 100 can also incorporate the inputs of an optimization tool 154 and a marker configuration 152.

The pattern tool 150 uses one or more events 118 as in input, and identifies marker 134 locations by performing a pattern matching heuristic on the file 110. A pattern matching heuristic is potentially any process by which a pattern 118 can be identified. A wide variety of different pattern matching heuristics can be incorporated into the system 100. In a preferred embodiment, the pattern matching heuristic is some type of correlation heuristic. In some embodiments, the pattern tool 150 is part of the search tool 130. A subset of pattern tools 150 are correlation tools 132.

Marker configurations 152 can be used by the system 100 when there are multiple markers 134 being fitted to the data 112 in a file 110. The marker configuration 152 typically includes the number of markers 134 and labels or names for the particular events 118. The marker configuration 152 can also include minimum confidence value thresholds, predefined types of subsequent analysis, a marker sequence (e.g. the order of the markers 134), variations with respect to data types and channels 106, search criteria, a "top N %" selection, and other potentially relevant or useful characteristics.

An optimization tool 154 can be used to optimize marker 134 placements in situations involving multiple markers 134. Thus, the marker configuration is a desirable input for the optimization tool. The optimization heuristic performed by the optimization tool 154 is described in greater detail below. The optimization tool 154 allows the system 100 to optimize the aggregate placement of markers 134. Otherwise, the system 100 may make undesirable tradeoffs, such as improving marker 1 by X %, while reducing the desirability of one or more other markers 134 by a factor that exceeds X %.

If a weight adjustment is incorporated into the system 100, the optimization tool 154 should take into account the weight adjustment in optimizing marker 134 placement. The optimization tool 154 can be part of the search tool 130, the correlation tool 132, or the pattern tool 150.

In the example illustrated in FIG. 2, there are two rows of data points 110, with each row associated with a different channel 106 and data type. In a multiple data type of channel 106 embodiment, markers 134 are preferably placed on a row-by-row basis and not a point by point basis. However, in alternative embodiments, the marker configuration 152 is sufficiently flexible to permit point-by-point marker 134 locations.

The system 100 can incorporate a wide variety of different heuristics in performing the functionality disclosed in FIG. 2. A wide variety of different pattern matching heuristics can be incorporated into the system 100. In some embodiments, each template data point 120 in the event 118 is used in the heuristic. In other embodiments, some template data points 120 can be excluded in a desire to ignore and exclude "white noise." If the number of analysis points 112 is not equal to the number of template data points 120, the extra data points can be removed from consideration. Pattern matching heuristics can be usefully invoked even if the channels 106 and data types making up the events 118 do not match the channels 106 and data types in the analysis data points 112.

In preferred embodiments, the pattern matching heuristic (s) incorporated into the system 100 are some type of a correlation heuristic. A wide variety of different correlation calculations and correlation heuristics can be incorporated into the system 100. An automated marker sort heuristic can be performed by the system 100 in order to better evaluate the "fit" of the selected marker 134 locations. Confidence values 146 can be generated for each individual marker location, as well as for the aggregate placement of all markers 134.

In comparing analysis data 112 to template data 120, the system 100 can invoke an automated time scaling heuristic. For time-domain data, the system 100 can adjust the time units/scale of either the analysis date 112 or the template data 120 so that the time units/scale of the analysis data 112 matches that of the template data 120. The automated time scaling heuristic utilizes a scaling adjustment so that the system 100 is comparing "apples to apples" or "oranges to oranges."

In an effort to create characteristics for pattern matching that are of greater or particular interest to the user 122, the system 100 can invoke a weighing heuristic. Different characteristics of the data points 110 can be weighed differently in determining marker locations. The parameters of the weighing heuristic can be part of the marker configuration 152. Multiple weight factors can be applied to a single sequence of events 118. Multiple weight factors can be applied to a single event 118.

The heuristics and processes discussed above and below can be invoked and performed by various subsystems and modules making up the system 100.

III. System-Level Processing

The system 100 is highly configurable, and can incorporate a wide variety of different process flows for automatically identifying events 118 in one or more data files 110.

A. Process Flow 1

FIG. 3 is a flow chart illustrating one example of the process flow that can be implemented by the system 100.

At 160, a user 122 defines an event 118 using template data points 120. Template data points 120 can be imported from a file or a network. Template data points 120 can be inputted by the user 122 through the interface device 124. Template data points 120 can be analysis data points 112 from a prior analysis. Events 118 can include a wide variety of different data types and channels 106. Events 118 can also be organized into sequences or configurations of events 118 that correspond to the marker sequences or configurations 152 discussed above.

At 162, the user 122 accesses the analysis data storage 109 component to identify potential matches of one or more events 118. Various tools and heuristics can be used by the system 100 to access files 110. In some embodiments, after file is accessed, the relevant data points 112 are loaded onto a data array 144 and template data points 120 into a pattern array 142. The data array 144 and pattern array 142 can be used to calculate a correlation value between the analysis data points 112 and template data points 120. The analysis data points 112 selected by the user 122 can be associated to many different channels 106 and data types, or can be defined as pure numbers not associated with any type of data type.

At 164, the one or more events 118 in the data file 110 are located. This step can be performed in a fully automated manner. In some embodiments involving minimum confidence values or other threshold values, certain contexts can be flagged for the purpose of manual intervention by the user 122.

Markers 134 can be placed at the appropriate locations within the file 110 or files 110 containing the data points 110. Numerous heuristics discussed above and below can be incorporated into the step at 164. A weighting heuristic can incorporate particular adjustment weights to the pattern matching process. Events 118 in the time domain can be scaled automatically and without human intervention, to match the time scale of the analysis data points 112, or vice versa. Various marker sort heuristics can be used to evaluate the fit of the markers 134 with the analysis data 112, on a marker by marker basis as well as an overall aggregate basis. Confidence values 146 can also be calculated on a marker-by-marker or on an aggregate basis. A fit sensitivity heuristic can be used to adjust the fit sensitivity for the number of data points 112 associated with the event 118. Various analysis heuristics can be automatically invoked at particular marker 134 locations. Such analysis heuristics can differentiate markers 134 on the basis of the characteristics of the marker configuration 152. Other examples of relevant heuristics are described both above and below.

It may be desirable for a user to exclude certain data points 112 or certain template data points 120 for the step at 164. For such embodiments, an excluded array can loaded with the points to be excluded. Treating the excluded array as a matrix in linear algebra, linear algebra calculations could be used to remove the excluded array from the data array 144 and/or pattern array 142.

The processing at 160, 162, and 164 can take place in several different modes of operation. In a preferred embodiment, the processing mode can be either manual, automatic, or batch. These modes are described in greater detail below. Different processing rules can be associated with different operational modes. System 100 processing can also include the setting of a user skill level. In some embodiments, the user skill level can be associated with their login ID. In other embodiments, skill level can be self-selected. In still other embodiments, the system 100 can base skill level on the user's experience with the system 100. Alternative embodiments may involve the objective evaluation of the user's skill by the system 100.

B. Process Flow 2

FIG. 4 is a flowchart illustrating one example of a process flow that includes the placement of markers 134 at marker locations. In a preferred embodiment, multiple markers 134 are placed automatically by the system 100 without human intervention after the event 118 is selected and a determination to place markers is made.

At 166, analysis data points 110 are accessed. In some embodiments, this step is performed after the step of event definition at 108. The search tool 130 can be used to select the directories, folders, and files 110 to be accessed within the analysis data storage 109 component. In some embodiments, the analysis data points 112 are loaded onto the data array 144.

At 168, one or more events 118 are either selected and/or defined on the system 100. In some embodiments, the marker configuration 152 is also received by the interface device 124 at 166. The type of pattern matching heuristic can preferably be selected at 168, if the user 122 is free to choose one of multiple approaches. Pattern data points 120 can be loaded into the pattern array 142 for the purposes of comparing the data to the analysis data points 112 in the data array 144. If desirable, the user 122 can be given the option of allowing the system 100 to adjust the subsequent pattern matching heuristic for the size of the pattern 118. A fit sensitivity value for use in a fit sensitivity heuristic can be incorporated into the marker configuration 152.

At 170, the system 100 determines whether the data points 112 subject to the search, match the event 118 or multiple events 118 defined at 168. A wide variety of pattern matching heuristics can be used at 170. In a preferred embodiment, some type of correlation heuristic is used. With multiple event 118 embodiments, all events 118 are preferably at least tentatively identified at 170. Each event identification can be associated with a confidence value 146 calculated by the system 100. An overall confidence value 146 can be calculated for determining the reliability of the aggregate event 118 identifications. The various confidence values 146 can be compared to threshold values set by the users 122 or by the system 100. The template data and analysis data being compare at 170 need not possess the same number or types of channels 106, although identical channels 106 can be desirable in certain circumstances. Thus, the number of channels 106 in the analysis data points 112 may be only two, while nine channels 106 existing within the definition of the event 118. In some embodiments of the system 100, the user 122 can set an "always rematch" flag to yes. In such embodiments, if the "always rematch" flag is set to yes, the system 100 can automatically trigger the pattern recognition to invoke the process at step 170, and continue with the processing in FIG. 4.

At 172, the system 100 optimizes the placement of markers 134 at the tentatively identified marker locations. An optimization heuristic can be used to optimize the overall fit of the various markers 134. Different weights can be attributed to different factors involved in the optimization process.

At 174, the markers 134 are actually placed at the final optimized marker locations. The system 100 can generate various analysis 136 and reports 140 using the data encapsulated at the marker locations. The analysis 136 can manual processes defined by the user 122. Analysis 136 can also be generated automatically in accordance with pre-defined processing rules incorporated into the system 100. Such processing can take into consideration the specific characteristics of the marker configuration 152 and the data points 112 encapsulated in the identified event 118.

IV. Subsystem-Level View

Figure 5:
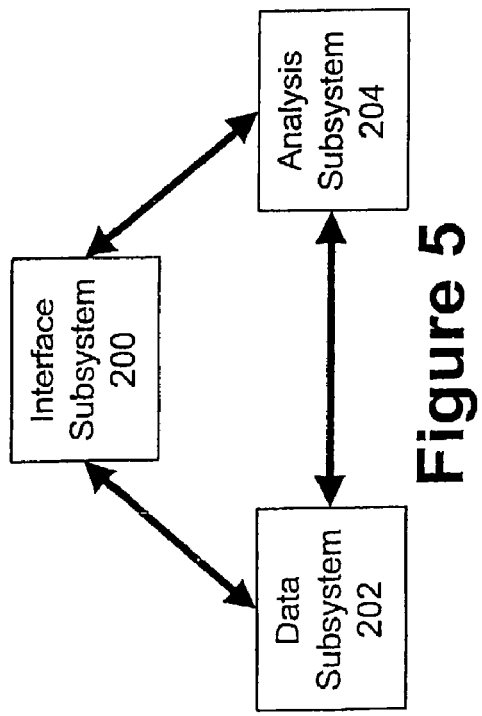
FIG. 5 is a block diagram illustrating an example of a subsystem-level view of the system.

FIG. 5 is a block diagram illustrating an example of a subsystem-level view of the system 100. As shown in the diagram, each subsystem can directly interact with any other subsystem.

A. Interface Subsystem

An interface subsystem 200 is responsible for interactions between the user 122 and the system 100. A wide variety of interface devices 124 can be used to perform the functions of the interface subsystem 200. In preferred embodiments, the interface subsystem 200 includes a user-friendly graphical user interface that can be exercised through a platform-independent browser over the Internet. The interface subsystem 200 can also be referred to as an input subsystem, because the interface subsystem 200 is responsible for capturing all input characteristics.

The interface subsystem 200 can capture a wide variety of input characteristics, as identified above. The interface subsystem 200 can be used to create and define events 118 by selecting already existing data points 112 (including template data points 120), or by simply entering in new data points and data characteristics. Data can be downloaded or imported from other sources, using the interface subsystem 200. Any activity that is guided, controlled, influenced, accessible, or viewable by the user 122 occurs through the interface subsystem 200. Events 118 can include multiple data points 120 which span multiple channels 106 and multiple data types across multiple files 110.

In some embodiments, users 122 are classified as beginners, intermediate users, or advanced users. Such classifications can use the selection of the user 122 to determine skill level in some embodiments. In other embodiments, skill level can be associated with log-in information, while in other embodiments, skill level could be objectively determined through experience with the system 100. In all embodiments, the skill level determination will be based on one or more input characteristics. The skill level indicator can be used as the basis for enabling and/or disabling certain functionality and menu options.

The interface subsystem 200 can invoke other subsystems such that those other subsystems function automatically and without human intervention.

B. Data Subsystem

A data subsystem 202 is the subsystem than includes the data storage component 108 and the data collection component 107. Thus, the data subsystem 202 can include a potentially voluminous number of data files 110, data points 112, template files 116, template data points 120, and events 118. Multiple data collection components 107, with each data collection component 107 involving multiple sensors 104, channels 106, and physical data sources 102, can be incorporated into the data subsystem 202. The data subsystem 202 can also be referred to as a content subsystem, because the data subsystem 202 includes all of the data content of the system 100.

In a preferred embodiment, all files 110 (including template files 116) are in some type of pre-defined format. Such pre-defined formats can be user-created. Events 118 within the data subsystem 202 can have as few as one template data point 120 and as many as hundreds or even thousands of template data points 120 depending the type of data and the power of the computer system 128. Events 118 can relate to and be defined in accordance with many different channels 106 because the various template data points 120 associated with and making up the event 118 can be associated with different channels 106.

Various markers 134 can be placed in various marker locations within the data subsystem 202. However, an analysis subsystem 204 can control the determinations of marker locations and the calculations and processing based on those locations.

C. Analysis Subsystem

An analysis subsystem 204 is responsible for: performing any search heuristics; performing correlation heuristics; identifying matches between the event 118 and the analysis data; determining where markers 134 should be placed; and performing processing utilizing the markers 134 and marker locations.

The analysis subsystem 204 searches the data subsystem to search for matches, e.g. analysis data points 112 indicative of an event 118. Markers 134 can be placed on such locations of analysis data points 112, so that additional calculations and processing can be automatically invoked without human intervention.

Marker locations can be identified by performing a correlation-based matching heuristic, or other types of correlation heuristics. In a preferred embodiment, a confidence value 146 is associated with each marker 134. In some embodiments, an aggregate confidence value can be associated with a file 110 or even a folder.

In order to compare data points 110 and evaluate or even find matches (e.g. matches are "events" 118 in the analysis data), the analysis subsystem 204 can load the pattern or event data points 120 into the pattern array 142 and load the analysis data points 112 into the analysis data array 144. The analysis subsystem 204 can correlate data points 112 relating to multiple channels 106 in finding and evaluating matches.

Comparing and correlating the data can be easier when the data is stored in arrays. Only subsets of the analysis data and template data should be loaded into arrays at any one time. Typically, no more than a single analysis file 110 and a single template file 116 should be loaded into arrays. The correlation functionality of the analysis subsystem 204 can be performed by a correlation module discussed in greater detail below.

D. Pattern Subsystem

Figure 6:
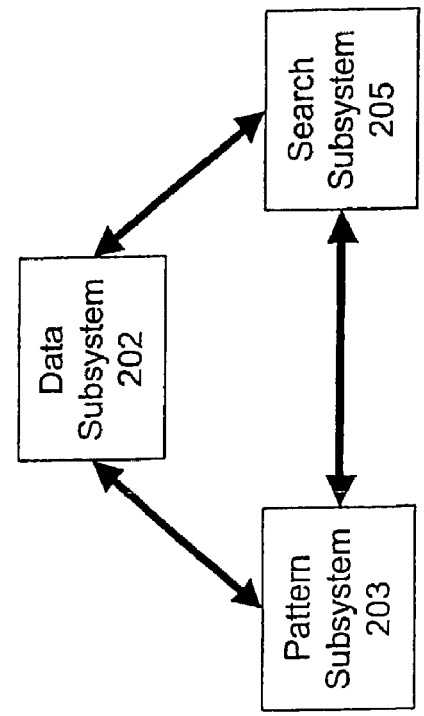
FIG. 6 is a block diagram illustrating a different example of a subsystem-level view of the system.

FIG. 6 illustrates an example of a subsystem view exemplifying a different example of a subsystem-level configuration. A pattern subsystem 203 can be incorporated into the system 100. The pattern subsystem 203 is responsible for storing all template data points 120, events 118, template data files 116, and the template data storage 114 component. As discussed above, events 118 can be defined from input characteristics. In some embodiments, the pattern subsystem 203 can be responsible for the configuring and invoking of the various pattern matching heuristics that can be incorporated into the system 100. In other embodiments, a search subsystem 205 is responsible for performing pattern matching, and the pattern subsystem 203 is limited to the creation, modification, and analysis of the events 118.

E. Search Subsystem

A search subsystem 205 can be used to perform any of the functions of the search tool 130 discussed above. The search subsystem 205 can be used to identify files 110 in the data storage component 109 that are desired for pattern matching. A search result can be based on a wide variety of search criteria, including a correlation with the template data points 120 in the event 118. Pattern matching can also be performed by the search subsystem 205. The search subsystem 205 can identify multiple locations in one or more data files 110 indicative of events 118 across multiple data channels 106 or data types.

V. Module-Level View

Figure 7:
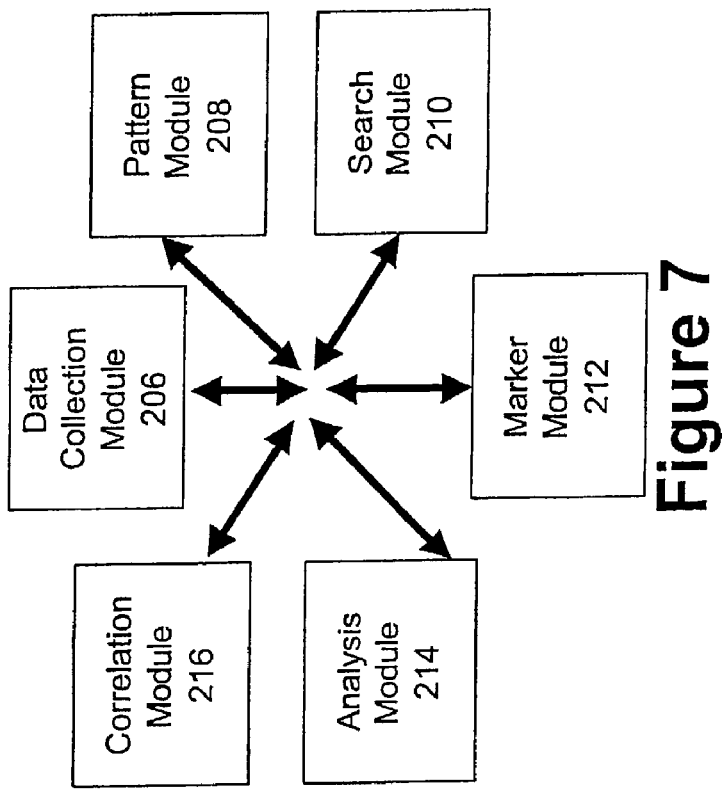
FIG. 7 is a block diagram illustrating an example of a module-level view of the system.

FIG. 7 is a block diagram illustrating an example of a module-level view of the system 100. As is indicated in the diagram, any module can directly interact with any other module making up the system 100. The system 100 need not possess each of these modules to function. In many embodiments, system functionality can be aggregated together in a lesser number of modules. For example, the functionality of the analysis module, patterns module, and correlations module could be combined into a single analysis module.

A. Data Collection Module

A data collection module 206 is part of the data subsystem 202, and includes the data collection component 107, if such a component exists for the particular system 100. The data collection module 206 can include many different types of sensors 104, with each sensor 104 capable of capturing a wide variety of different sensor data through a wide variety of different channels 106. The data collection module 206 can be responsible for generating data points 112 and data files 110 from sensor data. Each data point 112 can be associated with at least one channel 106.

In various vehicle transmission embodiments of the system 100, the sensor data can be transmission shift data from multiple shifts captured in a simultaneous or substantially simultaneous manner. Sensor data originating from different transmission can also be included.

Data collection is described in greater detail above and below.

B. Pattern Module

A pattern module 208 can be responsible for creating, modifying, and storing events 118 (e.g. patterns of template data points 120). Input characteristics received through the interface subsystem 200 can be sent to the pattern module 208 in order to create, define, modify, or delete events 118. The pattern module 208 can be used to populate the pattern array 142 with template data points 120.

Pattern 118 processing is described in greater detail below.

C. Search Module

A search module 210 can include various tools for navigating the data storage component 108, identifying particular files 110, and for identifying patterns 118 in particular files 110. The search module 210 can include both search tools 130 and correlation tools 132.

1. Search Tools

Search tools 130 in the search module 210 can be used to navigate through the data subsystem 202 using various search criteria and other methodologies. A single search result can include more than one file 110, and even more than one folder. The scope of the search can be configured by the search module 210. For example, the search could be limited to a particular folder or directory, or the search could include the entire data storage component 108. The search tools 130 of the search module 210 can perform various file management functions within the data storage component 108. Search tool 130 functionality is described both above and below.

2. Correlation Tools

In some embodiments, various correlation tools 132 within the search module 210 can perform various correlation heuristics to identify events 118 in analysis data. In some embodiments, the search module 210 loads the data array 144, and compare the data array 144 with the template data array 142. In such embodiments, the search module 210 also generates the applicable confidence values 146.

In a vehicle transmission embodiment, the search criteria or data types of the correlation tools 132 can include a shift time, an engagement bump, and a shift impulse, as well as other characteristics relating to transmission performance. Correlation tool 132 functionality is described both above and below.

D. Marker Module

A marker module 212 can be used to place, monitor, modify, sort, and move markers 134. The marker module 212 can place a marker 134 at a marker location within the analysis data storage 109 component. In some embodiments, the calculation of the confidence value 146 is performed by the marker module 212. The results of a marker sort heuristic can be used by the analysis subsystem 204 to perform the analysis calculations generated by that subsystem.

In a preferred embodiment, the marker module 212 includes a marker interface (part of the interface subsystem 200) which can be used by users 122 to accept or reject marker locations. Markers 134 can also be manually moved by users 122. Different weight adjustments can be applied to different characteristics in evaluating the desirability of a particular marker 134 placement.

Marker 134 functionality is described in greater detail below.

E. Analysis Module

An analysis module 214 can be used to perform correlation calculations, generate confidence values 146, and generate subsequent calculations and processing at marker locations. The primary responsibility of the analysis module 214 is to perform analysis calculations at marker locations. Those calculations are performed using the characteristics of the data points 112 at those marker locations.

A reporting tool within the analysis module 214 can be used to automatically generate certain types of reports based on the characteristics of the marker 134, such as the channels 106. In a preferred embodiment, the reports of the report tool are highly configurable and highly automated, allowing for manual intervention as desired by the user 122.

The analysis module 214 can include a "track changes" tool for determining that all the data files 110 meet one or more selected criteria. The analysis module 214 can be configured to automatically load information from first data file 110 included in the search results. The software would then compare these items with the settings in each new data file. If a difference occurred, a warning message would be displayed. In Auto or Batch modes, the file would be rejected from the analysis. Other modules within the system 100 could be used to house the track changes utility tool.

Analysis 136 functionality is described in greater detail below.

F. Correlation Module

A correlation module 216 can be used to exclusively isolate the performance of correlation heuristics to a single module. The various correlation heuristics can be performed between pattern arrays 142 and data arrays 144, although such data need not be within the structure of arrays. Other data structures can be used, including data base tables, object-oriented objects, etc. The calculation of confidence values 146 can be performed by the correlation module 216. The correlation module 216 can perform a fit sensitivity heuristic to automatically adjust for the number of template data points 120 in an event 118. A target weighing heuristic can also be performed by the correlation module 216.

Some examples of correlation heuristics are described in greater detail below.

VI. Component-Level View

A. Ancillary Components to the Analysis Component

Figure 8:
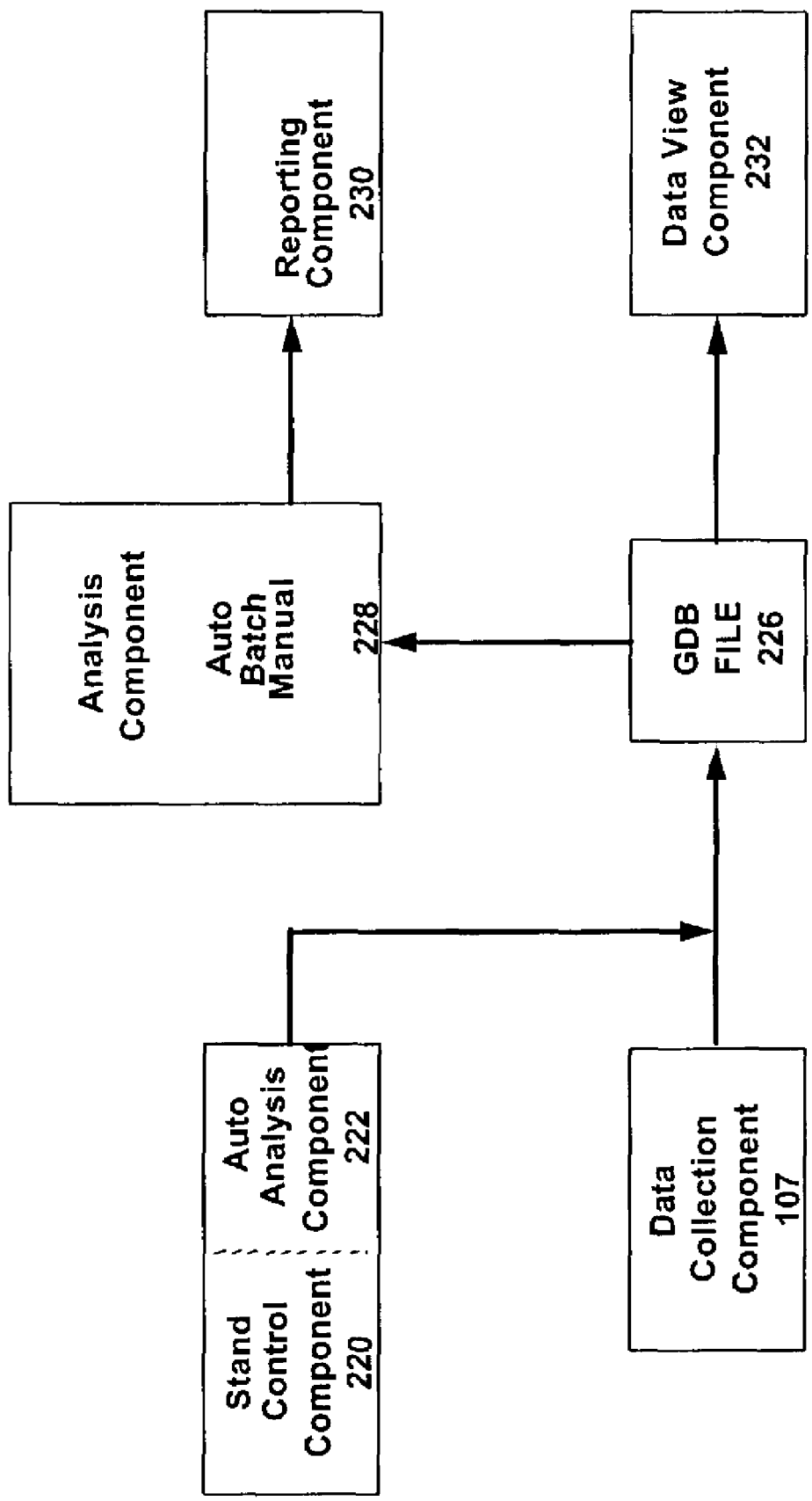
FIG. 8 is block diagram illustrating an example of a component-level view of the system.

FIG. 8 is block diagram illustrating an example of a component-level view of the system 100. For the purposes of example, the components in the Figure are incorporated into a vehicle transmission embodiment of the system 100. Other physical data sources 102 can involve different component-level configurations.

A stand control component 220 controls the physical test cell, e.g. the sensor 104 and the physical test data source 102. This component interfaces with the system 100 and the sensor 104 used by the system 100.

An automatic analysis component 222 performs analysis of the data set generated by the stand control component 220. The software for this component can be taken from or integrated with an analysis component 228.

The basic operation of the automatic analysis component 222 can be to collect data in the background. This component may vary widely from embodiment to embodiment, depending on the nature of the physical data source 102. The shift finishes and data collection returns to the background rate. The analysis component 228 will fit markers 134 to the data points 110. The data files 110 and marker 134 information should be saved to a file with in pre-defined file format. Such a file 110 can be referred to as a general data binary ("GDB file"). Some statistics are calculated and updated based on marker placement. The software can wait until it is time to capture the next sequence of sensor measurements, then the cycle repeats. Sensor cycles can repeat at pre-scheduled intervals.

A data collection tool 224 is the actual device within the data collection component that converts sensor data into data files 110 for use by the system 100. In a preferred embodiment, the data collection tool 224 converts sensor data into a data points 110 in a file format that has been pre-defined (e.g. standardized) to allow to maximum flexibility and automation.

A file in a pre-defined file format (e.g. a GDB file) 226 should be used to store all data points 112. The particular format used will depend on the type of data being analyzed by the particular embodiment of the system 100. GDB files 226 are the inputs for the analysis component 228.

A data view component 232 can be used to look at raw data files 110 as well as analyzed or processed data files. The data view component 232 can be as simple as a general purpose text editor in some embodiments. In other embodiments when more formatting is involved, various types of filters, frames, or views can be required.

An analysis component 228 is described in greater detail below. As indicated in the Figure, the GDB file 226 is the source of data for the analysis component 228 and a reporting component 230 is receiver of the output.

A reporting component 230 can be used to automatically generate reports 140 from the output of the analysis component 228. In vehicle transmission embodiments, the reporting component 228 is intended to produce reports 140 that combine data from multiple shifts, or potentially even multiple transmissions. The system 100 can bring cross transmission data into a commercially available spreadsheet program for processing.

B. Analysis Component

1. Modes of Operation

An indicated in FIG. 8, the analysis component can have various modes of operation. In a preferred embodiment, it will have three modes of operation, automatic ("AUTO"), "BATCH", and "MANUAL".

In "AUTO" mode the user 122 will select a directory. As files 110 appear in the directory, the data is analyzed and the results displayed. The software in the analysis component 228 wait for new files to show up until the user terminates the program or selects a different mode of operation, such as BATCH or MANUAL. This mode may prompt for a directory path and a sample GDB file name and path. A browse function should be provided to aid in these selections. This mode is intended for providing "Live" feedback while collecting data from a physical data source 102. In alternative embodiments, AUTO mode can perform a wide variety of different processing rules. In some embodiments, the system 100 can grab every file 110 in a particular directory and such directories can have multiple files. In other embodiments, each file 110 may belong to its own folder or directory. In some embodiments, the original file 110 is deleted, and replaced with a processed file. In other embodiments, processed files are saved under a different name (preferably using some sort of naming convention), so that the original file 110 is not deleted.

There need not be a standard file naming convention, although such a practice may be preferable. If there is no standard file naming convention, the analysis component 228 will not be able to predict the name of the file 110 when a new data file 110 is added to the directory. However, the software in the analysis component 228 can identify the file 110 by the last modification date or some other means.

In "BATCH" mode the user 122 must manually select one or more files 110 to be analyzed. The system 100 will then automatically perform the requested analysis on all the selected files 110 and end.

In "MANUAL" mode the user 122 must manually select one or more files 110 to be analyzed. The system 100 will then process the first file and display the results. The user 122 may then accept the results, reject the data set, rematch the data, manually reposition the markers 134, or change any of the analysis settings. In a "MANUAL" mode, the system 100 is processing in real time.

If any of the analysis settings are changed, the data should be reprocessed automatically with the new settings and the results displayed. Selecting and exiting any of the menu items from a menu interface, even if no changes were made, should cause the data to be reprocessed. Pushing a "start" or "recalculate" button on the main screen (e.g. main interface) can cause the data to be reprocessed. The button can be required to reprocess the data when the marker positions (e.g. marker locations) have been manually changed.

This process will be repeated until the results are accepted or rejected by the user 122. If the results are accepted, the results will be written to the output file/files and the next data file in the list will be used to repeat to the process. If the data is rejected, the analysis results will not be written to the output file/files and the next data file will be selected to continue the process.

2. Program Startup

On startup the system 100 can determine the current directory and load a startup file from this directory. This will allow the software in the computer system 128 to be installed in a wide variety of different devices.

The software will begin by loading the startup file. This file contains the full file paths for the last selected configuration files. This will return the system 100 to the last settings formally saved to these configuration files. When building a "new" configuration, you are actually loading a configuration that is called "New" that has been populated with default values. This entire configuration can be write-protected. This means the user 122 may use "Save As" to save it under a new name before any pattern files can be created.

The menu bar will be disabled with the exception of the File menu selections. The user 122 is required to select at least one data file for analysis before the rest of the selections are available.

When the user 122 has completed selection of one or more files 110, the first file 110 selected will be read into memory. The data set will be checked for the optional data channel 106 named "Marker." If this channel 106 is found, it can be deleted from the current data set in memory.

The software making up the analysis component 228 can then compare the list of previous input channels with the list of channels in the first GDB data file. If the channel lists do not match, an error message will be displayed. The user 122 should be allowed to elect to continue, if possible. Otherwise, the analysis settings must be edited before continuing.

If the previous mode was Manual, the analysis of the first file will begin automatically and the results displayed.

If Batch or Auto was the previous mode, then the analysis will not begin until the user 122 activates the Start button.

C. Sub-Components of the Analysis Component

Figure 9:
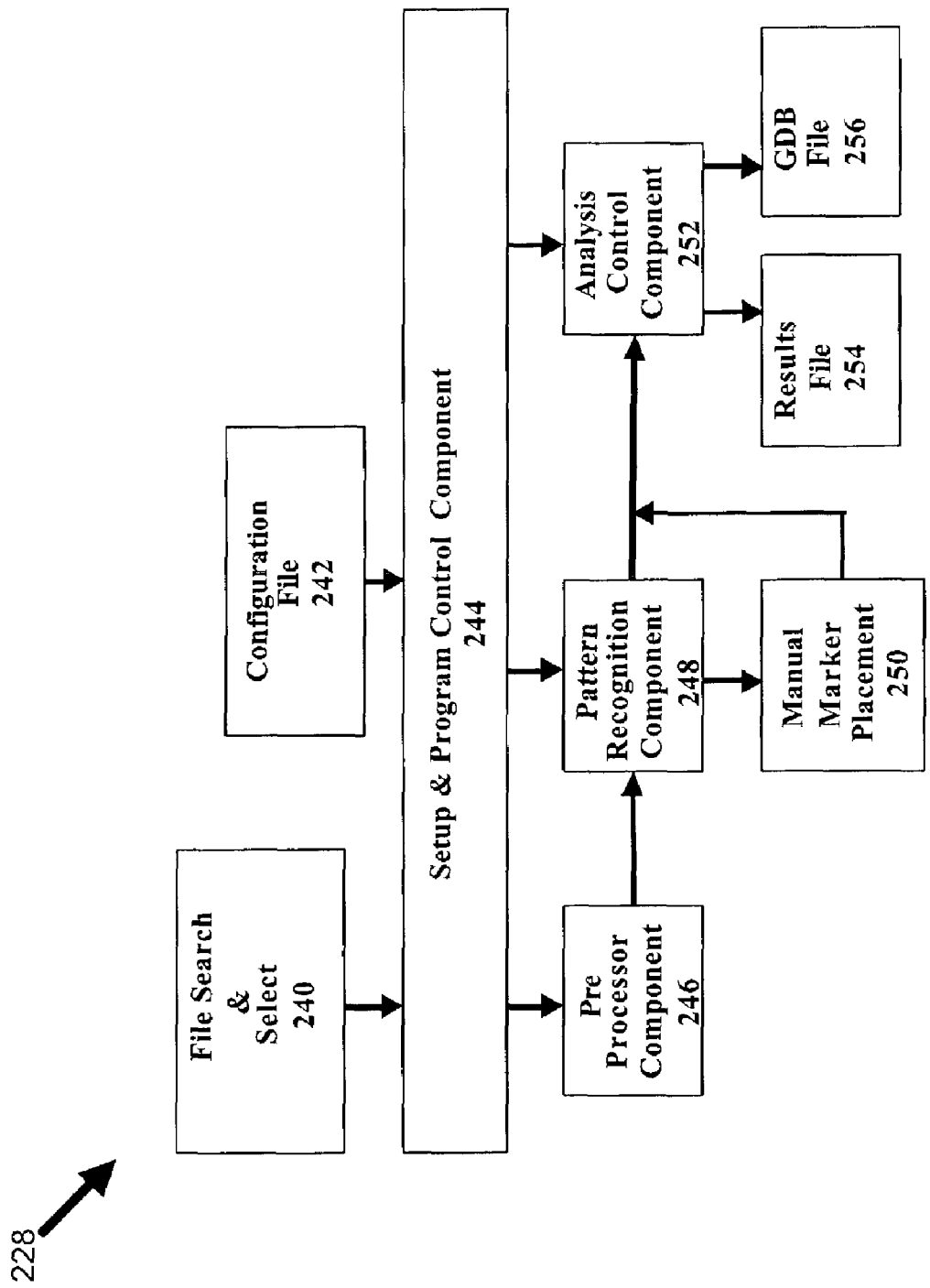
FIG. 9 a block diagram illustrating an example of the logical operations that can be performed by the analysis component.
Figure 10:
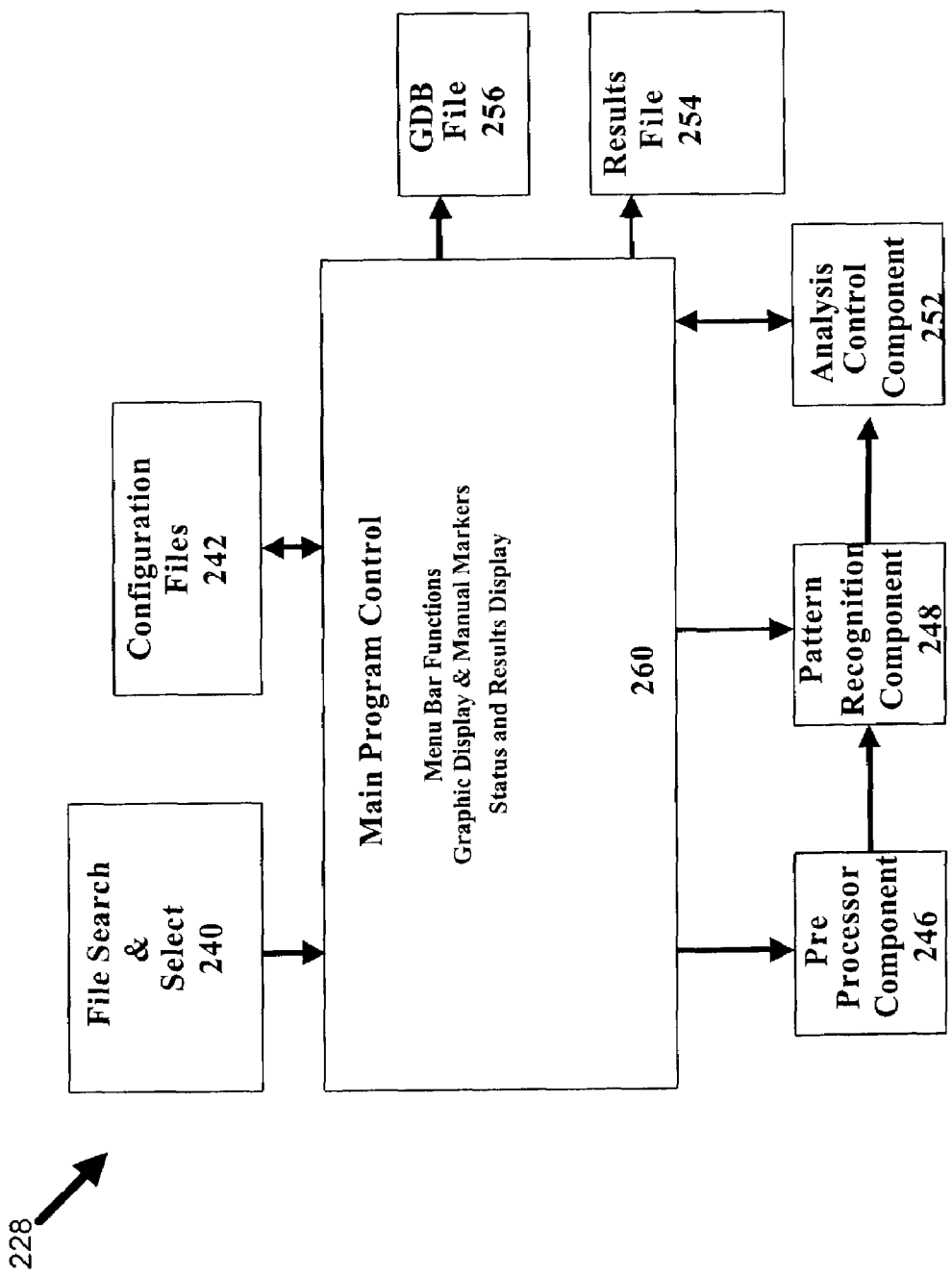
FIG. 10 is a block diagram illustrating an example of the data/control flow of the analysis component.

FIG. 9 a block diagram illustrating an example of the logical operations that can be performed by the analysis component 228. FIG. 10 is a block diagram illustrating an example of the data/control flow of the analysis component. The functionality of these various components is interwoven with the characteristics of the interfaces used to access and invoke these components. Thus, the functionality of the various components and sub-components is addressed in greater detail during the discussion of the various interfaces below.

A file search and select component 240 is used by the user 122 to enter search criteria, invoke a search, view the results of that search, and make file selections based on the view of the search results.

A configuration file 242 is used to set certain analysis configurations, such as channel 106 information. The configuration file 242 assists in the control of the analysis process. The configuration file 242 can embody many selections by the user 122 that would otherwise need to be made by the user 122 during the startup process, or at other times of operation.

A setup and program control component 244 is the "brain" that controls the analysis component 228. This includes the functionality of the marker configuration 152.

A pre-processor component 246 allows for various sensor-specific and embodiment-specific data preparation that is tailored to the particular context of the system 100.

A pattern recognition component 248 performs all matching heuristics. It is the pattern recognition component 248 that identifies data points 110 resembling the pattern of the template data points 120 in the event 118. Markers 134 can automatically be placed on the locations indicating a match. Those automatic activities can be modified using a manual marker placement component 250.

After the user 122 is satisfied with the marker placements, the user 122 can proceed to the analysis control component 252, where analysis calculations can be invoked. The results of those calculations can be viewed in a results file 254. The underlying data can still be viewed in the form of a GDB file 256.

The specific processes and interactions of these components are discussed in greater detail below, during the discussion of the various interfaces.

VII. Process Flows and Heuristics

There are many different processes and heuristics (collectively "heuristics") that can be incorporated into the system 100. The system 100 can incorporate different variations of the same category of heuristics at the same time in a weighted manner. In a preferred embodiment, dynamic or synthetic programming is used to implement many or even all of the heuristics incorporated into the system 100.

A. Correlation Heuristics

There are many heuristics that can be used to perform pattern matching functionality. A pattern matching heuristic uses a description of an event 118 relating to one or more data points 112, such as a target value, a minimum value, a maximum value, or some type of correlation. The pattern matching heuristic is described in greater detail below. In a preferred embodiment, the pattern matching heuristic includes a correlation calculation component.

Many of those heuristics can be classified as correlation heuristics, e.g. processes that identify statistical correlations between the analysis data 112 and the template data 120.

Figures 11, 12, 13:
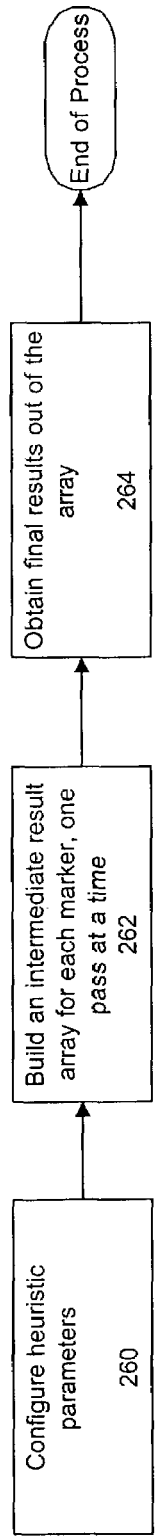
FIG. 11 is an equation illustrating one example of a correlation heuristic that can be incorporated into the system.
FIG. 12 is an equation illustrating one example of a correlation heuristic that can be incorporated into the system.
FIG. 13 is a flow chart illustrating one example of a marker sort heuristic.

A basic formula that can be incorporated into the correlation heuristic is disclosed in FIG. 11.

The calculations can be simplified because the pattern array X doesn't change only the data array changes (e.g. as j changes). Roughly half the values in the equation only need to be evaluated once.

It can be desirable to exclude points from the pattern match. The easiest way to do this is to make the two arrays identical at the points to be excluded. The easiest way to make them identical is to make them zero. The calculation then becomes the calculation disclosed in FIG. 12 where $G_i=X_i*E_i$, $H_i=Y_{i+j}*E_i$, and E is the exclude array. The exclude array has values of only 1 or 0. A 1 matches data at that point, as zero excludes the matching at that point. Again, since X and E are static, G is static as well, simplifying the calculations.

X is the pattern array (142), and Y is the data array (144). If X contains 20 elements and Y contains 70 elements, R contains 50 elements. The location of the maximum value in R corresponds with the position of the best match of pattern X in Y. The value of r at this position is the correlation, e.g. how well the pattern matches the data.

B. Marker Sort Heuristic

Figure 15:
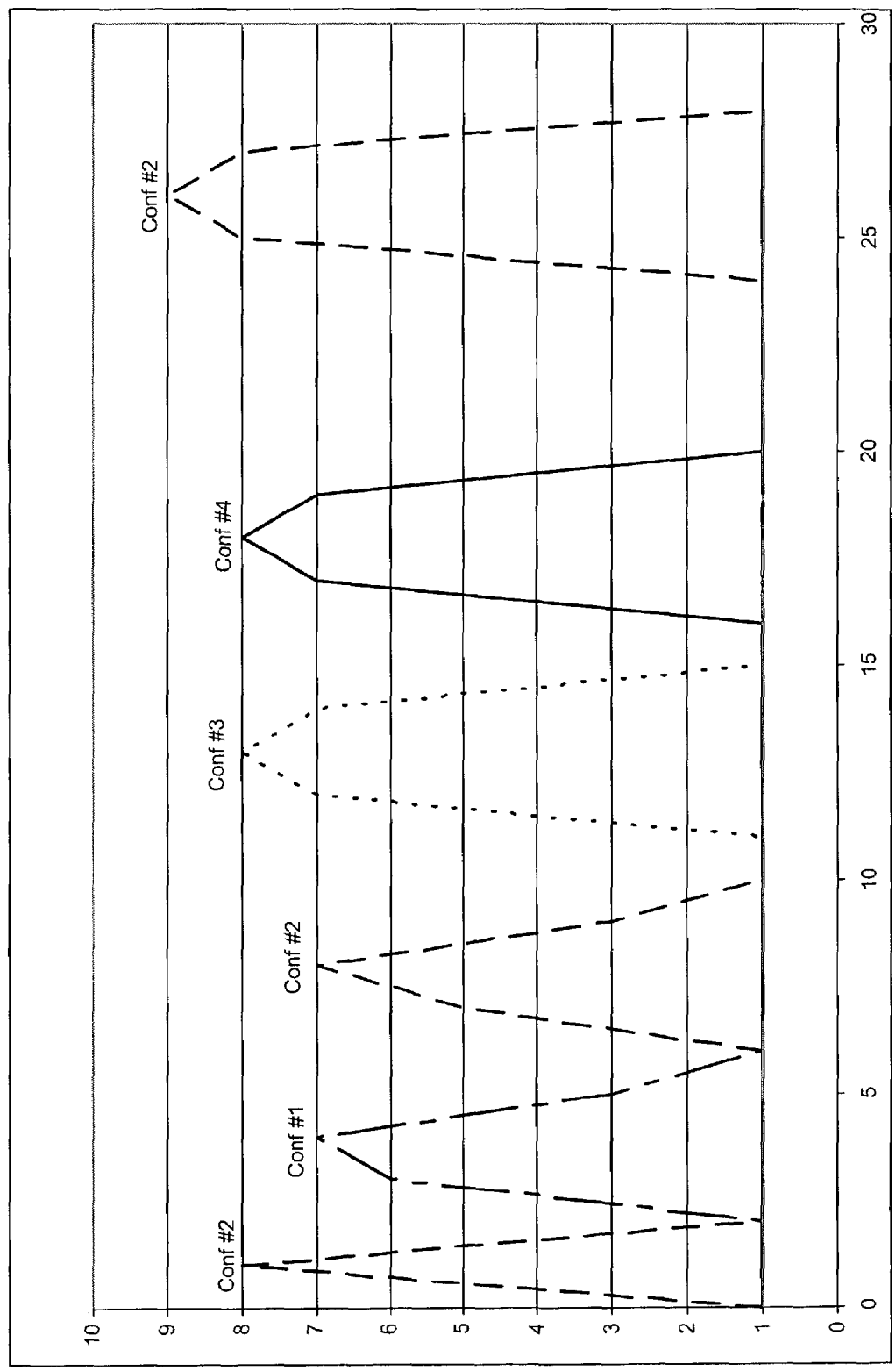
FIG. 15 is a line graph corresponding to the example of a data chart in FIG. 14.

FIG. 13 is a flow chart illustrating one example of a marker sort heuristic that can be incorporated into the system 100. For the purposes of example, the marker configuration 152 calls for 5 markers 134 that must be placed in order. For the purposes of the example, there are 28 data points (112) in the file. FIG. 14 is an example of a chart illustrating an array of fit confidence numbers. FIG. 15 is a graph of that chart. The pattern matching heuristic preferably returns an array of fit confidence numbers for each marker 134. The size of the array will be equal to the number of data points 110 in a channel 106.

The following method determines the marker placement based on the fit confidence numbers and location relative to other markers. The fundamental assumption is that all markers must be matched in order (1 must occur before 2, 2 before 3, etc.).

For the purpose of this explanation, the input confidence data will be designated with the names chan1, chan2, chan3, and chan4, and will be evaluated in the same order.

As each array is evaluated, two additional arrays are created. One array will hold position data and the other will hold value data. These arrays will be designated r1pos, r2pos, r3pos, r4pos, r1val, r2val, r3val, and r4val.

The evaluation of the first set of confidence numbers will proceed as follows. The first point in the array r1val is assigned the first value in chan1. The first value in r1pos is assigned the current position. The next and each succeeding value in r1val will determined by taking the larger of the previous value in r1val or the current value in chan1. The next and each succeeding value in r1pos will be determined as follows. If current value in r1val is greater than the previous value in r1val, then r1pos equal the current position else r1pos equals the previous value of r1pos.

Evaluation of the second and all succeeding sets of confidence numbers will proceed as follows. The first point in the array rXval is assigned the first value in chanX. The first value in rXpos is assigned the current position. The next and each succeeding value in rXval will determined by taking the larger of the previous value in rXval or the sum of the current value in chanX and r(X−1)value. The next and each succeeding value in rXpos will be determined as follows. If current value in rXval is greater than the previous value in rXval, then rXpos equal the current position else rXpos equals the previous value of rXpos.

Marker positions are determined by finding the first maximum point in the last rXpos array. This is the marker position for chanX. Using this array index, the value found in each of the other rXpos arrays is the associated marker position for that channel.

At some point, the marker position for time-domain data points must be converted to time. This conversion will be marker position times delta t, in seconds.

The confidence factor associated with the marker position is the confidence factor for the marker.

FIG. 13 provides an example of a more detailed view of this process.

At 260, the heuristic parameters are configured with the data from the marker configuration 152. The number of "passes" is determined. In a preferred embodiment, the number of passes is equal to the number of markers 134. The number of data points 112 is also determined. For the purposes of the example: t1, t2, t3, t4, and t5 are the calculated marker locations. A(t), B(t), C(t), D(t) and E(t) are the correlation numbers from the event matching routine, e.g. how well each event 118 fits the data at time t.

At 262, an intermediate result array is created for each marker 134, one pass at a time. In the example, there are 5 markers 134, and thus 5 passes are preferable.

In Pass #1, for each data point 112 under A:

$Max1(t) = $ larger of $(A(t)$ or $Max1(t-1))$ $Where1(t) = t$ if $A(t)$ is larger else $Where1(t) = Where1(t-1)$.

In Pass #2, for each data point 112 under B:

$Max2(t) = $ larger of $(B(t) + Max1(t-1)$ or $Max2(t-1))$ $Where2(t) = t$ if $B(t)$ is larger else $Where2(t) = Where2(t-1)$.

In Pass #3, for each data point 112 under C:

$Max3(t) = $ larger of $(C(t) + Max2(t-1)$ or $Max3(t-1))$ $Where3(t) = t$ if $C(t)$ is larger else $Where3(t) = Where3(t-1)$ Pass #4 and Pass #5 continue in the same pattern of calculations as Pass #2 and Pass #3.

At 264, the final results are outputted from the array.

For Marker #5: $t5 = Where5(n)$ and $Value5 = E(t5)$.
For Marker #4: $t4 = Where4(t5)$ and $Value4 = D(t4)$.
For Marker #3: $t3 = Where3(t4)$ and $Value3 = C(t3)$.
For Marker #2: $t2 = Where2(t3)$ and $Value2 = B(t2)$.
For Marker #1: $t1 = Where1(t2)$ and $Value1 = A(t1)$.

Different embodiments of the system 100 may incorporate different marker sort heuristics. In some embodiments, multiple sorting heuristics can be performed, and the system 100 can automatically compare the various results.

C. Manual Marker Placement Heuristic

This option will only be available in manual mode or prior to the start of Auto or Batch modes. However, what the user 122 performs in a manual manner mimics what the system 100 can perform in an automated manner. Moreover, if a comparison between a confidence value 146 and a minimum confidence threshold indicates that a confidence value 146 is below the minimum threshold, some embodiments of the system 100 may automatically convert to manual mode to permit the manual adjustment of the markers 134.

Input to a manual marker placement module will come from a pattern recognition module. The input will contain the channel data, the marker placement information determined by the Pattern Recognition module or from the original data file, the correlation coefficient for each marker, and the correlation summary. The user may then accept or change each marker position.

The data should be plotted on a graph with user being able to control which data channels are displayed at any given time. In the event that multiple Y-axis are not workable, the data shall be scaled from 0 to 100%.

A cursor shall be placed at each of the marker points determined by the automated pattern recognition routine. The user 122 may accept these positions or move the cursors to signify a new marker position.

The user 122 will indicate when this process is complete by clicking the Start Analysis/Rematch Data button. The output of this function will go to the analysis function. Moving a marker manually recalculates all the analysis values in real time.

Marker information determined by this function will be placed in the GDB data file, if one was requested.

D. Quick Start Process Flow

Figure 16:
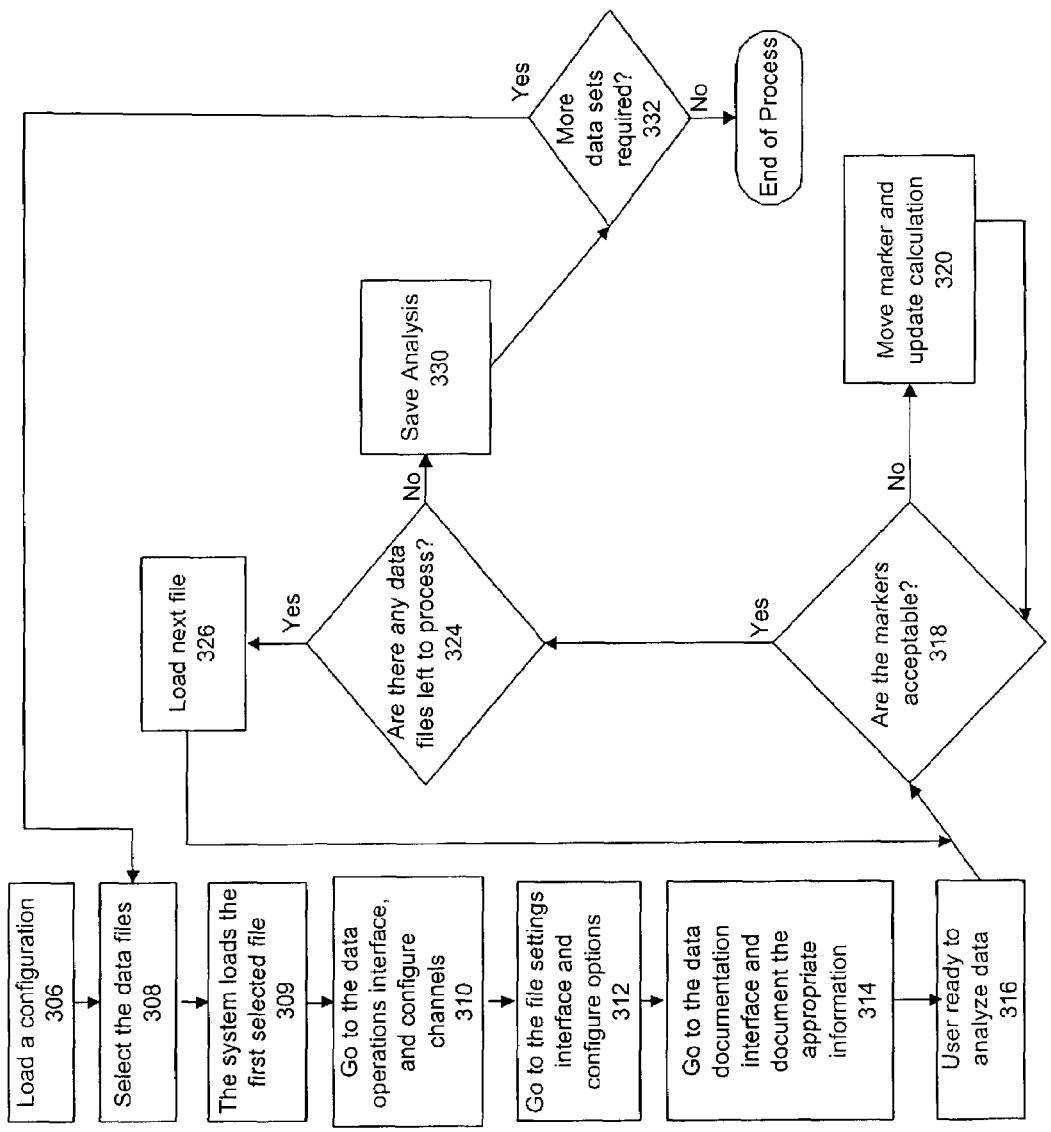
FIG. 16 is a flow chart illustrating an example of the process steps for a user to interact with the system in a manual mode.

FIG. 16 is a flow chart illustrating one example of a quick start process flow. At 306, a configuration is loaded by the user 122. If a user 122 does not make an affirmative selection, the last configuration used by that user will be loaded by default.

At 308, the user 122 selects the analysis data file or data files 110.

At 309, the system 100 loads the first selected data file.

At 310, the system 100 invokes an interface similar to the "Data Operations" interface described below. This allows the user 122 to configure the channels 106. The user 122 should make sure that the "Match Channels" and "Normalize Data" functions are set to the correct channels. This will change based on the data files and the specific configuration used.

At 312, the user can invoke an interface with the functionality of the "File-Settings" interface described below, and make sure all the options are properly configured for output files, reject level, etc. The mode should be "Batch" or "Manual". If new GDB files are created, the user 122 make sure the "Add Marker" button is on as well.

At 314, the user can invoke an interface with the functionality of the "Data-Documentation" interface described below. The user 122 can then fill in, or modify the appropriate information.

At 316, the user 122 is able to view the markers 134 and examine the data file 110.

At 318, the user 122 must determine if the markers are where they should be, and the data file looks good. If so the accept button can be clicked and the analysis will be stored in a current analysis table (e.g. temporary analysis storage). Otherwise, if the data file does not look good, the user 122 could click the reject button or move the marker 134. The placement criteria can then be reapplied. If the data file does not look good, the user 122 may simply reject the data file altogether, and discard if from the analysis.

If a marker needs to be moved at 320, the user 122 can grab it with the mouse and move it, the calculations will update automatically. If the system 100 is in manual or batch mode, the system 100 can automatically calculate the marker location again by "re-matching" or reapplying the pattern criteria.

At 324 the system 100 determines if any of the selected data files 110 at 308 remain unanalyzed. If so, the user 122 is once again given the option to either accept or reject the marker locations at 318. When the analysis is completed, the user 122 can be prompted to save the analysis summary file at 330.

If more data sets need to be analyzed at 332 go back to step 308 and repeat. Otherwise, the process ends.

E. Pattern Recognition Heuristic

Various pattern recognition heuristics can be performed in the process of performing steps 316 and 318, as described above. Part of this process should examine the header information for the data set and determine if pattern recognition has already been performed. Such a process can be performed by the pre-processing component 246. If desirable, this heuristic can be selectively skipped by the process in FIG. 16.

If the data set already contains marker information (e.g. has already been matched), pass the data on through bypassing the pattern recognition heuristic, unless the following apply: (1) Rematching has been requested; or (2) Insufficient existing pattern matches.

A maximum of four channels 106 may be selected for patterning in a preferred vehicle transmission embodiment of the system 100. If a selected data channel is missing from a data set, that channel will be ignored. Both data and computed channels may be used as marker channels.

A maximum of ten (10) patterns or functions per channel is permitted. Each of the ten (10) patterns or functions is associated with one of the ten (10) marker positions.

For each marker 134 where a pattern 116 or function has been specified and the data channel exists, an array of Fit Factors will be determined. This array will be equal in length to the data array.

Figure 48:
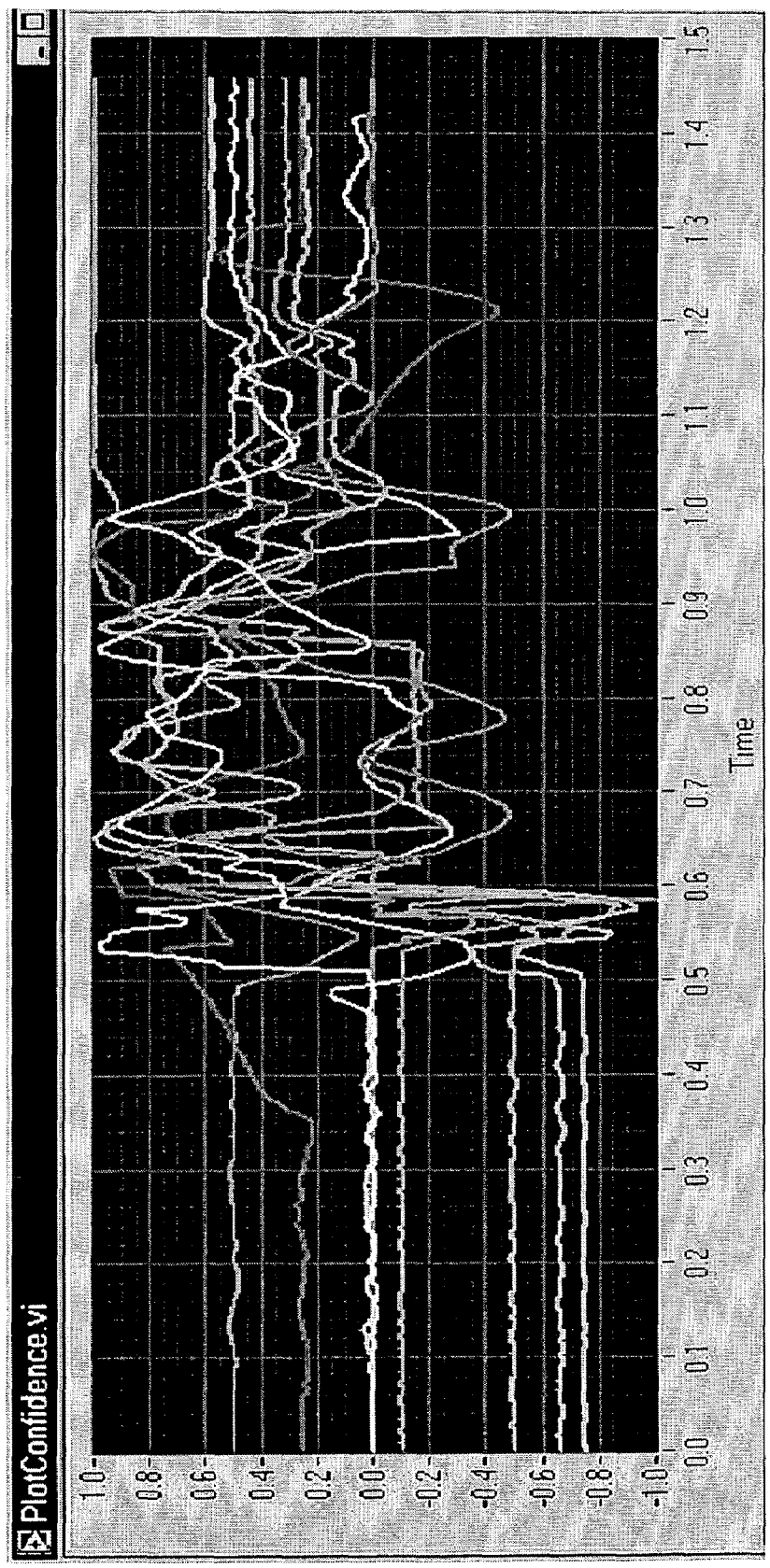
FIG. 48 is an example of a confidence graph interface that can be incorporated into the system.

When matching a pattern file 116, the following procedure will be used to determine the fit array (see FIG. 48 for a fit array). The fit array is an array that can populated by a correlation of the the data array 144 with the pattern array 142. Front padding and/or back padding may be necessary for such a comparison. From the start of the fit array up to the marker-offset point, the fit values will be zero. The pattern fit values will start at the offset and continue until all possible fit data has been obtained. The remainder of the fit array will be filled with zeros. Since the location of the max value in R represents the offset from the start of Y to the start of X and the actual marker position the system 100 is trying to find is located somewhere in X, the system 100 needs to add an additional offset that is fixed when the pattern array is created.

All start and end locations (e.g. "caging" the search) are referenced to the marker position. Therefore the actual array indices used into Y need to be adjusted for the marker offset and the length of X. For example: Y (100) X (20) Marker position is 12 steps into X. The system 100 wants to search Y starting from 27 (position of another marker) and ending at 32 (where input speed >1200 rpm). The actual area of Y to be processed starts at 15 (27−12) and ends at 40 (32−12+20). R will have 5 elements in it. Assuming the max value is in element 3, the marker position is at 42 (27+3+12).

The results of a pattern match will be adjusted based on the number points in the pattern. The following method will be used to create the adjustment factor.

$[((n\Sigma Data^2 - (\Sigma Data)^2)/n)^{1/2}/(Data\ max - Data\ min)]*[(Log(\# points)*11.3) - 3.30]$ The function allows selective data matching, e.g. noise rejection. Patterns 116 with high numbers of points can match to smaller details in a data channel. Patterns 116 with a small number of points can only match to larger details. For an approximate feel of how this works, a three point pattern will match to details larger than 40% and a 100 point pattern can match to details as small as 5%.

If the Absolute Value has been requested for the marker, then the fit array values will be converted to their absolute values. When using a pattern function other than pattern, the following procedure will be used to determine the fit array. The pattern functions by definition create a fit array of the same size as the data array. The pattern function will begin at the beginning of the array and fill to the end. The marker offset is ignored.

Each Fit Factor array will be multiplied by its associated pattern-weighting factor. The arrays will be summed and divided by the sum of the fit factors. This result will be passed to the Marker Sort Heuristic as the array of confidence numbers for this marker. The pattern functions Find Relative Max and Find Relative Min work the same as the Find Max and Find Min functions except the values are normalized to 0.1 instead of 1.0.

For the functions Find Min and Find Relative Min to work properly the results must be inverted. To do this subtract 1.0 or 0.1, depending on the function, from every normalized data point and multiply by minus one.

The pattern functions Find Greater Than and Find Less Than return a value of one every where the data is greater than or less than the limit value and a zero everywhere else.

The Target Value function will be computed by first determining the larger of the absolute values of the max and min of the data channel. The data will be dived by this value, thus assuring a value range between 1 and −1. This is the same method used to scale the data for display on the main screen. The following formula will be applied to the result: $1.0 - ((Data - (Target/100)) * 3.5)^2$. The negative result will be limited to −1.0.

Different sample rates between the pattern files and the data will be handled in the following manner. A pattern file may contain 3 to 1000 points and has an associated sample rate.

Figure 17:
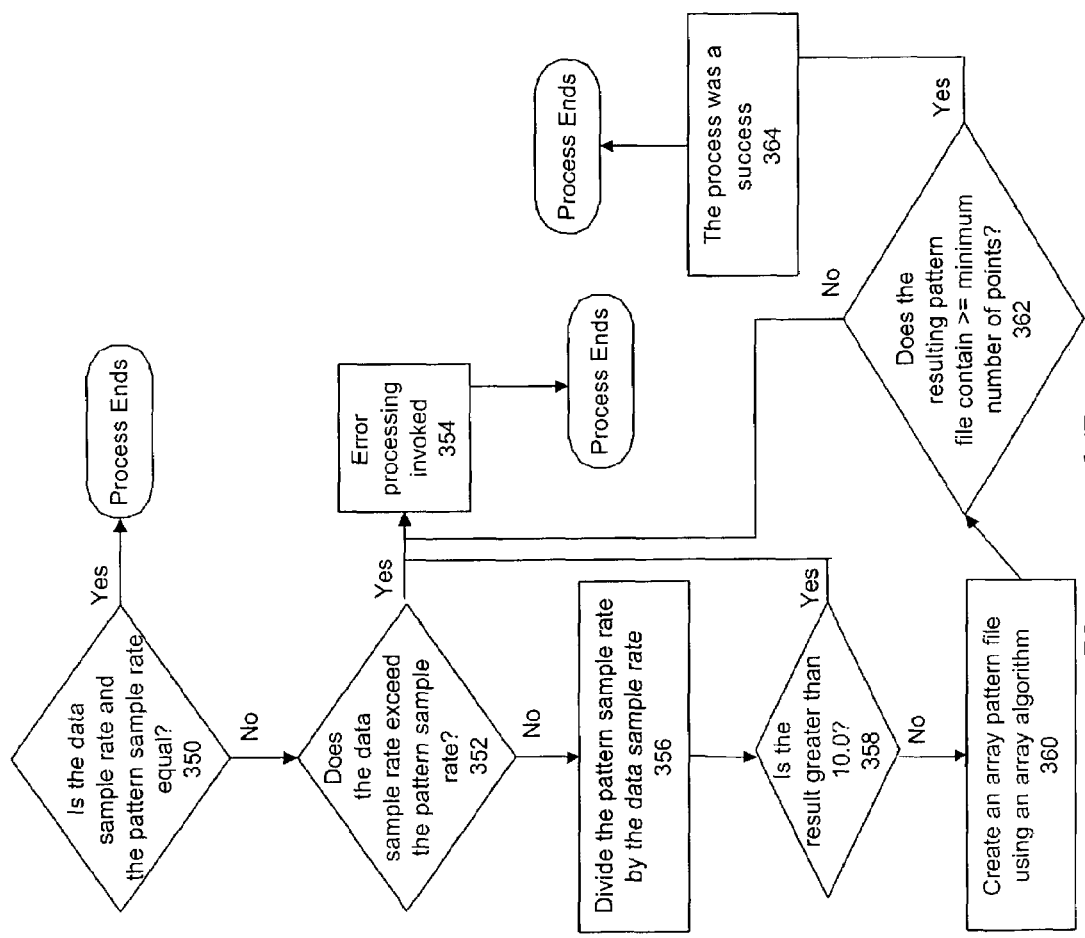
FIG. 17 is a flow chart illustrating an example of a time scaling heuristic that can be incorporated into the system.

FIG. 17 is a flowchart illustrating one example of a time scaling heuristic. If the data sample rate and the pattern sample rate are equal at 350, there is no problem and the pattern will be used unchanged.

If at 352, the test sample rate exceeds the pattern sample rate, an error processing routine is invoked at 354 and the process ends without being able to process the information. If at 352, the data sample rate is less than pattern sample rate, the following rules will be used to reduce the number of points in the pattern. At 356, divide the pattern sample rate by the data sample rate to generate a real number.

If the result is greater than 10.0 at 358, invoke the error processing routine at 354. Otherwise, proceed to step 360 and invoke an array heuristic. Create an array with each point defined as follows. Starting with N=0 and incrementing by one, multiply the result of step 1 by N and round to an integer. If this value is less than the number of points in the pattern, add this point in the pattern array to the reduced points array. If the value of N times Step 1 is greater than or equal to the number of points in the pattern, the reduction is complete.

If at 362 the resultant pattern file does not contain a minimum of 3 points, invoke error processing at 354. Otherwise, at 364 the process is a success and the process ends.

F. Data Normalization Adjustment

Figure 18:
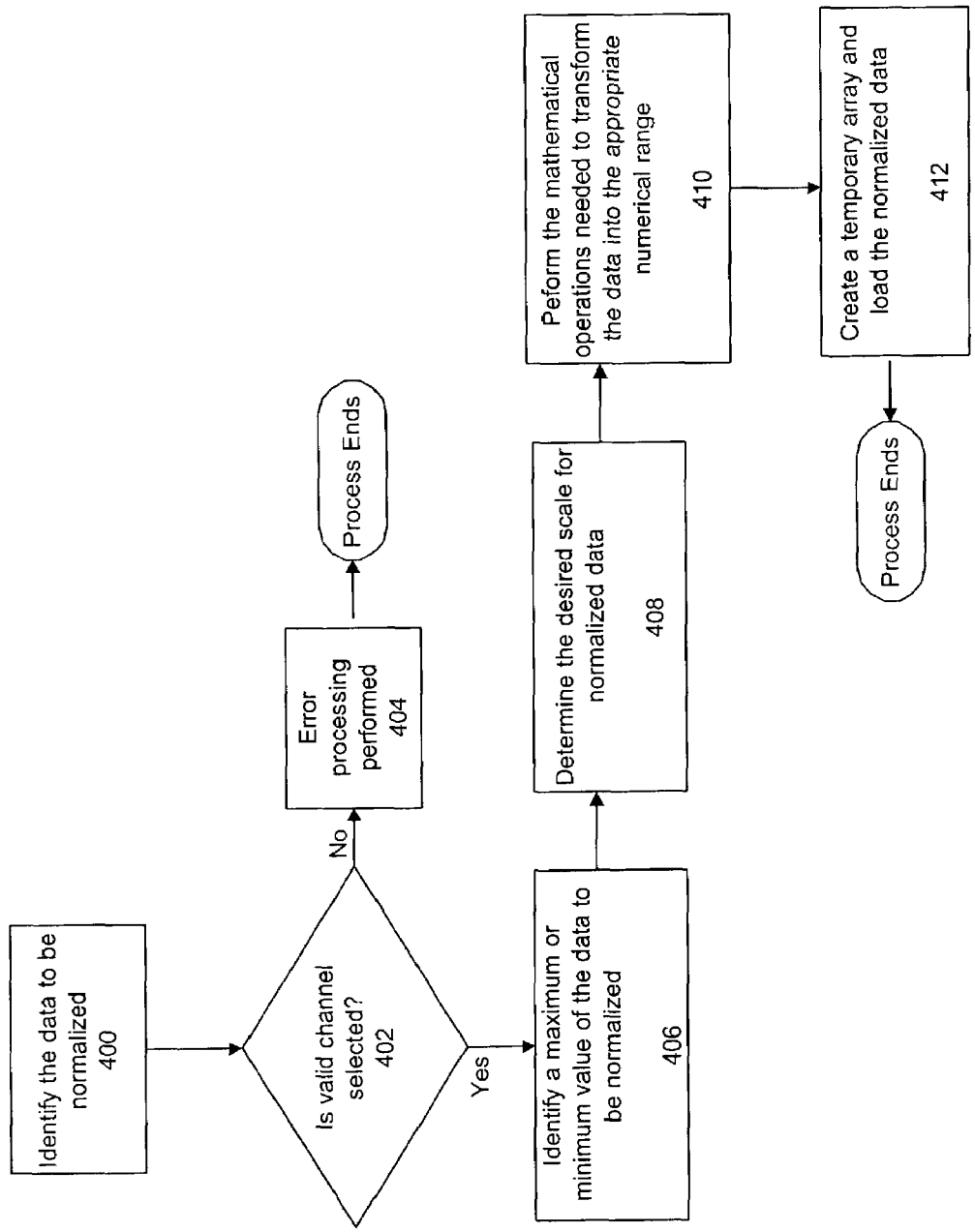
FIG. 18 is a flow chart illustrating an example a heuristic for adjusting a data configuration.

FIG. 18 discloses a flow chart illustrating an example of a data normalization heuristic. At 400, the data to be normalized is identified. At 402, if an invalid position channel name was selected, then an error processing routine is invoked at 404 and the process ends. If a valid channel is selected at 402, the position data will be searched for a maximum or minimum value at 406. At 408, the desired scale for the normalized data is determined. In a preferred embodiment, the range of values is from 0 to 100. At 410, the requirement mathematical operations are performed to transform the data into the appropriate numerical range. At 412, a temporary array is created and filled with the normalized data, which is then available for analysis by the system 100.

VIII. Interface Views

All interface views are part of the interface subsystem 200. The system 100 can incorporate a wide variety of different interfaces. The Figures are examples of interfaces that are incorporated into the system 100. However, the permutations of such interfaces that can be incorporated into the system 100 are virtually limitless.

A. File Setting Interface

Figure 19:
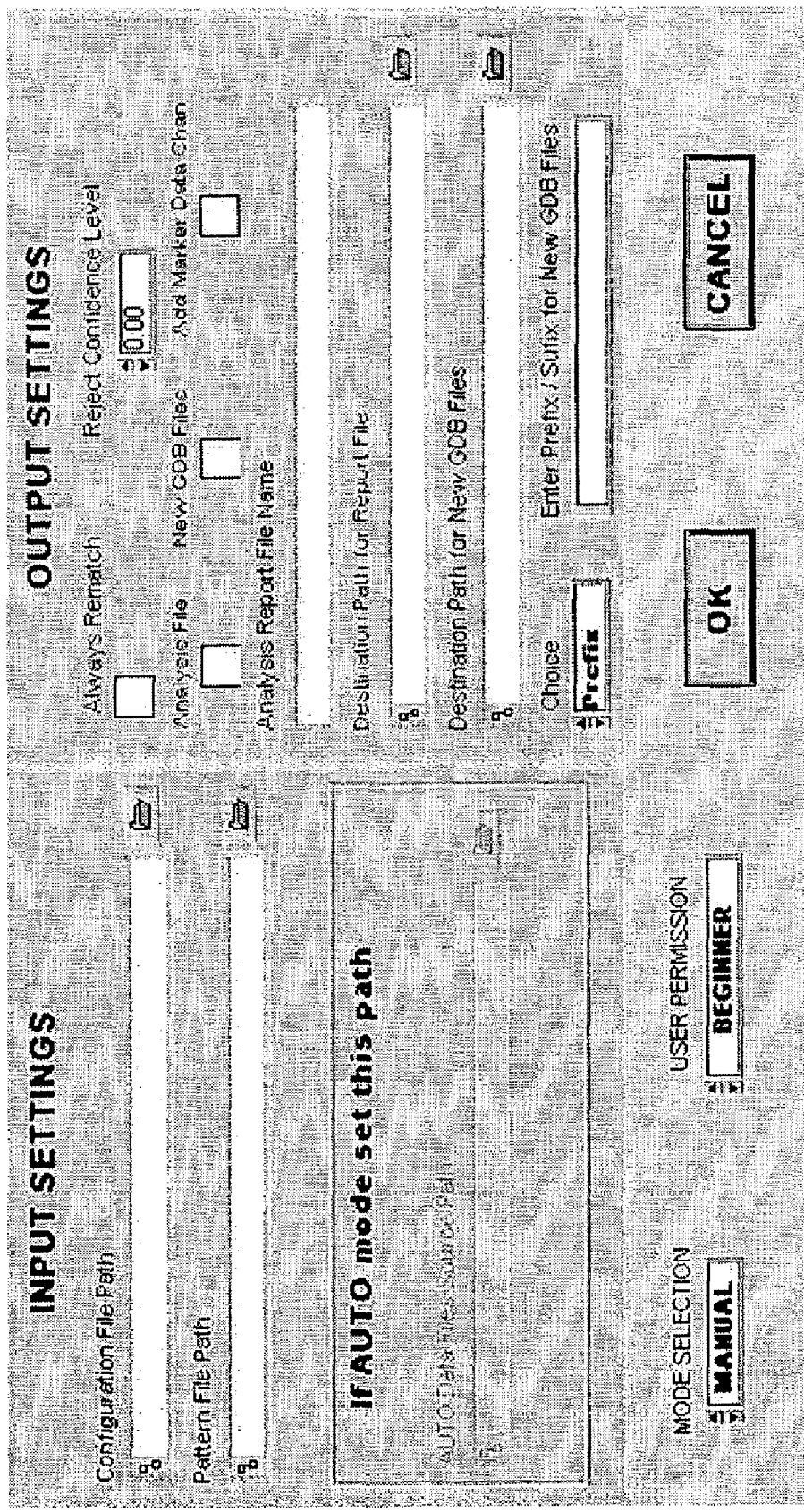
FIG. 19 is an example of a file setting interface that can be incorporated into the system.

FIG. 19 is an example of a file setting interface that can be incorporated into the system 100. The following input parameters are examples of input parameters that can be accommodated:

(1) Source path for the configuration files.

(2) Source path for the pattern files.

(3) Source path for AUTO data files.

The following output parameters are examples of output parameters that can be incorporated:

(1) Always Rematch. If markers 134 are manually moved, the "always rematch" feature, if checked, can automatically "rematch" or "retrieve" previously detected patterns 118 in the analysis data points 112. Always Rematch allows the operator to choose between using existing marker data and rematching the data using the current configuration. This option may also be set from the Analysis Menu. Both sets of controls must reflect the correct setting. The Always Rematch setting is preferably saved to the configuration file.

(2) Rejection Confidence Value. Reject Confidence Level allows the user to set the confidence level for acceptance or rejection in Batch and Auto modes. This parameter can be set by the user 122 or by the internal processing rules of the system 100, itself. Each pattern identification and marker location can be associated with a confidence value 146. The aggregate accuracy of all identifications and marker locations across one or more files can be assigned an aggregate confidence value 146. The system 100 can compare such confidence values 146 to one or more rejection confidence values. Correlation determinations with confidence values 146 indicating less confidence than the minimum or rejection confidence value can subjected to various forms of rejection processing. In some embodiments, a file 110 with even one confidence value 146 that compares unfavorably to the rejection confidence value, can be thrown out by the system 100, and eliminated from subsequent processing involving the particular search or correlation criteria.

(3) Select results file type (analysis results file, new GDB files, or both). In alternative embodiments, additional file types can be supported. Many different format types can be supported by the system 100. If the user 122 decides to save the data as a GDB file, all data channels marked save including the created data, documentation, comment, and analysis results will be saved to a GDB file. If the user 122 decides to save the data as an analysis results file, the analysis results file will preferably have some sort of predetermined file extension such as ".prn". Multiple save options may be selected at the same time.

(4) Save Marker Data as Channel to GDB file (only visible if new GDB file selected). The "Save Marker Data as a Data Channel" will only be available if Save data to GDB file is selected. If selected, a created data channel of marker information will be saved to the new GDB file. This will take one of the available data channels. This option may also be set from the Analysis Menu. Both sets of controls must reflect the correct setting.

(5) Destination path for analysis results. This is the path for the file that will contain the analysis results.

(6) Destination path for new GDB files. This is the path for the file that will contain the new GDB files.

(7) Select prefix or suffix to modify original GDB file name for new GDB file name. This option supports various naming conventions for modifying GDB files (8) Enter prefix or suffix. The system 100 can support a wide variety of different naming conventions. Some of those conventions may utilize prefix and/or suffix rules.

The following controls can be incorporated into the file setting interface:

(1) Enter User Level (to control user access to functions). In a preferred embodiment, the Enter User Level control will have three settings Beginner, Intermediate, and Advanced. This control setting is not to be saved in a configuration file and will always default to Beginner when the program opens. The Beginner level prohibits access to all of Pattern Recognition menu items and the Analysis Selection submenu item. The Intermediate level prohibits access to the Pattern Recognition menu items. There are no restrictions for the Advanced level.

(2) Analysis mode selection (Auto, Batch, and Manual). In a preferred embodiment, the system 100 can operate in multiple modes. In a fully automatic mode ("AUTO"), the system 100 awaits new files 110, and can automatically analyze new data files 110 using the last used search and correlation criteria. In "AUTO" mode, the user 122 is prompted for a data source directory path This control will be disabled in MANUAL and BATCH modes. In a manual mode ("MANUAL"), files 110 are selected in an individual basis. In a batch mode ("BATCH"), multiple files 110 are selected for processing at predetermined times.

(3) OK button (indicate user completion and exit screen).

B. Data Operations Interface

Figure 20:
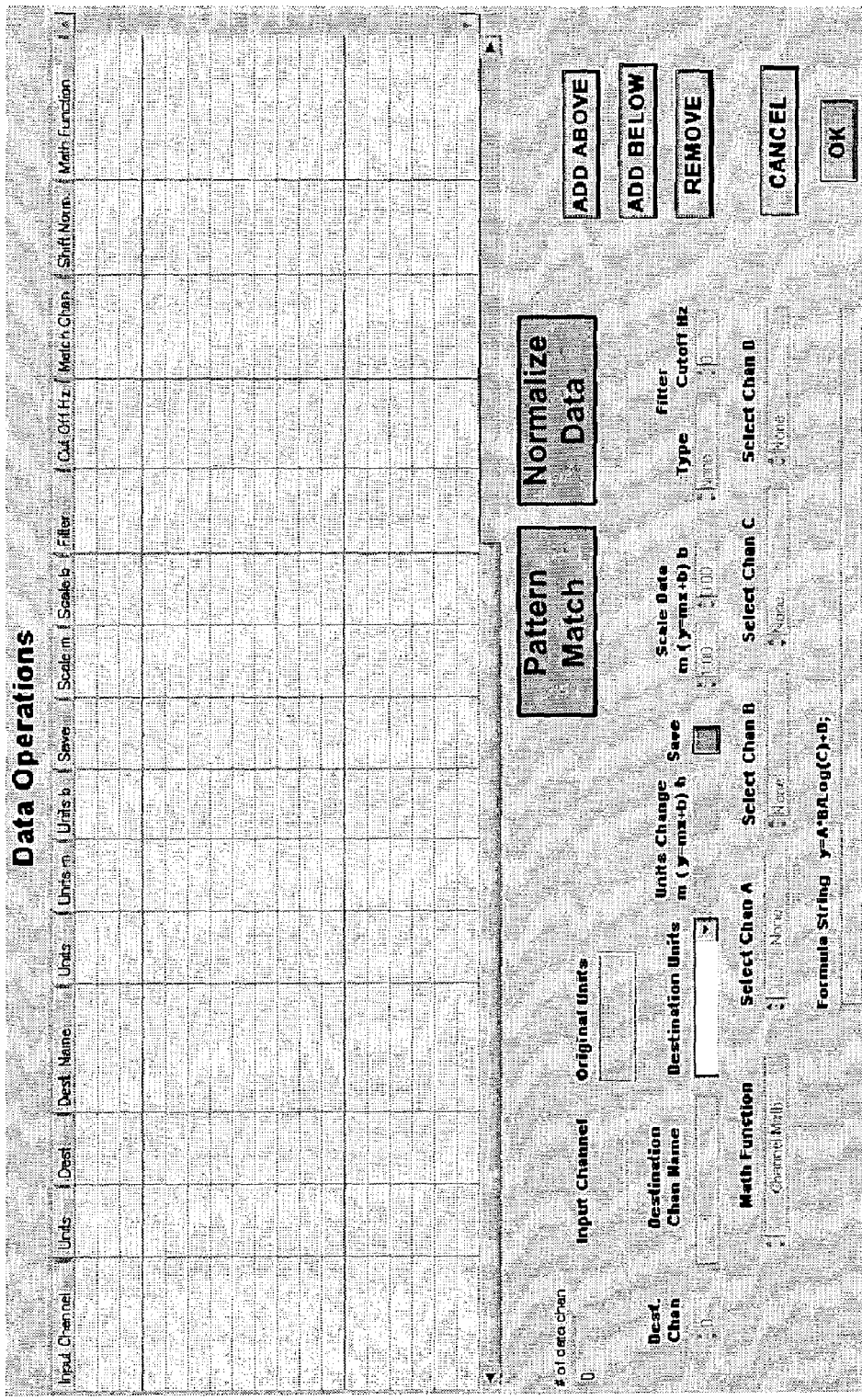
FIG. 20 is an example of a data operations interface that can be incorporated into the system.

FIG. 20 is an example of a data operations interface that can be incorporated into the system 100. This interface allows the user 122 to determine the operations to be performed on the data channels 106. These operations will be executed by the Preprocessor component 246.

The following functions are performed under data operations.

Channel Summary and User Interface. The user interface screen is shown above. This will serve as a summary screen listing both the data and computed channels. Some selections may be set directly from this screen others may be set using the Configure Math, Pattern Match, and Normalize Data buttons.

The ADD ABOVE, ADD BELOW, and REMOVE buttons apply to computed data channels only. Pushing the ADD buttons will display a new line of indicators and controls. The Configure Math button will then need to be selected to define the channel.

The ADD button results in the creation of a new data channel. There is a maximum of 32 data channels that may be written to a new GDB file. The software may display the current number of data channels selected for saving to the new GDB file. The software will display an error message, if more than 32 channels are selected for saving. This number is reduced to 31 if Save Marker Data as Channel is selected.

Selecting the Input Channel item for a computed channel and pressing the DELETE button will remove that channel from the list.

The OK button indicates that the user has completed all operations on this screen.

The information and functionality of the Data Operations Interface can include the following:
Input channel (data channel name or computed);
Configure Math button;
Original units;
Output channel name;
Output units (if unit conversion performed);
Change Units;
Scale (M); and
Offset (B);
Delete from save selection;
Filter selection;
Filter cutoff;
Marker channel selection; and
Shift normalization.
Input Channel:

This is a display only list of all the original data channels from the GDB file plus any computed channels. For channels from the GDB file, the channel names from the header will be displayed. For computed channels, the word COMPUTED will be displayed.

Original Units:

This is a display only field. For channels from the G DB file, the units from the header file will be displayed. For computed channels, this will be blank or display none.

Destination Channel:

The destination channel will only be applied if a new GDB file is created. Then the channels will be arranged in order of destination channel number.

Destination Channel Name:

This control will initially contain the same text as the Input Channel but may be changed by the operator.

Output Units:

This is a selection field and shows the units label that will be used for the output.

Change Units:

These columns allow sign changing and unit conversions by the linear equation Y=mX+b. The user may enter the parameters m and b. X is the original channel data and Y is the changed data. The default settings are m=1 and b=0. Sign conversion of the data is accomplished by setting m=−1.

Filter Data:

Allows the user to filter a data channel. Filtering will be performed after any sign changes have been made. The user must select the filtering method and enter the filter cutoff (as frequency or points).

The filtering choices are None, Hi Pass and Lo Pass. Band Pass filtering will be accomplished by sending the result of the Lo Pass filter to the Hi Pass filter.

The filter cutoff column will have a switch to select either frequency or points as the entry type. There will be no restrictions on the number of data channels that may be filtered.

Save Data Channel:

Allows the user to save or delete a data channel from the resultant data set. Deleting a data channel does not remove it from the original data file. It simply is not included in any new GDB files created by the analysis software. This is a method of reducing the output channel count to the required maximum of 32 or 31 if save marker info has been selected. This allows the analysis routines to work with more than 32 channels or filter unwanted channels from the new GDB files.

The Save selection will default to the save position, the user must deactivate the control to remove it from the output.

Pattern Match Channels:

This column displays which, if any, of the four allowed marker channels is assigned to the data channel. Clicking on the Pattern Match button at the top of the column will bring up a screen for configuring the data channel association with the marker channels.

The Pattern Match popup screen will display four ring controls associated with four text indicators. The indicators will contain the Match Data Type entries made in the Marker Data menu selection. The ring controls will contain the currently defined data channel names. The user will select the data channel that meets the Match Data Type.

This popup panel can also be accessed from the Data menu selections.

Data Normalize:

This is an indicator only and displays the channel's selection if Data Normalize has been selected. Unused channels may be hidden or display nothing. The selected channels will display FORCE, AUX 1, AUX 2, and AUX 3.

Clicking on the Data Normalize button at the top of the column will bring up the screen for configuring the data normalize heuristic described above.

C. Pattern Data Interface

Figure 21:
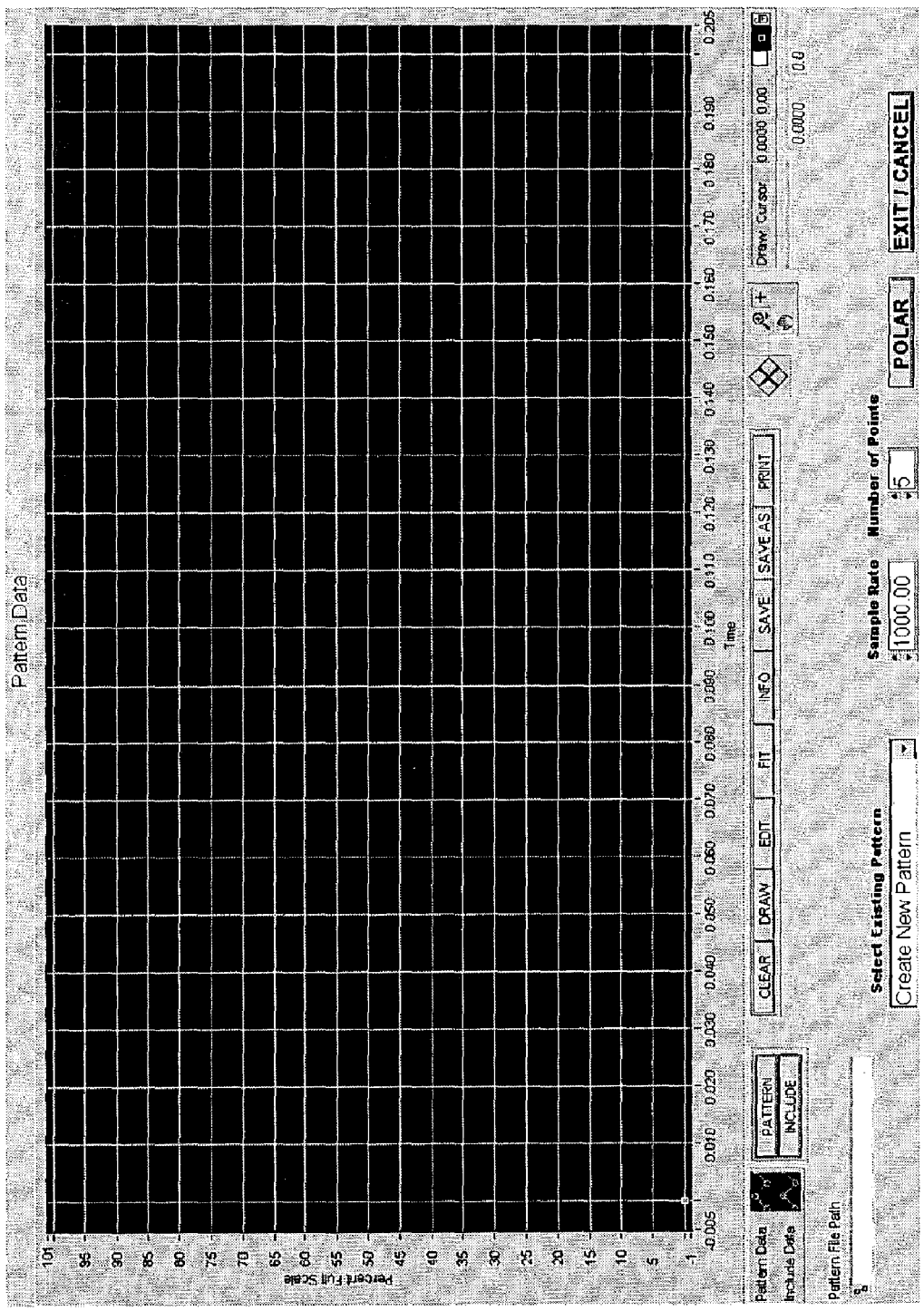
FIG. 21 is an example of a pattern edit interface that can be incorporated into the system.

FIG. 21 is an example of a pattern edit interface that can be incorporated into the system.

Pattern Files:

A utility must be provided to allow the creation and editing of pattern files. This utility should be graphical in nature. The minimum capabilities should include the ability to specify the number of points, draw/edit points, and draw/edit lines.

The X axis will be scaled in time (number of points/sample frequency). The Y axis will be scaled zero to one hundred percent (0-100%) or minus one hundred to plus one hundred percent (−100-100%). The Y axis scale type is selectable by the operator. An addition point will be added to the start and end of each axis for better visibility of min and max points.

Drawing will consist of all straight lines except for curve fitting through a maximum of 9 points. The curve fit will be a polynomial fit, with the order set by the number of points. The maximum order of the fit will be limited to 5.

Plot the pattern and the include data on the same graph.

This function should provide for entering or changing the sample rate, the number of points, the pattern data, and the include data.

The function should open with the last pattern displayed.

Controls should include Clear, Draw, Edit (Pattern or Exclude), Fit, Save, Save As, Print, and Exit.

Pattern File Definition:
A pattern file will contain the following information:
Pattern Sample Rate.
Pattern Weight factor.
Array of pattern data (5 to 1000 points each).
Array of include data (5 to 1000 points each).

D. Marker Parameters Interface

Figure 22:
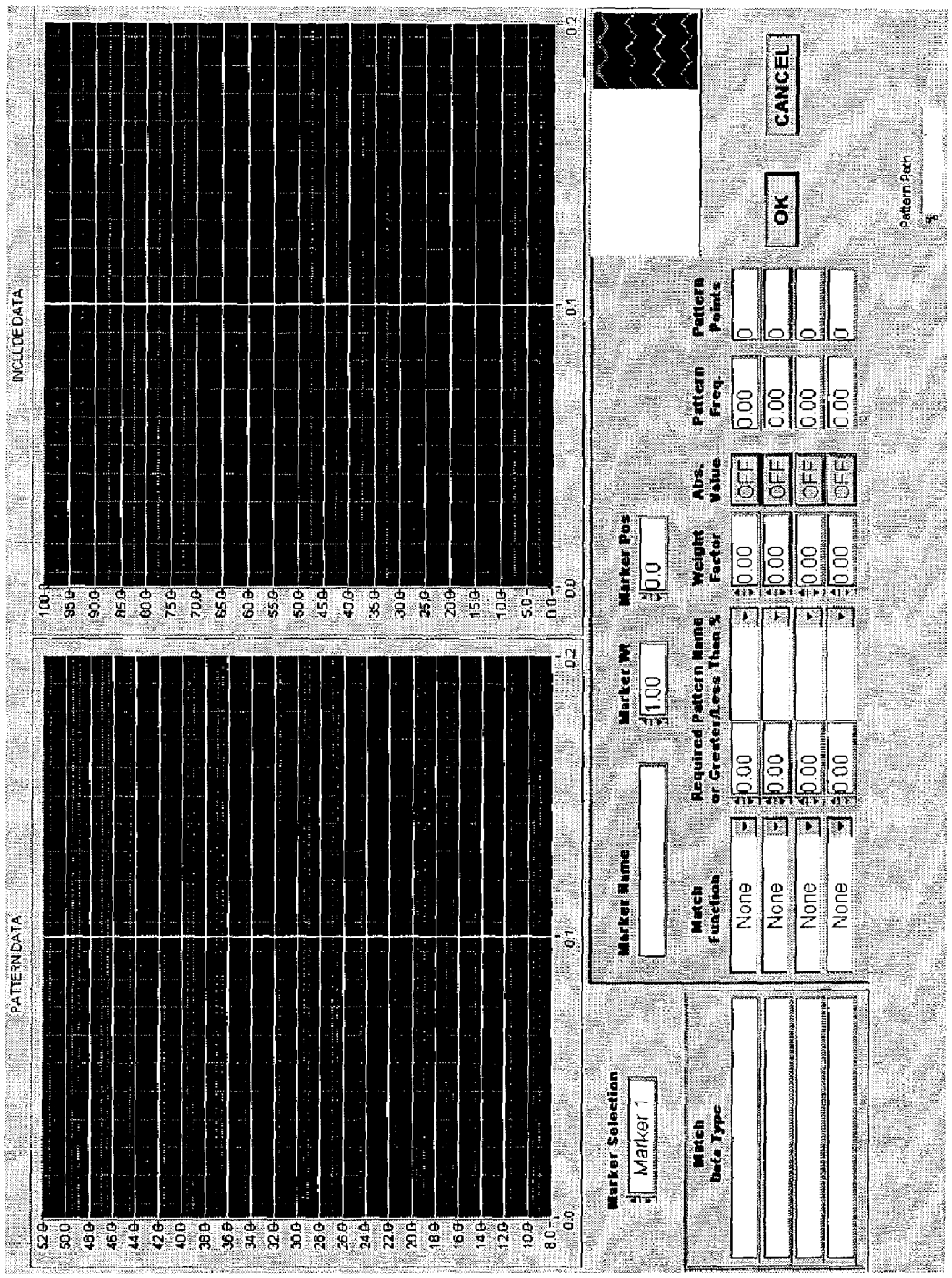
FIG. 22 is an example of a marker parameters interface that can be incorporated into the system.

FIG. 22 is an example of a marker parameters interface that can be incorporated into the system.

This particular embodiment of the marker parameters interface will allow the user 122 to define up ten markers 134. This function must be easily exported to other software applications. A ring control will select the marker number.

A maximum of four channels may be used for determining each marker placement.

The parameters for each marker will consist of the following.

Marker name label
Marker Weight factor for the summary correlation
Marker offset or position
Match Data Type to be used for each marker. This is to aid the operator in choosing or verifying the correct channel for each marker channel.
For each channel, the Match Function.
For each channel with greater than or less than functions, the target value.
For each pattern, the selected pattern file name.
For each pattern, the pattern weight factor.
For each pattern, the absolute value option.
For each pattern, the pattern frequency and number of points will be displayed.

It is desirable to have a graphical display on this input panel for the purpose of displaying the pattern & exclude files and a cursor for positioning the marker offset. The pattern files should be overlaid on the graph.

The defined pattern functions are "Pattern", "Find Max", "Find Min", "Find Relative Max", "Find Relative Min", "Find Greater Than", "Find Less Than", and "Target Value". See "Data Analysis Operation"/"Pattern Recognition" section for details on handling these pattern functions.

The Absolute Value button provides a way of making up shifts and down shifts look alike. This button will only be visible when "Pattern" has been selected as the match function. When this function is enabled, the results of the pattern match are converted to absolute values.

E. Home Interface

Figure 23:
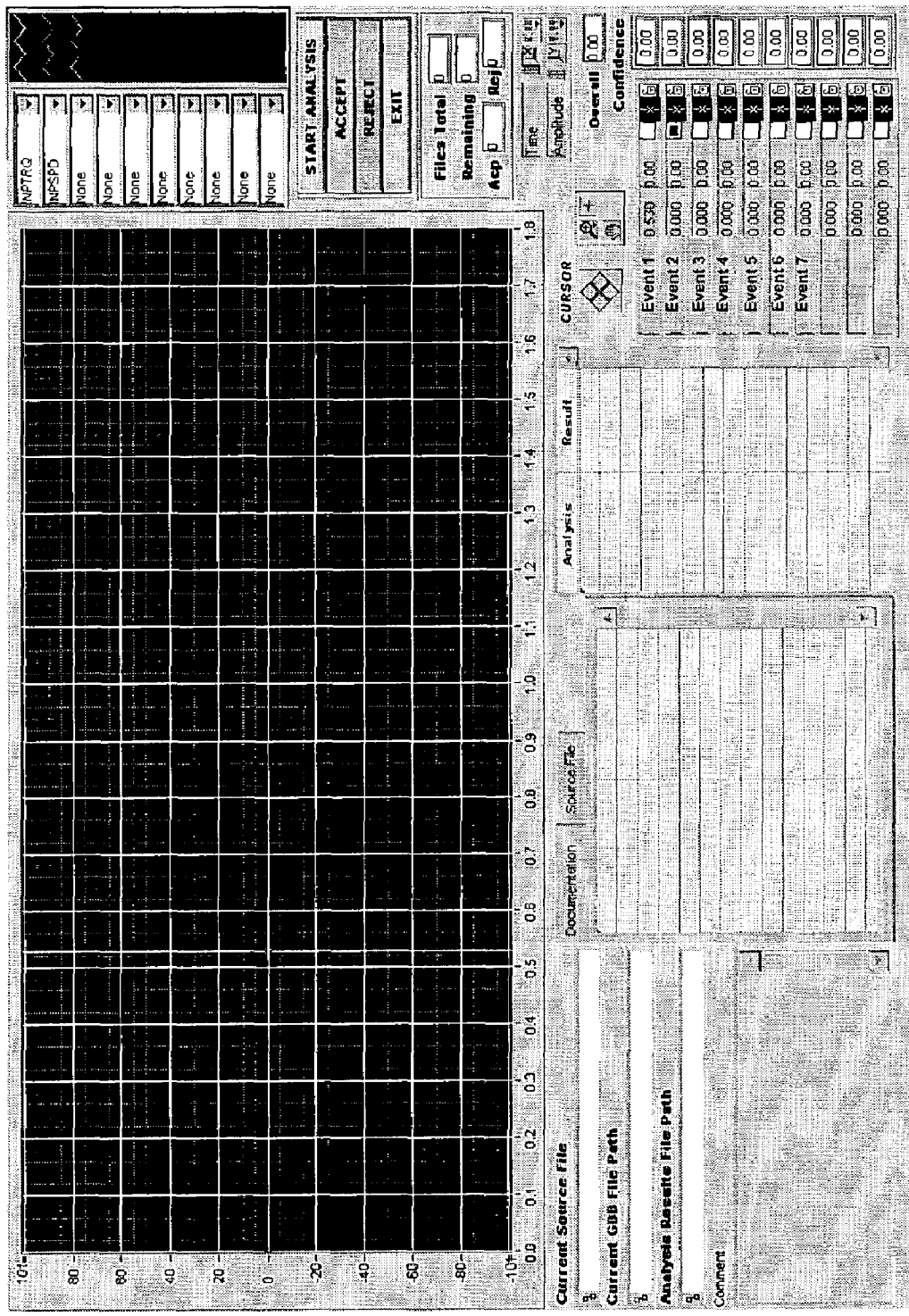
FIG. 23 is an example of a main interface or "home" interface that can be incorporated into the system.

FIG. 23 is an example of a main interface or "home" interface that can be incorporated into the system 100.

The user interface screen will consist of the following sections.

Menu bar;
Controls;
Plot area;
Plot controls; and
Status, Statistics, and Results.

Menu Bar:

The menu bar will be displayed at all times. Menu items may be disabled to prevent inappropriate user actions. Menu labels may be changed to reflect different modes of operation (Auto, Batch, Manual).

Controls:

The controls section is used for primary operation of the program.

This section will consist of the following controls.

START ANALYSIS/STOP ANALYSIS—This control will have two different interpretations depending on the operating mode selected. In AUTO and BATCH modes, this control will be used to start and stop the analysis process. In MANUAL mode, this button will be relabeled "rematch data." In a manual mode, the rematch data function triggers automated pattern matching after the manual changes made by the user 122. The pattern matching criteria can be automatically resupplied, moving the markers 134 to their pre-manual movement locations. In some embodiments, the rematch data functionality incorporates any manual changes to the markers 134, but then reapplies the pattern matching criteria to the markers 134 not affected by the manual change.

ACCEPT—In Manual Mode and Batch Mode only, the system 100 accepts the results for writing to file and causes the program to begin on the next data file. This control will not be operable in AUTO.

REJECT—In Manual Mode and Batch Mode only, rejects the data set as unacceptable and causes the program to begin on the next data file. This control will not be operable in AUTO mode.

EXIT—Exits the program. This may be disabled until the analysis is complete or has been stopped by the user. The window close button (upper right corner X) should also cleanly close and exit the program as well.

Plot Area:

The plot area will be capable of displaying a minimum of ten channels at one time. As a minimum, any of the allowable data channels may be selected for display. As a maximum, all of the current channels in the analysis (including channels marked for deletion) may be selected for display. The marker positions should be shown by a cursor like indicator.

This display area will also serve as the manual marker placement function. Manually moving the cursors will be the equivalent of manual marker placement.

Plot Controls:

This allows the user to select the channels to be displayed, change the graph scales, zoom, and perform other graph related functions.

Status, Statistics, and Results:

The following lists the some functionality that can be included. Depending on the layout of the panel, items can be added or deleted.

Source file name and path.
Destination GDB file name and path (gray out if new GDB file not required).
Analysis Results file name and path (gray out if results file not selected).
Documentation Information.
GDB Source Header information.
Comments.
Marker position (10).
Marker confidence value (10).
Overall correlation value.
Analysis results (fixed list).
Analysis results (scrollable list).

F. File Format

FIG. 24 is an example of a file format that can be used by the system 100 to display the results of an analysis 136.

If the analysis results are to be saved to a results file, a new results file will be created the first time. After that, the succeeding results will be appended to the file.

Result files will always be opened in append mode. Result files will be ASCII text with tab separated variables. Commas may not be used because they may be contained in the comment text. The analysis file can conform to the following format. The system 100 is flexible, and can incorporate a wide variety of different formats.

Line 1 will consist of the all the header labels from the analysis documentation, spaced every other column.

Line 2 will consist of all the header text items from the analysis documentation, spaced every other column.

Line 3 will consist of the header labels from the first data file, spaced every other column.

Line 4 will consist of all the header text items from the first data file, spaced every other column.

Line 5 will contain the comment from the first data file.

Line 6 will consist of the comment from the analysis documentation.

Line 7 will contain the labels for line eight: Number Selected, Number Accepted, Analysis Date, Analysis Time, Software Version.

Line 8 will contain the number selected, number accepted, analysis date, analysis time, and software version.

Line 9 will contain the .CFU configuration file name, followed by the primary pattern file names for Marker #1, thru Marker #10. Unused markers will be left empty.

Line 10 will contain the .CFD configuration file name, followed by the first auxiliary pattern file names for Marker #1, thru Marker #10. Unused markers will be left empty.

Line 11 will contain the .CFP configuration file name, followed by the second auxiliary pattern file names for Marker #1, thru Marker #10. Unused markers will be left empty.

Line 12 will contain the .CFA configuration file name, followed by the third auxiliary pattern file names for Marker #1, thru Marker #10. Unused markers will be left empty.

Line 13 is a spare

Line 14 is a spare

Line 15 will contain the column labels for the data.

Line 16 will contain the unit labels for the data.

Line 17 to the end of the file will consist of one line for each data file analyzed.

G. Data File Selection

Figure 25:
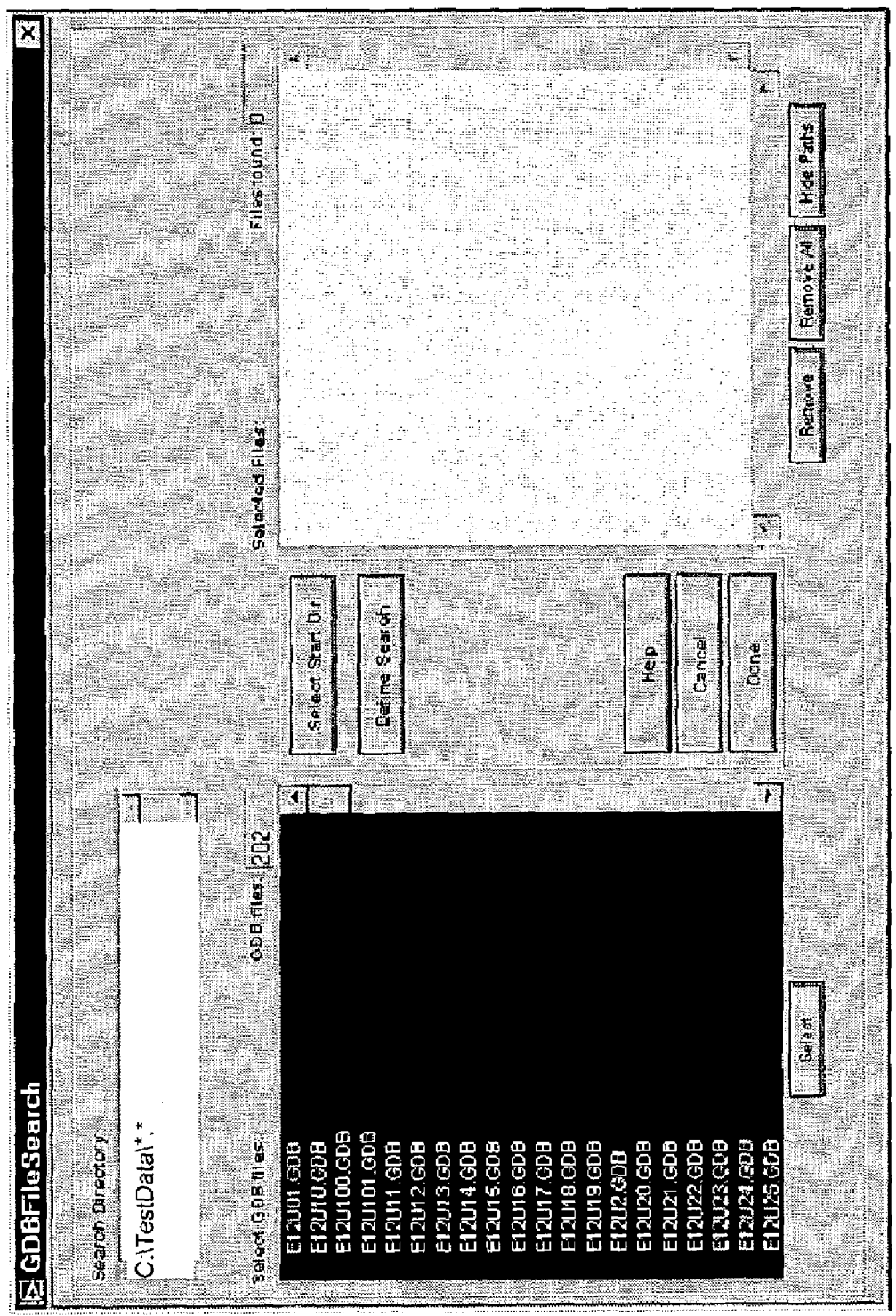
FIG. 25 is an example of a file search interface that can be incorporated into the system.

FIG. 25 is an example of a file search interface that can be incorporated into the system.

The left window shows the files in the current directory, the right window shows all the files currently selected. Files are selected by either clicking on an individual file name then clicking the select button, or click on the first file name in a list, hold down the shift key and the left mouse button and drag down the file list. After the files are highlighted, click the select button to move them to the right window.

Select Start Dir:

The button changes the active directory to pull files from. Files can be combined from multiple directories.

Define Search:

Allows files to be chosen based on the results of a search. Any information in a file can be queried against, so files can be selected based on items such as when the file was collected, who collected the file, or even the results of a previous analysis session. Files can be selected based on criteria as complicated as a velocity greater than A, an acceleration less than B, and a position between C and D. This is a very powerful utility. Users are invited to explore this set of screens. The search result histograms can even be used as a quick way of examining results of an analysis.

Advanced:

Builds the list of header fields available to search against for file selection

H. Configuration Selection Interface

Figure 26:
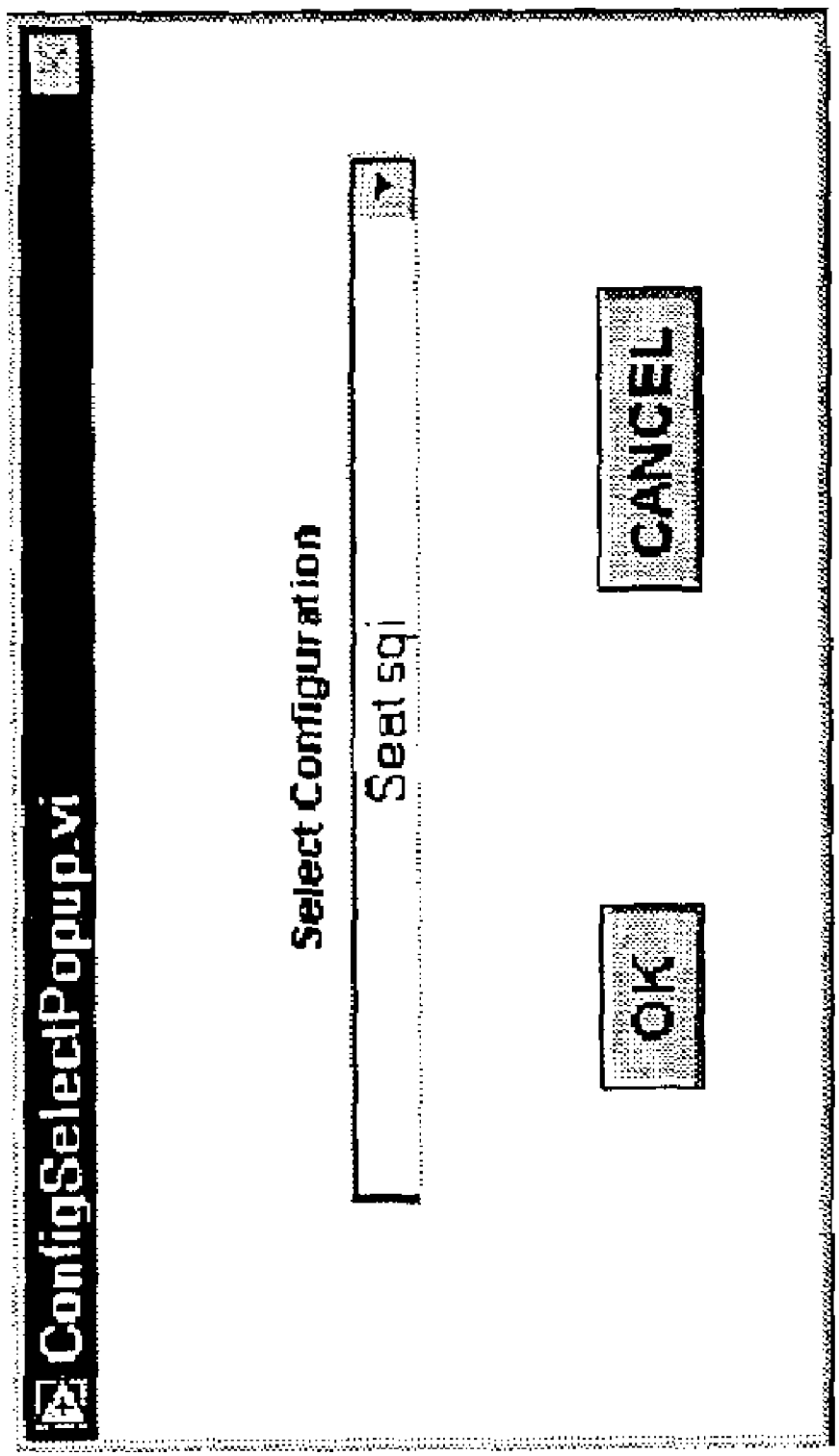
FIG. 26 is an example of a configuration selection interface that can be incorporated into the system.

FIG. 26 is an example of a configuration selection interface that can be incorporated into the system 100. The configuration selection interface allows the user to select a configuration through the use of a drop down list box.

I. Documentation Interface

Figure 27:
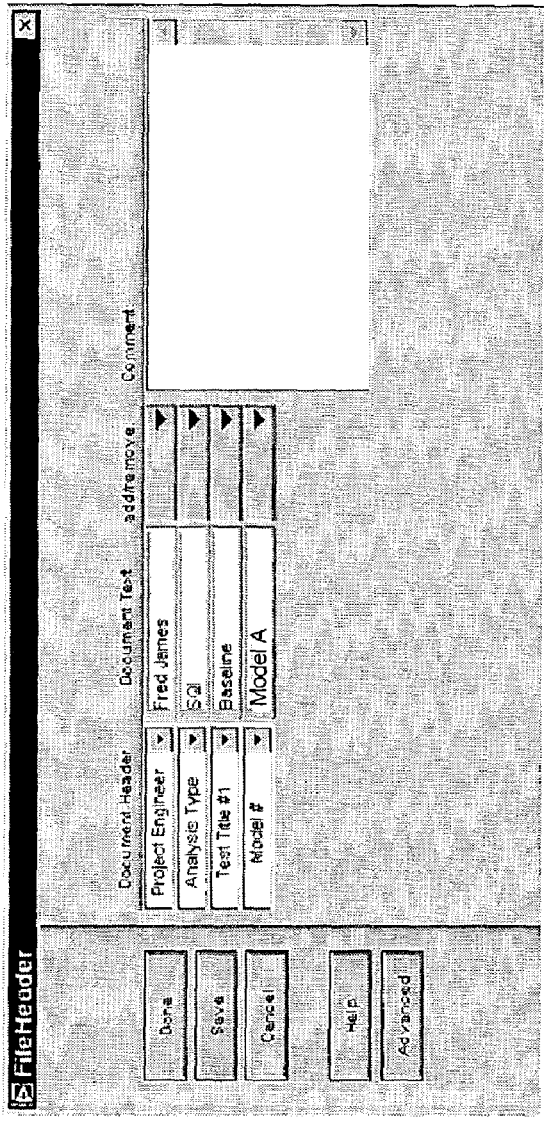
FIG. 27 is an example of a file header interface that can be incorporated into the system.

FIG. 27 is an example of a file header interface that can be incorporated into the system 100. Because the file header is a way of adding documentation to a file, the interface can also be called a documentation interface.

Documentation: Pops the panel for creation of documentation that will be appended to the analysis files. All information entered on this page will be appended to the existing file documentation.

Document Header: Selects the desired header field to populate with information.

Document Text: The user enters (Changes) the text that will be stored under each of the document headers.

Add/Remove: Adds or removes a documentation item from the list

Done: Returns to the previous screen, without saving all information.

Save: Saves all changes.

Cancel: Returns to previous screen without saving anything.

Advanced: Only visible when in "advance" operator mode. Pops up a screen that allows the user to manage the list of header fields that are available on the documentation screen. It is possible to replace documentation from the source file when it is written to a new file, so the user 122 should use caution. This happens when a header field is used in both the original data file and in the analysis. To prevent this from happening, only make header fields available that are defined for analysis use (or are not defined for data collection use)

J. Pattern Match Channels Interface

Figure 28:
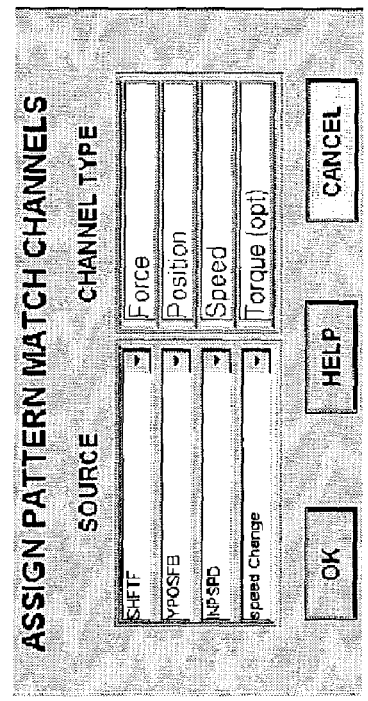
FIG. 28 is an example of a "pattern-match channels" interface that can be incorporated into the system.

FIG. 28 is an example of a "pattern-match channels" interface that can be incorporated into the system. The interface allows the user to choose what data channels are used for the pattern matching routines. The left column shows the data channel that supplies the information, and the right column shows the type of data channel that is required.

These are the data channels the patterns will be matched to. For a preferred vehicle transmission embodiment, there are four match channels, force, speed, position, torque. Force and position channels are required. The other two are optional. Matching will be based on only those channels which have assigned data channels. In general the more data channels that are used the better the fit. In some cases, such as extreme conditioner delay, common in speed signals, assigning a speed trace will degrade the quality of the fit.

Source: Allows the user to choose from a list of all available data channels.

Channel Type:

Display only, these descriptions are entered on the marker parameter screen.

K. Data Operations Interface

Figure 29:
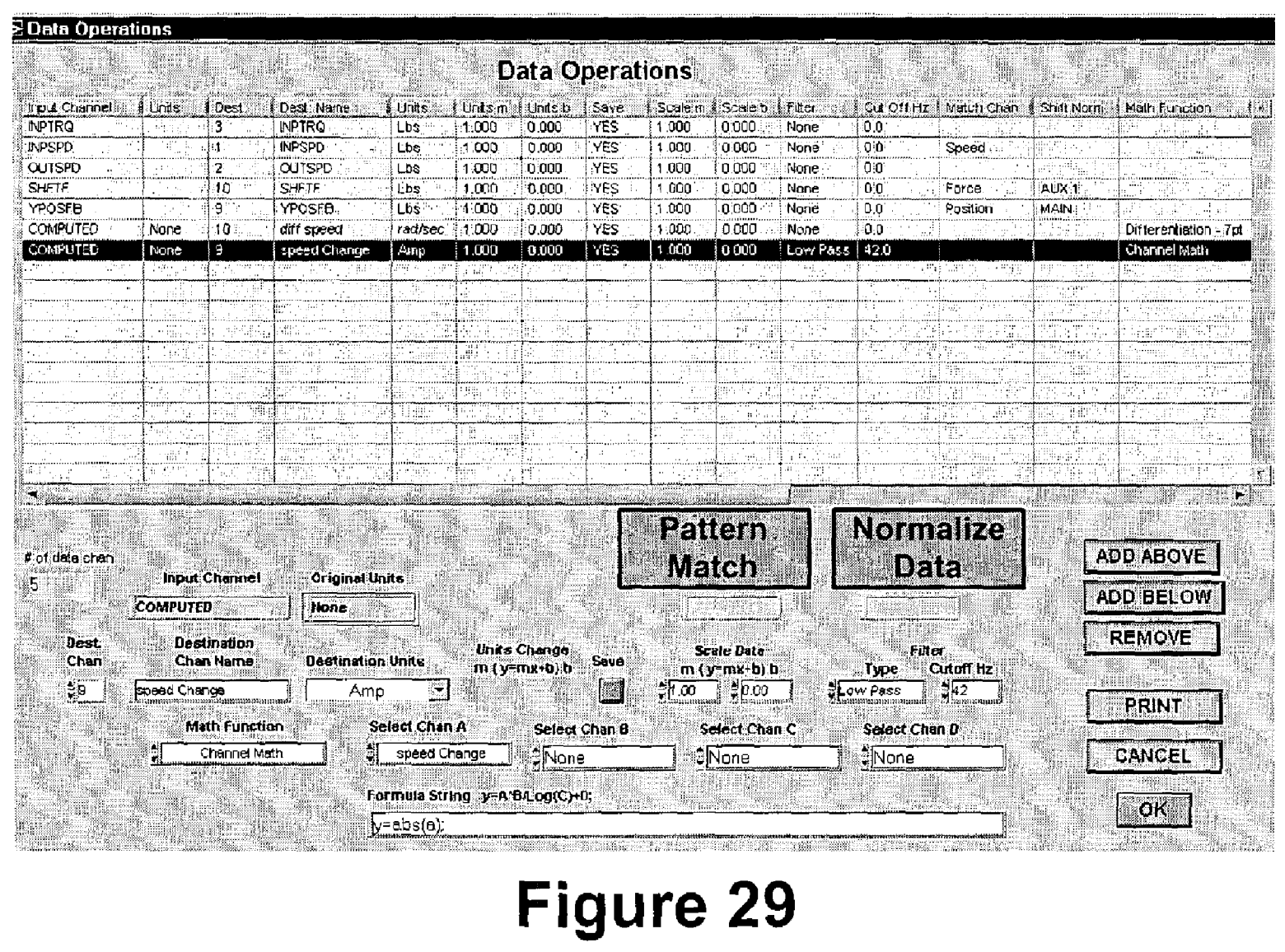

FIG. 29 is an example of a data operations interface that can be incorporated into the system 100.

This is the screen for working with data channels. The data channels read from the file are always at the top. Computed channels follow. The main "spread sheet" area summarizes all of the information for each channel. The bottom of the screen shows the details for the selected data channel. A data channel can be selected for adjusting by simply clicking on its row of the spread sheet. The bottom of the screen will adjust based on what is possible for the selected data channel.

Input Channel:
Name of the data channel if it came from the file, computed if it is a computed channel.
Original Units: The units the data was saved in.
Destination Channel Number: The channel number the data will be saved to if a new file is written. (Note, this allows reordering the channels in a file).
Destination Channel Name: The name of the channel as it will be used for all operations. For channels read from a file this is initially populated with the same name as the input channel, but can be changed by the user. For computed channels, this is the channel name. (Note this allows renaming data channels).
Destination Units: This is the units used for all calculations. This is the same as the original units initially, but can be changed by the user. The user can only select from those units that the software knows the conversion for.
Units m & b: This is the scale and offset used to convert from the original units to the destination units. These are determined from a table based on the units chosen by the user.
Save: If this box is checked (Green) this data channel will be saved in the new gdb file.
Scale m & b: Allows the user to scale the data channel.
FilterType: none, lowpass, highpass. If a bandpass or notch filter is required, the channel can be lowpass filtered, then used as the source for a computed channel which is high pass filtered.
Filter Cut-off: The cutoff frequency for the filter.
Pattern Match Channel: Allows the user to choose what data channels are used for the pattern matching routines.

L. Data Normalization Interface

Figure 30:
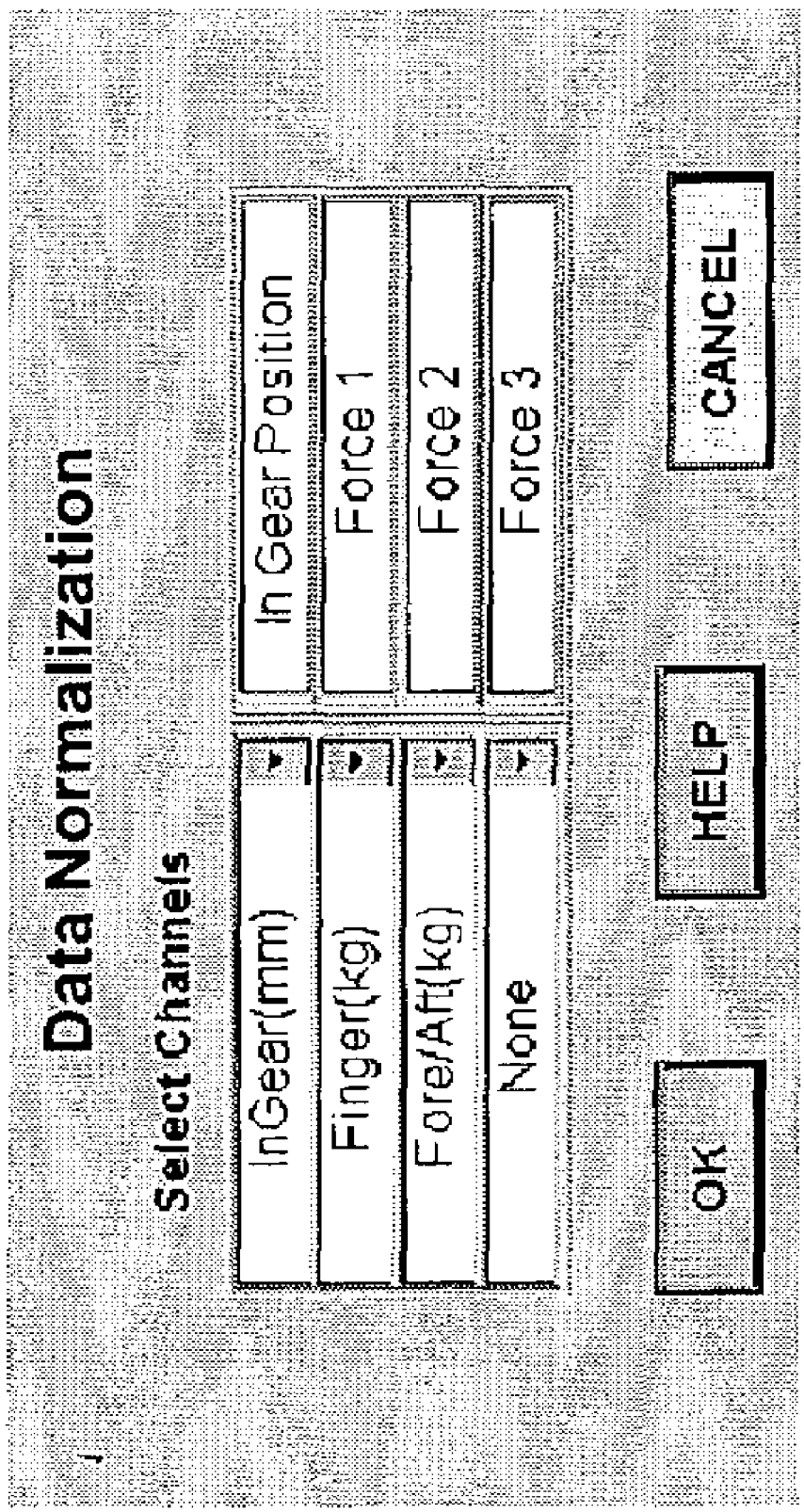
FIG. 30 is an example of a data normalization interface that can be incorporated into the system.
Figure 31:
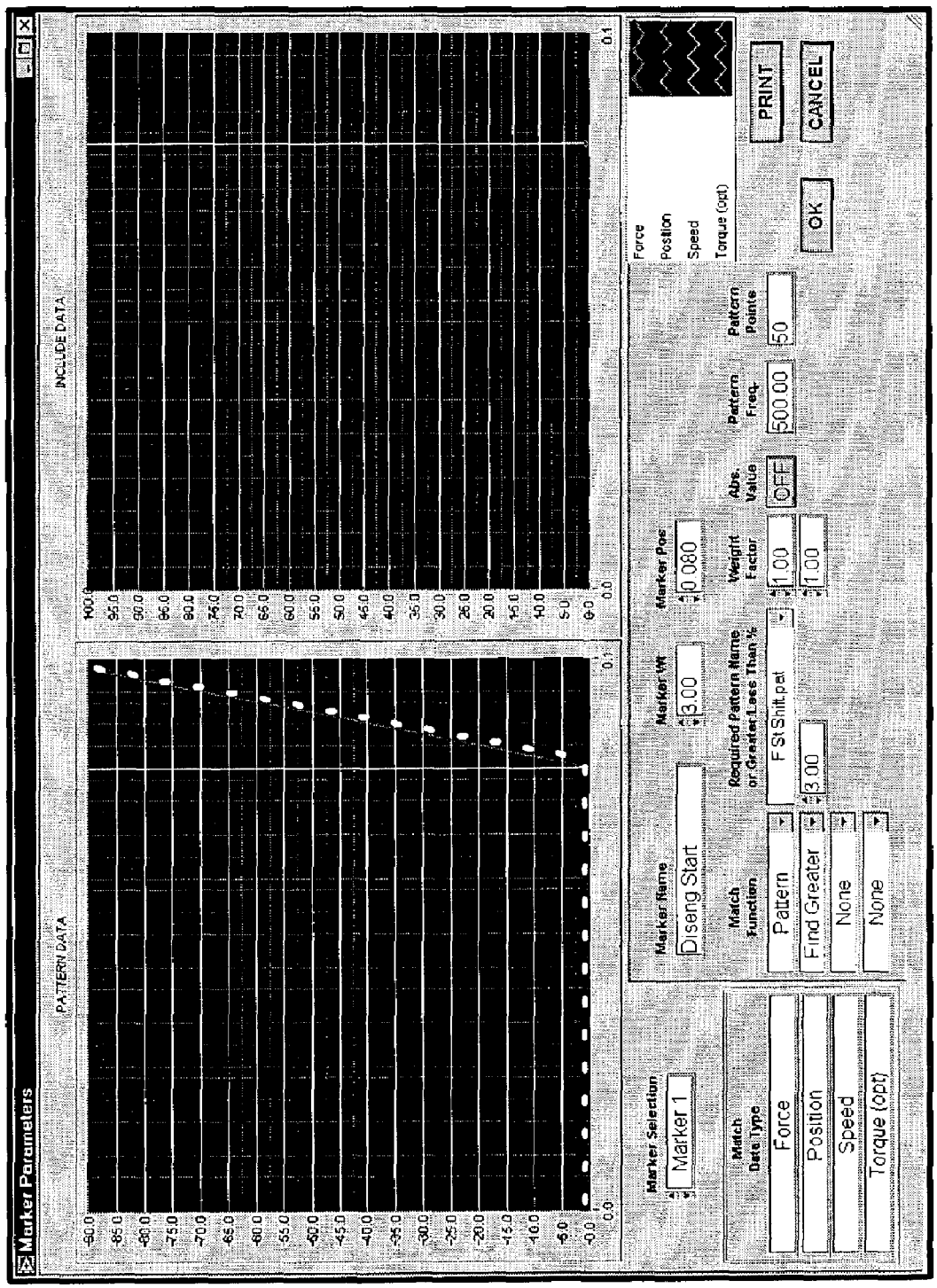
FIG. 31 is an example of a marker parameter interface that can be incorporated into the system.

FIG. 30 is an example of a data normalization interface that can be incorporated into the system. Users 122 may desire that data be normalized for a variety of different analytical and reporting reasons.

M. Marker Parameters Interface

FIG. 29 is an example of a marker parameter interface that can be incorporated into the system. The interface allows users to configuring how each of the markers is placed on the data.

The left graph displays all of the patterns defined for this marker. The right graph displays the include data for each pattern. (Using includes values of less than 100% allows the matching algorithm to selectively ignore parts of a pattern).

Marker Selection: Controls which marker is being worked on. The software supports a maximum of 10 markers.
Match Data Type: The user enters the type of data trace that the patterns are supposed to match against. The name the user enters here is what is displayed under Data Match Channels.
Print: Prints this panel.
Ok: Exit and save changes.
Cancel: Exit and do not save changes.
For each of the defined markers 134, the following information applies:
Marker Name: The name of the marker as it will appear in all analysis results.
Marker Weight: How important this marker is relative to other markers. This is used for the calculation of the overall confidence number and for the positioning of markers. A high importance marker can force a low importance number to a less desirable position if it means the high importance marker gets a better position.
Marker Position: The position of the marker relative to the start of the pattern file. The marker position is shown on the plot by a vertical cursor.

Match Function: The type of pattern matching to perform on the data.
None: Ignore this match channel for this marker
Pattern: Match a pattern in the data.
Find Max, Find Min: Find the maximum or minimum value.
Find relative max, Find relative min: Find the relative maximum or minimum between two other markers.
Greater Than, Less Than: Find points that are greater than or less than the set point. Entered in percent.
Target value: Find the point closest to the target value. Entered in percent.
Pattern Name: The name of the pattern file. Select from the list of available pattern files.
Value: The value used for greater than, less than and target value.
Weight Factor: How important this match function is relative to other match functions for this marker.
Absolute value: Will match to the pattern and the pattern "upside down."
Pattern frequency: (Indicator) The samples per second for the pattern file. The software can adjust the pattern frequency to match the data sample rate within a range. The pattern frequency can not be lower than the data sample rate. The pattern frequency can not be higher than 5 times the data sample rate.
Pattern points: (Indicator) How many points are in the pattern file. If the sample frequency is lower than the pattern frequency, the number of points in the pattern file that are actually used are reduced. For example the data sample rate is ⅕ the pattern frequency. The pattern has 20 points in it. The software only uses 4 of those points. The software generates an error if the number of actual points used is less than 3.

M. Pattern Data Interface

Figure 32:
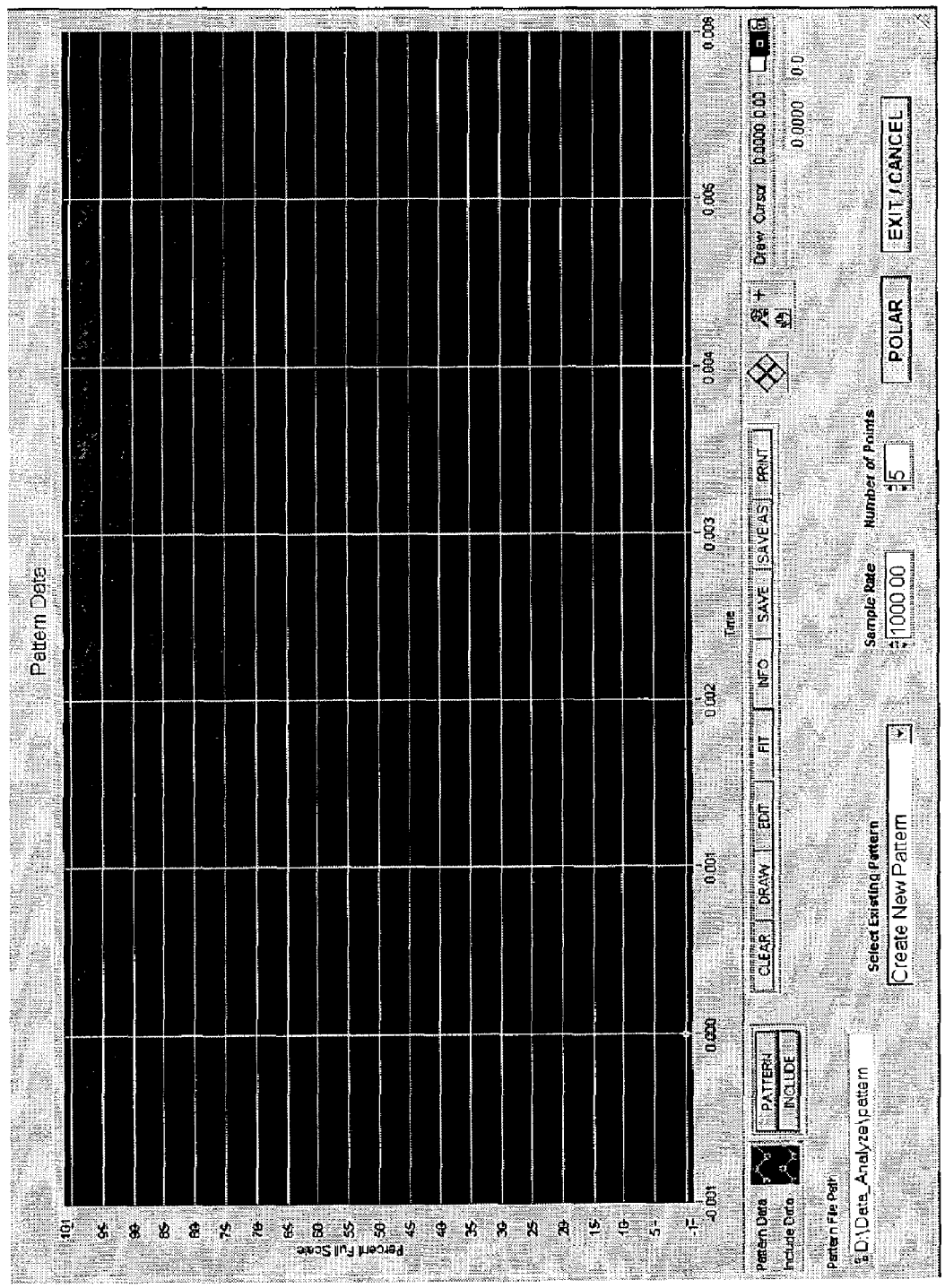
FIG. 32 is an example of a pattern files interface that can be incorporated into the system.

FIG. 32 is an example of a pattern files interface (.e.g. "Pattern Data" Interface) that can be incorporated into the system. The interface opens the editor for the creation and editing of pattern files:
Pattern: Selects the pattern data for modification.
Include: Selects the include data for modification.
Clear: Clears the existing pattern and include information.
Draw: Allows free hand drawing by dragging the white circular cursor.
Edit: Allows point by point editing of the data.
Fit: Does a polynomial fit to selected points. The cursor is position at each point of interest, then the Select Point button is pressed. When all of the points have been selected, pressing Fit Points fits a curve to the points.
Save: Save the pattern under the existing name.
Save As: Save the pattern under a new name.
Select Existing Pattern: List of all available patterns for display and editing.
Sample Rate: Sample rate for this pattern file.
Number of Points: Number of points to save into the pattern file. Note: the number of points shown on the screen can be more or less than this number. The software will adjust the number of points on the screen so that this number of points will get saved to the file.
Polar/Bipolar: Controls whether the y axis is 0-100 or +/−100.
Exit: Exits screen.

N. Analysis Selection

Figure 33:
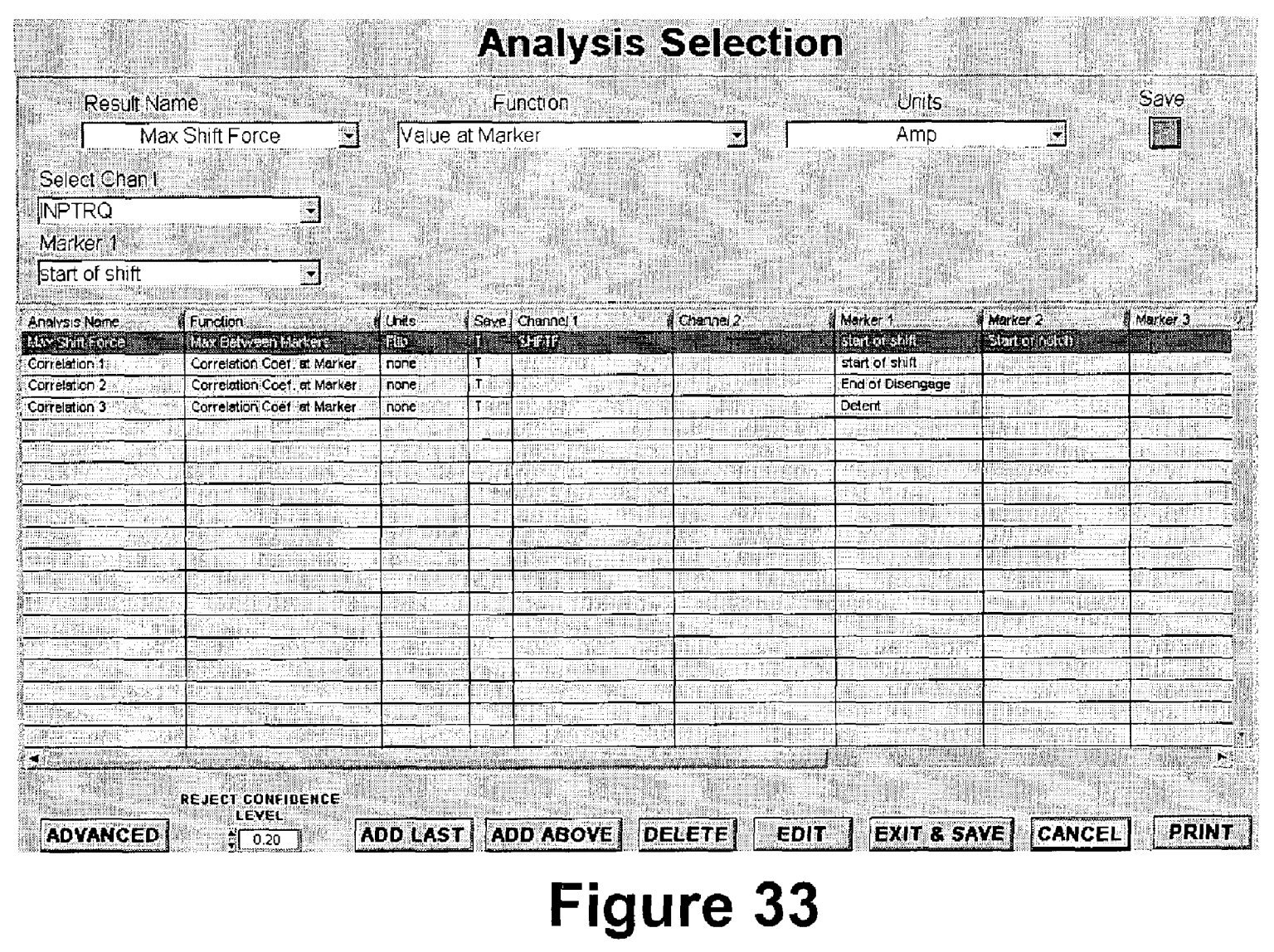

FIG. 33 is an example of an analysis selection interface that can be incorporated into the system. The interface is for building and modifying an analysis 136. Only available with a user level of intermediate or advanced. This interface (e.g.

screen) functions a little different than the data operations screen. To add a new analysis item, the user configures the new analysis, then highlights where they want it inserted in the list, then hits add above or add below. (In data operations, you insert a blank line, then, edit it.) To delete or edit an analysis line, select the line, then hit delete or edit.

Result name: Choose the desired name for the analysis result. If the desired name is not in the list, the user can add to the list by choosing "User Defined" at the end of the list. A user defined name is not searchable using the file select utility. To have a name officially defined, contact the software administrator.

Function: Analysis function to be performed. The available functions are:

Value at a Marker: The value at a marker requires a channel and a marker selection. The value of the channel at the marker is reported.

Time between markers: Requires two markers. The difference in time between the two markers is reported.

Difference in value between two markers: The difference between markers requires a channel and two marker selections. The value of the channel at marker one minus the value of the channel at marker two is reported.

Slope of line between two markers: The slope between markers requires a channel and two marker selections. The value of the channel at marker one minus the value of the channel at marker two divided by the time between markers is reported.

Min between markers: The Min between markers requires a channel and two marker selections. The minimum value of the channel between the two markers is reported.

Max between markers: The Max between markers requires a channel and two marker selections. The maximum value of the channel between the two markers is reported.

Average between markers: The Average between markers requires a channel and two marker selections. The average value of the channel between the two markers is reported.

Impulse: (Area under curve) Impulse requires a channel and two marker selections. The area under the curve of the channel between the two markers is reported.

Value Ratio: Requires two analysis results. The first analysis result divided by the second analysis result is returned.

Value Product: Requires two analysis results. The first analysis result multiplied by the second analysis result is returned.

Value Sum: Requires two analysis results. The first analysis result added to the second analysis result is returned.

Value Difference: Requires two analysis results. The first analysis result minus the second analysis result is returned.

J Omega: Requires a channel, two marker selections and a constant value. This function calculates the change in angular momentum. It is calculated as: K1(VM22−VM12); where VM=value of channel at marker and K1 is the inertia.

Work Applied: (Area between curves) Work Applied is defined as the integral of a channel cross plot. This requires the selection of two data channels. The first channel will be applied as the X axis and the second as the Y axis. The integral will be computed using the Trapezoidal method.

Correlation coefficient at a marker: Requires a marker. The confidence number associated with that marker is returned.

Summary correlation coefficient: The overall confidence number is returned.

Define Constant: Declares a constant value. Used in conjunction with value product, ratio, sum and difference.

Units: Select the units for the result of the calculation from the list of available units. Note: the units are only a label. No attempt is made to do unit conversions or verify that the unit makes sense relative to the data channels that are feeding it.

Save: Controls if the analysis result should be saved in any of the output files. This allows creation of intermediate results without cluttering up output files.

Advanced: Only available when user level is "advanced" utility for building the list of result names seen using this configuration from the list of all possible result names.

Reject Confidence Level: Confidence level at which a file is rejected. See File-Settings for more information.

Add Last: Add the current analysis to the end of the list.

Add Above: Add the current analysis directly above the highlighted analysis.

Delete: Delete the highlighted analysis item.

Edit: Edit the highlighted analysis item.

Exit and Save: Exit this screen and save all changes.

Cancel: Exit screen and discard changes.

Print: Print the analysis configuration spreadsheet.

O. Menu Interface

Figures 34, 35:
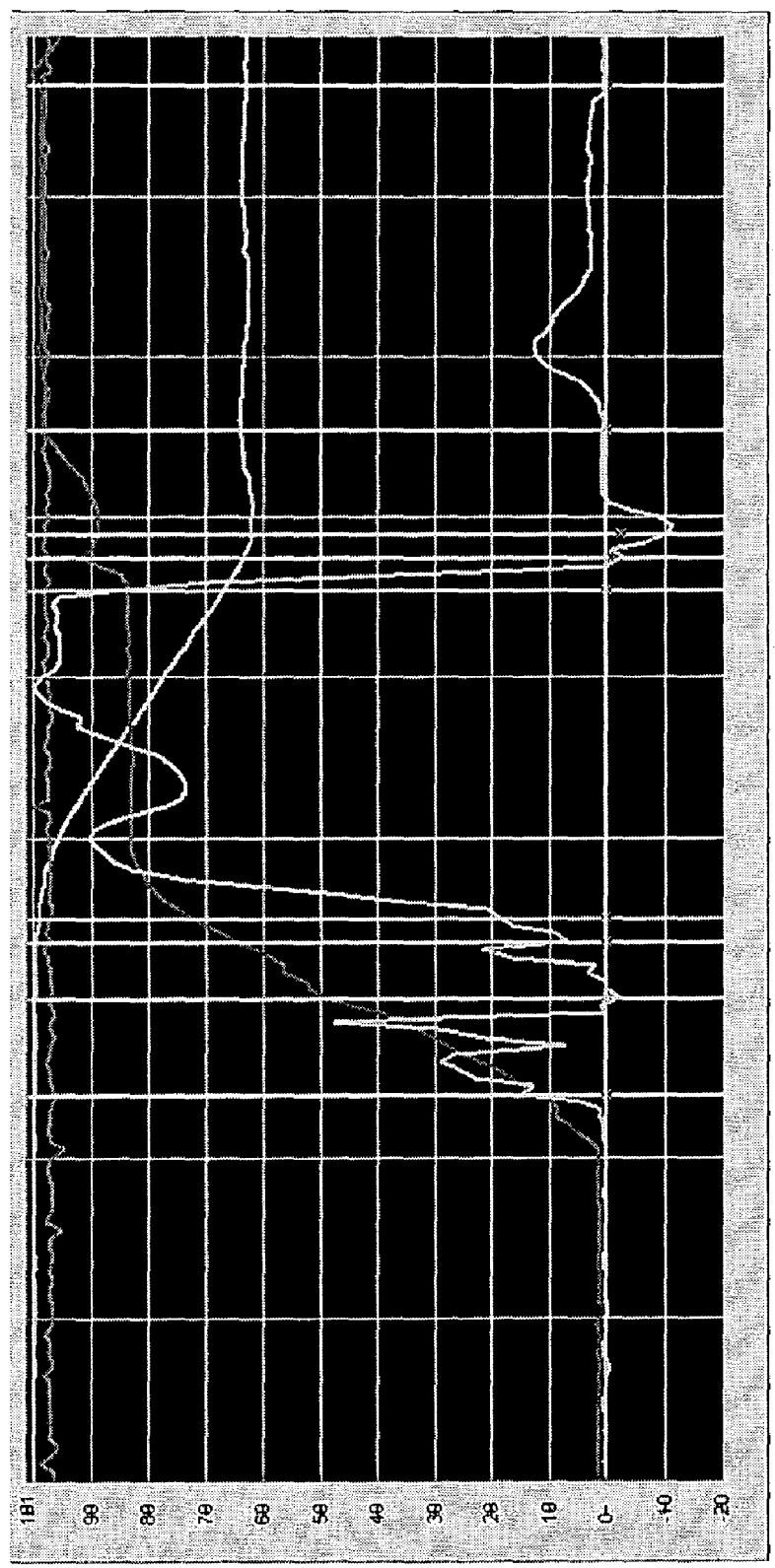
FIG. 34 is an example of a menu interface that can be incorporated into the system.
FIG. 35 is an example of a graph displaying data channels that can be incorporated into the system.

FIG. 34 is an example of a menu interface that can be incorporated into the system. The menu interface provides the method of changing the analysis control parameters and navigating amongst the different interfaces in the interface subsystem 200. The proposed menu bar layout is as follows:

File
Report File Path
Data Files
Select
Advanced
Settings
Load Configuration
Save Configuration
Save Configuration As
Print Main Screen
Exit
Data
Documentation
Pattern Match Channels
Data Operations
Pattern Recognition
Marker Parameters
Pattern Files
Analysis
Mode Setting
Auto
Batch
Manual
Always Rematch
Add Marker Chan
- - -
Analysis Selection
Help
Quick Help
About P. Graph Interface FIG. 35 is an example of a graph displaying data channels that can be incorporated into the system 100. Displays the data channels for the current shift. All data is scaled in % of full scale. There is no way to read engineering values from the plot. If auto scaling is turned off, the user can expand a section of the plot by changing the maximum and/or minimum number of an axis scale.

Q. Data Channels Control Interface

Figure 36:
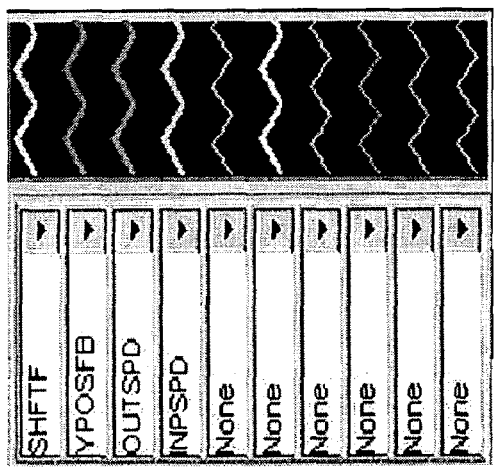
FIG. 36 is an example of a data channels control interface that can be incorporated into the system.

FIG. 36 is an example of a data channels control interface that can be incorporated into the system. Controls which data channels are displayed on the graph, and how each data trace appears. For each data trace the user can select from any of the available data channels, or none. By right clicking on one of the lines, the user can change line attributes such as color, width, line style, and if symbols are placed at each of the data points.

R. Graph Control Interface

Figure 39:
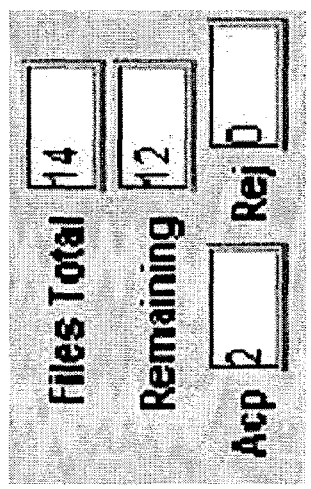
FIG. 39 is an example of a file statistics interface that can be incorporated into the system.
Figure 37:
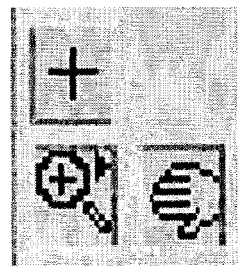
FIG. 37 is an example of a graph control interface that can be incorporated into the system.
Figure 38:
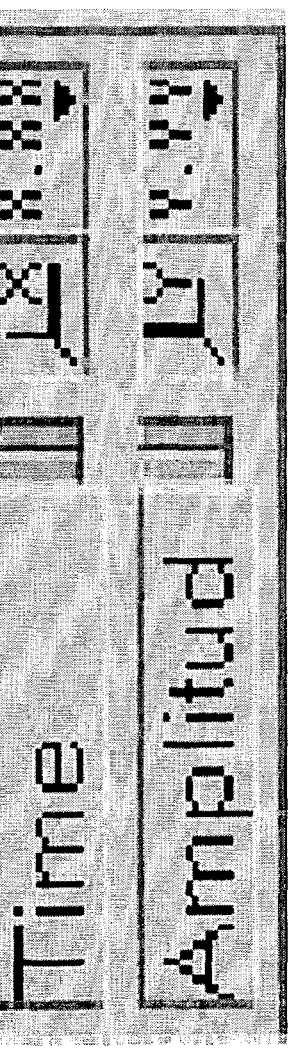
FIG. 38 is an example of an axis control interface that can be incorporated into the system.

FIG. 37 is an example of a graph control interface that can be incorporated into the system. The graph control interface allows zooming, panning, and access to various attributes of the graph S. Axis Control Interface FIG. 38 is an example of an axis control interface that can be incorporated into the system. The axis control interface can turn auto scaling on/off and sets the axis attributes for the graph T. File Statistics Interface FIG. 39 is an example of a file statistics interface that can be incorporated into the system. Displays the total number of files selected, the number of files accepted, rejected, and the number of files that need to be processed.

U. Control Buttons Interface

FIG. 40 is an example of control buttons that can be incorporated into a "manual" mode of the system.

Manual: Rematch Data: The computer will place the markers based on the current configuration. Commonly used if a marker has been moved manually.

Accept: Accept The current file.

Reject: Reject the current file.

Exit: Exit the program.

FIG. 41 is an example of control buttons that can be incorporated into a "automatic" or "batch" mode of the system.

Auto/Batch: Start Analysis: Start automated Processing of the data.

Accept: Accept the current file.

Reject: Reject the current file.

Exit: Exit the program.

V. Markers Interface

FIG. 42 is an example of a markers interface that can be incorporated into the system. Displays marker information and controls how they look and act. Each marker is listed on a separate line in order. The first numeric shows the time the marker occurs at. The second numeric shows the Y coordinate of the marker.(The user can lock a cursor to a data trace, allowing the Y value of the data trace (in %) to show in this box. By default the cursors are not locked to a data trace) The box shows which marker or markers have been selected for moving. The next box (shows a yellow line with an X on it) controls the appearance of the marker. Clicking on it allows color width etc. to be changed. The padlock controls if the Y axis is locked to a data trace. The last number shows confidence associated with the placement of the marker. If the marker is moved manually, this number becomes zero.

W. Marker Mover Control

FIG. 43 is an example of a marker mover control that can be incorporated into the system. The marker mover control can move the selected marker/markers up, down, left and right.

X. Analysis Results Display

FIG. 44 is an example of an analysis results display that can be incorporated into the system. The analysis results display provides a display of the results of an analysis. Every analysis calculation is displayed in this window. The scroll bar allows the user to move up and down through the list of results. The results update automatically as the cursors are moved.

Y. File Documentation Interface

FIG. 45 is an example of a file documentation interface that can be incorporated into the system. The file documentation interface stores documentation directly in the data file. The Documentation Tab shows the information that is being added to the file as it is being analyzed. The Source File Tab shows the documentation that was in the original source file. Both sections are put together and written to the new file.

Z. Comment Interface

Figure 46:
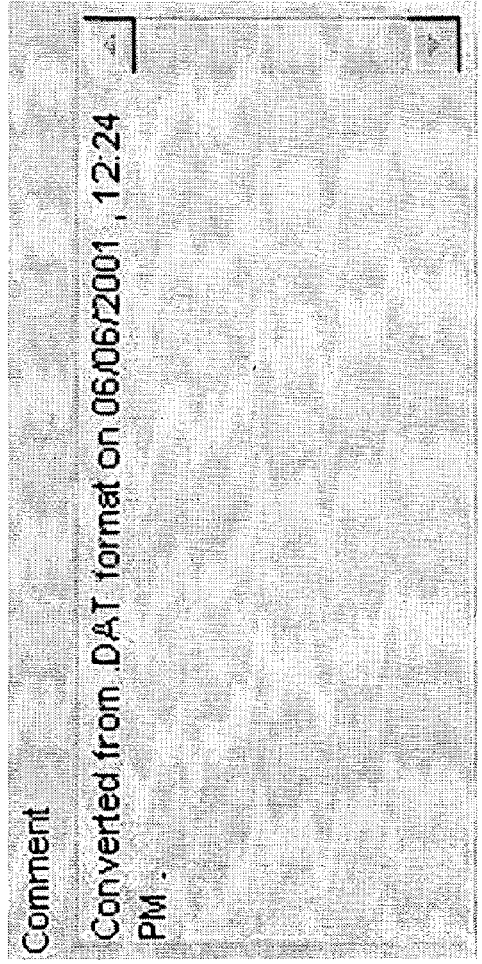
FIG. 46 is an example of a comment interface that can be associated with the file document interface in FIG. 45.

FIG. 46 is an example of a comment interface that can be associated with the file document interface in FIG. 45. The comment interface provides users 122 with the opportunity to document their own insights, analysis, and comments relating to the analysis 136. The comment is the sum of the comment from the original file plus any additions made using the documentation screen.

AA. File Path Interface

Figure 47:
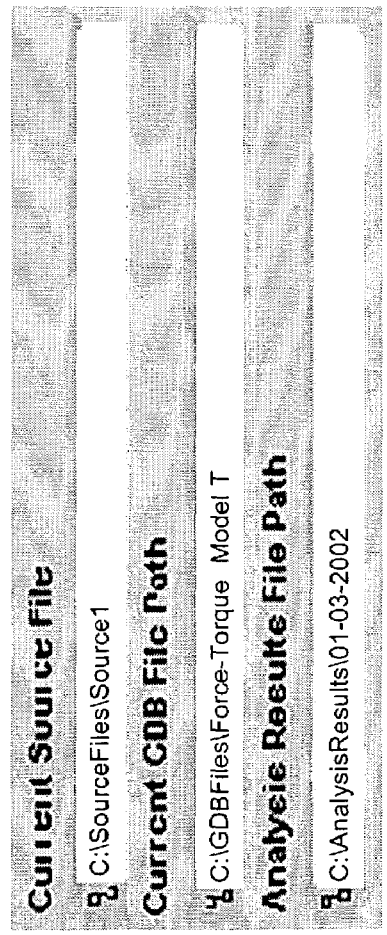
FIG. 47 is an example of a file path interface that can be incorporated into the system.

FIG. 47 is an example of a file path interface that can be incorporated into the system. The file path interface displays the file names and paths for the analysis files. Since the name and path are typically longer than what can be displayed in the window, the user 122 can click on the path, then use the arrow keys to "slide" the path in the interface.

BB. Confidence graph interface

FIG. 48 is an example of a confidence graph interface that can be incorporated into the system. The confidence graph interface is only visible for advanced users in a preferred embodiment. The confidence graph interface displays the correlation array for each marker.

IX. Addition Alternative Embodiments

While the invention has been specifically described in connection with certain specific embodiments thereof, it is to be understood that this is by way of illustration and not of limitation, and the scope of the appended claims should be construed as broadly as the prior art will permit.

The invention claimed is:

1. A system for analyzing data, said system including a processor and memory and comprising:
a data subsystem, including a plurality of template data points and an input file, said input file comprising a plurality of analysis data points;
an interface subsystem, including a plurality of input characteristics and a plurality of events, wherein said interface subsystem creates said events from at least one said input characteristic and at least one of the plurality of template data points, wherein at least one said event is stored in a pattern array, wherein a subset of said plurality of data points are stored in a data array, and wherein a correlation heuristic is applied to said pattern array and said data array to identify a marker location; and
an analysis subsystem, including a plurality of markers, wherein said analysis subsystem searches said data subsystem for said analysis data points indicative of at least a portion of said events, and wherein said analysis subsystem places said markers on said analysis data points within the input file indicative of said events without human intervention, wherein said markers are placed at a plurality of marker locations, wherein said marker locations are identified by a correlation-based matching heuristic, and wherein a confidence value is associated with the identification of each said marker locations.

2. The system of claim 1, further comprising a plurality of template data types, wherein at least one said event includes said plurality of template data points and said plurality of template data types.

3. The system of claim 1, further comprising a plurality of data types, wherein said file includes said plurality of data types.

4. The system of claim 1, further comprising: a plurality Of data types, and a plurality of template data types; wherein at least one said event includes said plurality of template data points; wherein at least one said event includes said plurality of data types; and wherein said file includes said plurality of data types.

5. The system of claim 4, wherein each data type in said plurality of template data types is not represented in said plurality of data types.

6. The system of claim 4, wherein each template data type in said plurality of data types is not represented in said plurality of template data types.

7. The system of claim 1, further comprising a weight factor, wherein said analysis subsystem uses said weight factor to identify at least one said event.

8. The system of claim 1, said analysis subsystem further including a marker location associated with said marker and an analysis, wherein said analysis subsystem generates said analysis from at least one said data point at said marker location.

9. The system of claim 8, wherein said analysis is generated without human intervention.

10. The system of claim 1, said data subsystem further including a plurality of files in a pre-defined and user-defined format, wherein said plurality of data points are stored within said plurality of files.

11. The system of claim 1, said data subsystem further including a data collection module, said data collection module including a sensor for capturing sensor data, wherein said data collection module generates said data points from said sensor data.

12. The system of claim 11, wherein said sensor collects sensor data for a plurality of channels in a substantially simultaneous manner, and wherein each channel is of a different data type.

13. The system of claim 12, wherein one channel in said plurality of channels is a force channel.

14. The system of claim 1, wherein said markers are placed at a plurality of marker locations, wherein said marker locations are identified by a correlation-based matching heuristic, and wherein a confidence value is associated with the identification of said marker locations.

15. The system of claim 1, said analysis subsystem including a skill level indicator and a menu comprising of a plurality of menu selections, wherein said skill level indicator is set in accordance with at least one said input characteristic, and wherein said menu selections are selectively disabled depending on said skill level indicator.

16. The system of claim 1, further comprising a confidence value and a threshold value, wherein a confidence value is calculated by said analysis subsystem, and wherein said confidence value is compared to said threshold value.

17. The system of claim 1, further comprising a pattern matching heuristic, wherein said analysis subsystem identifies a marker location with said pattern matching heuristic.

18. The system of claim 1, further comprising a sample size adjustment, wherein said analysis subsystem identifies said marker using said sample size adjustment.

19. The system of claim 1, further comprising a scaling adjustment, wherein said analysis subsystem identifies said marker using said scaling adjustment.

20. A system for analyzing data, said system including a processor and memory and comprising:
 a data subsystem, including a plurality of data types and plurality of files comprising a plurality of analysis data points, wherein each said analysis data point is associated with at least one said data type;
 a pattern subsystem, including a plurality of events, a plurality of input characteristics, and a plurality of template data points, wherein said events are defined from said input plurality of characteristics, and wherein at least two said template data points are associated with each said event, wherein at least one said event is stored in a pattern array, wherein a subset of said plurality of data points are stored in a data array, and wherein a correlation heuristic is applied to said pattern array and said data array to identify a marker location; and
 a search subsystem, including a plurality of markers, wherein said search subsystem identifies a plurality of locations indicative of at least a portion of said events within said data subsystem, and wherein said analysis subsystem places said markers on said analysis data points within the input file indicative of said events without human intervention, and wherein said markers are placed at a plurality of marker locations, wherein said marker locations are identified by a correlation-based matching heuristic, and wherein a confidence value is associated with the identification of each said marker locations.

21. The system of claim 20, further comprising an analysis module including an analysis calculation, wherein said analysis calculation is generated from said analysis data points at said location of said marker.

22. The system of claim 20, said search subsystem further including a search criteria and a search result, wherein said plurality of files are searched for said search criteria, and wherein said search result includes at least two files.

23. The system of claim 22, wherein said search criteria includes a plurality of data types.

24. The system of claim 20, further comprising a reporting tool, a configurable report, and a plurality of locations, wherein said search subsystem automatically generates a plurality of markers at said plurality of locations, and wherein said reporting tool automatically generates said configurable report from said analysis data points at said plurality of locations.

25. The system of claim 20, further comprising a plurality of confidence values and a plurality of locations, wherein at least one said confidence value is generated at each said location.

26. The system of claim 20, further comprising a confidence value, a threshold value, and an analysis module, wherein an analysis module generates said confidence value from at least one marker, and wherein said analysis module compares said confidence value to said threshold value.

27. The system of claim 20, further comprising a fit sensitivity, wherein said fit sensitivity is automatically adjusted for the number of said template data points associated with said event.

28. The system of claim 20, further comprising an analysis calculation, and a marker sort heuristic, wherein said calculation is performed with said marker sort heuristic.

29. The system of claim 20, further comprising a target value weighing heuristic, wherein said system performs said target value weighing heuristic to identify said event.

30. The system of claim 20, further comprising a marker control, wherein said marker control provides for moving said location.

31. The system of claim 1, wherein the input characteristics include at least one of typed text, a click of the mouse, a selection in a drop down list box, the pressing of a button, the selection of a menu item, the scanning in of a document, speech into a voice recognition technology, or the failure to provide any input.

32. The system of claim 1, wherein the plurality of analysis data points have a numerical value associated with each data point.

33. The system of claim 1, wherein the plurality of markers identify the occurrence of at least one event or sequence of events in the plurality of analysis data points at the locations in which the pattern is found.

34. The system of claim 1, wherein the correlation-based matching heuristic includes a process that identifies statistical correlations between the analysis data points and the template data points.

35. The system of claim 1, wherein the interface subsystem creates events by correlating a plurality of template data points with a user-defined pattern.

36. The system of claim 20, wherein the analysis calculation includes a process that identifies statistical correlations between the analysis data points and the template data points.

* * * * *